US011257073B2

(12) United States Patent
Padmanabhan

(10) Patent No.: US 11,257,073 B2
(45) Date of Patent: Feb. 22, 2022

(54) SYSTEMS, METHODS, AND APPARATUSES FOR IMPLEMENTING MACHINE LEARNING MODELS FOR SMART CONTRACTS USING DISTRIBUTED LEDGER TECHNOLOGIES IN A CLOUD BASED COMPUTING ENVIRONMENT

(71) Applicant: salesforce.com, inc., San Francisco, CA (US)

(72) Inventor: Prithvi Krishnan Padmanabhan, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 641 days.

(21) Appl. No.: 16/177,300

(22) Filed: Oct. 31, 2018

(65) Prior Publication Data
US 2019/0236598 A1    Aug. 1, 2019

Related U.S. Application Data

(63) Continuation-in-part of application No. 15/932,092, filed on Jan. 31, 2018.

(51) Int. Cl.
*H04L 9/06* (2006.01)
*G06Q 20/38* (2012.01)
(Continued)

(52) U.S. Cl.
CPC ......... *G06Q 20/3823* (2013.01); *G06N 20/00* (2019.01); *G06Q 20/0655* (2013.01);
(Continued)

(58) Field of Classification Search
CPC ............ G06Q 20/3823; G06Q 20/389; G06Q 20/0655; G06Q 20/383; G06Q 20/4016;
(Continued)

(56) References Cited

U.S. PATENT DOCUMENTS 5,634,053 A    5/1997  Noble et al.
6,333,929 B1  12/2001  Drottar et al.
(Continued)

FOREIGN PATENT DOCUMENTS

CN    108021986 A  *  5/2018  ............ G06N 20/00
CN    109173261 A      1/2019
(Continued)

OTHER PUBLICATIONS

"A framework for modular norm extraction, modeling and reasoning", Sayonnha Mandal, University of Nebraska, Jul. 2017 (Year: 2017).*

(Continued)

*Primary Examiner* — Neha Patel
*Assistant Examiner* — Duan Zhang
(74) *Attorney, Agent, or Firm* — Elliott, Ostrander & Preston, P.C.

(57) ABSTRACT

Systems, methods, and apparatuses for implementing machine learning models for smart contracts using distributed ledger technologies in a cloud based computing environment are described herein. For example, according to one embodiment there is a system having at least a processor and a memory therein executing within a host organization and having therein: means for operating a blockchain interface to a blockchain on behalf of a plurality of tenants of the host organization, in which each one of the plurality of tenants operate as a participating node with access to the blockchain; receiving historical data from each of the participating nodes on the blockchain; generating a new machine learning model at the host organization by inputting the historical data received from the participating nodes into a neural network of a machine learning platform operating at the host organization; receiving a consensus agreement from the plurality of participating nodes; deploying the new (Continued)

machine learning model to the participating nodes as a component of a smart contract to be executed in fulfillment of the smart contract transactions; receiving a transaction at the blockchain and responsively triggering the smart contract to process the transaction onto the blockchain; and executing the smart contract which includes executing the new machine learning model as part of the smart contract. Other related embodiments are disclosed.

26 Claims, 33 Drawing Sheets

(51) Int. Cl.
  *G06Q 20/40* (2012.01)
  *G06N 20/00* (2019.01)
  *G06Q 20/06* (2012.01)
(52) U.S. Cl.
  CPC ......... *G06Q 20/383* (2013.01); *G06Q 20/389* (2013.01); *G06Q 20/4016* (2013.01); *H04L 9/0637* (2013.01)
(58) Field of Classification Search
  CPC .... G06N 20/00; G06N 20/383; G06N 3/0454; G06N 3/08; H04L 9/0637; H04L 2463/102; H04L 9/3239; H04L 2209/38
  USPC .......................................................... 705/50
  See application file for complete search history.

(56) References Cited

U.S. PATENT DOCUMENTS

| | | | |
|---|---|---|---|
| 7,587,348 B2* | 9/2009 | Liao | G06Q 20/10 705/35 |
| 8,095,463 B1 | 1/2012 | Hartmaier | |
| 9,027,094 B1 | 5/2015 | Balazs et al. | |
| 9,569,700 B1* | 2/2017 | Santos | G06N 3/0454 |
| 9,690,822 B2 | 6/2017 | Roy-Faderman | |
| 9,978,067 B1* | 5/2018 | Sadaghiani | G06N 20/00 |
| 10,042,636 B1* | 8/2018 | Srivastava | G06Q 10/06 |
| 10,311,230 B2 | 6/2019 | Jagadeesan et al. | |
| 10,425,399 B2 | 9/2019 | Kravitz et al. | |
| 10,482,466 B1* | 11/2019 | Walters | G06N 3/084 |
| 10,505,726 B1 | 12/2019 | Andon et al. | |
| 10,521,196 B1 | 12/2019 | Wang et al. | |
| 10,521,780 B1 | 12/2019 | Hopkins, III et al. | |
| 10,541,821 B2 | 1/2020 | Toll et al. | |
| 10,762,506 B1 | 9/2020 | Cash et al. | |
| 10,885,567 B2* | 1/2021 | Bhattacherjee | G06Q 30/0206 |
| 2005/0102159 A1 | 5/2005 | Mondshine | |
| 2006/0259361 A1 | 11/2006 | Barhydt et al. | |
| 2008/0066165 A1 | 3/2008 | Rosenoer | |
| 2009/0037949 A1 | 2/2009 | Birch | |
| 2011/0289140 A1 | 11/2011 | Pletter et al. | |
| 2013/0041934 A1 | 2/2013 | Annamalaisami et al. | |
| 2013/0346173 A1 | 12/2013 | Chandoor | |
| 2014/0278894 A1 | 9/2014 | Toumayan et al. | |
| 2015/0026061 A1* | 1/2015 | Siegel | G06Q 20/4016 705/44 |
| 2016/0027229 A1 | 1/2016 | Spanos et al. | |
| 2016/0092872 A1 | 3/2016 | Prakash et al. | |
| 2016/0148251 A1 | 5/2016 | Thomas et al. | |
| 2016/0350860 A1 | 12/2016 | Dintenfass et al. | |
| 2016/0358267 A1 | 12/2016 | Arjomand et al. | |
| 2017/0046698 A1 | 2/2017 | Haldenby et al. | |
| 2017/0085545 A1 | 3/2017 | Lohe et al. | |
| 2017/0103167 A1* | 4/2017 | Shah | G06F 40/40 |
| 2017/0132625 A1 | 5/2017 | Kennedy | |
| 2017/0140145 A1* | 5/2017 | Shah | G16H 40/63 |
| 2017/0200157 A1 | 7/2017 | Bergeon et al. | |
| 2017/0206603 A1* | 7/2017 | Al-Masoud | G06Q 40/06 |
| 2017/0236215 A1* | 8/2017 | Eisen | G06N 20/00 705/35 |
| 2017/0295021 A1 | 10/2017 | Gutiérrez et al. | |
| 2017/0295023 A1 | 10/2017 | Madhavan et al. | |
| 2017/0300876 A1* | 10/2017 | Musiala, Jr. | G06Q 20/36 |
| 2017/0337534 A1 | 11/2017 | Goeringer et al. | |
| 2017/0344988 A1* | 11/2017 | Cusden | G06F 21/00 |
| 2017/0353309 A1* | 12/2017 | Gray | H04L 9/3236 |
| 2017/0364549 A1 | 12/2017 | Abalos | |
| 2018/0005186 A1* | 1/2018 | Hunn | G06F 40/103 |
| 2018/0006831 A1 | 1/2018 | Toll et al. | |
| 2018/0019879 A1 | 1/2018 | Kravitz et al. | |
| 2018/0026505 A1 | 1/2018 | Galmiche et al. | |
| 2018/0041345 A1 | 2/2018 | Maim | |
| 2018/0082256 A1* | 3/2018 | Tummuru | G06Q 10/1053 |
| 2018/0088928 A1 | 3/2018 | Smith et al. | |
| 2018/0123779 A1* | 5/2018 | Zhang | H04L 9/0637 |
| 2018/0144042 A1* | 5/2018 | Sheng | G06F 16/285 |
| 2018/0158162 A1 | 6/2018 | Ramasamy | |
| 2018/0165416 A1* | 6/2018 | Saxena | G06F 21/6245 |
| 2018/0189100 A1* | 7/2018 | Nemoto | G06F 9/5027 |
| 2018/0191503 A1 | 7/2018 | Alwar et al. | |
| 2018/0204213 A1* | 7/2018 | Zappier | H04L 63/10 |
| 2018/0218176 A1 | 8/2018 | Voorhees et al. | |
| 2018/0225611 A1 | 8/2018 | Daniel et al. | |
| 2018/0232644 A1* | 8/2018 | Acharya | G06N 20/00 |
| 2018/0232659 A1 | 8/2018 | Ranatunga | G06Q 30/02 |
| 2018/0247191 A1* | 8/2018 | Katz | G06N 3/08 |
| 2018/0253661 A1* | 9/2018 | Strauss | G06N 20/00 |
| 2018/0262505 A1 | 9/2018 | Ligatti | |
| 2018/0268506 A1* | 9/2018 | Wodetzki | G06K 9/628 |
| 2018/0276553 A1* | 9/2018 | Redkar | G06N 5/022 |
| 2018/0276626 A1* | 9/2018 | Laiben | G06Q 20/02 |
| 2018/0307990 A1* | 10/2018 | Chawla | G06F 16/954 |
| 2018/0365686 A1 | 12/2018 | Kondo | |
| 2018/0367528 A1 | 12/2018 | Schwarz et al. | |
| 2019/0012249 A1* | 1/2019 | Mercuri | G06Q 20/308 |
| 2019/0012595 A1* | 1/2019 | Beser | H04L 9/3239 |
| 2019/0019090 A1 | 1/2019 | Chacko et al. | |
| 2019/0028276 A1 | 1/2019 | Pierce et al. | |
| 2019/0034404 A1* | 1/2019 | Anderson | G06Q 40/025 |
| 2019/0035018 A1 | 1/2019 | Nolan et al. | |
| 2019/0050855 A1 | 2/2019 | Martino et al. | |
| 2019/0052454 A1* | 2/2019 | Wright | H04L 9/14 |
| 2019/0058709 A1 | 2/2019 | Kempf et al. | |
| 2019/0081796 A1* | 3/2019 | Chow | H04L 9/30 |
| 2019/0086988 A1* | 3/2019 | He | G06N 20/00 |
| 2019/0087598 A1 | 3/2019 | Adkins et al. | |
| 2019/0087892 A1 | 3/2019 | Pinski et al. | |
| 2019/0102409 A1 | 4/2019 | Shi et al. | |
| 2019/0102423 A1 | 4/2019 | Little et al. | |
| 2019/0109702 A1* | 4/2019 | Maggu | G06Q 20/06 |
| 2019/0109713 A1 | 4/2019 | Clark et al. | |
| 2019/0122186 A1 | 4/2019 | Kano et al. | |
| 2019/0147532 A1* | 5/2019 | Singh | G06N 20/00 705/35 |
| 2019/0149325 A1 | 5/2019 | Garagiola et al. | |
| 2019/0149334 A1 | 5/2019 | Velden | |
| 2019/0158270 A1 | 5/2019 | Berti | |
| 2019/0164156 A1 | 5/2019 | Lindemann | |
| 2019/0164220 A1* | 5/2019 | Raj | G06Q 40/04 |
| 2019/0172282 A1 | 6/2019 | Patel | |
| 2019/0182047 A1 | 6/2019 | Andreina et al. | |
| 2019/0188706 A1* | 6/2019 | McCurtis | G06Q 20/02 |
| 2019/0215149 A1* | 7/2019 | Ramasamy | H04L 67/1012 |
| 2019/0228006 A1* | 7/2019 | Tormasov | H04L 9/3239 |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0238525 A1 | 8/2019 | Padmanabhan et al. | |
| 2019/0287026 A1* | 9/2019 | Calmon | H04L 9/3239 |
| 2019/0287116 A1 | 9/2019 | Karantzis | |
| 2019/0295114 A1* | 9/2019 | Pavletic | G06N 3/08 |
| 2019/0303121 A1 | 10/2019 | Padmanabhan | |
| 2019/0303445 A1 | 10/2019 | Padmanabhan | |
| 2019/0303579 A1* | 10/2019 | Reddy | G06F 21/57 |
| 2019/0334716 A1* | 10/2019 | Kocsis | H04L 63/0442 |
| 2019/0370634 A1* | 12/2019 | Ferreira Moreno | G06N 20/00 |
| 2019/0370866 A1 | 12/2019 | Lawbaugh et al. | |

(56) References Cited

U.S. PATENT DOCUMENTS

| | | | |
|---|---|---|---|
| 2019/0377806 A1 | 12/2019 | Padmanabhan et al. | |
| 2019/0385160 A1 | 12/2019 | Safak et al. | |
| 2019/0386834 A1 | 12/2019 | Furukawa | |
| 2020/0019923 A1* | 1/2020 | Santhar | G06Q 10/087 |
| 2020/0027005 A1* | 1/2020 | Harrison | G06N 7/005 |
| 2020/0027090 A1 | 1/2020 | Braundmeier | |
| 2020/0042939 A1 | 2/2020 | Padmanabhan | |
| 2020/0074477 A1 | 3/2020 | Lamba et al. | |
| 2020/0074515 A1* | 3/2020 | Ghatage | G06F 16/35 |
| 2020/0076574 A1 | 3/2020 | Austin et al. | |
| 2020/0089672 A1 | 3/2020 | Velisetti et al. | |
| 2020/0089895 A1* | 3/2020 | Gollogly | H04L 9/0637 |
| 2020/0104636 A1* | 4/2020 | Halevi | G06K 9/6228 |
| 2020/0118011 A1* | 4/2020 | Kaiser | G06Q 10/0631 |
| 2020/0143267 A1* | 5/2020 | Gidney | H04L 63/123 |
| 2020/0186338 A1 | 6/2020 | Andon et al. | |
| 2020/0252406 A1 | 8/2020 | Padmanabhan et al. | |
| 2020/0336475 A1 | 10/2020 | Padmanabhan et al. | |
| 2020/0344132 A1 | 10/2020 | Padmanabhan | |
| 2020/0357084 A1 | 11/2020 | Hunn et al. | |
| 2021/0152535 A1 | 5/2021 | Padmanabhan et al. | |
| 2021/0152536 A1 | 5/2021 | Padmanabhan et al. | |

FOREIGN PATENT DOCUMENTS

| | | | | |
|---|---|---|---|---|
| CN | 2019800219289 | | 9/2020 | |
| EP | 197071681 | | 8/2020 | |
| JP | 2020541893 | | 7/2020 | |
| WO | 2016161073 | A1 | 10/2016 | |
| WO | 2018007827 | A1 | 1/2018 | |
| WO | 2018007828 | A2 | 1/2018 | |
| WO | WO-2018194707 | A1 * | 10/2018 | G06F 21/57 |
| WO | 2018230581 | A1 | 12/2018 | |
| WO | 2019152750 | A1 | 8/2019 | |

OTHER PUBLICATIONS

"BigchainDB 2.0 The Blockchain Database," Berlin Germany dated May 2018, 14 pages.
Azaria, A., et al "MedRec: Using Blockchain for Medical Data Access and Permission Management," 2016 2nd Int'l Conference on Open and Big Data, IEEE, (Aug. 22, 2016), pp. 25-30.
Genestier, P., et al., "Blockchain for Consent Management in the eHealth Environment: A Nugget for Privacy and Security Challenges," Journal of the Int'l Society for Telemedicine and eHealth, (Jan. 1, 2017), 4 pages.
International Search Report and Written Opinion for Application No. PCT/US2019/036103, dated Aug. 1, 2019, 12 pages.
International Search Report and Written Opinion for International Patent Application No. PCT/US2019/016199, dated Apr. 2, 2019, 12 pages.
McConaghy et al., "BigchainDB: A Scalable Blockchain Database (DRAFT)" dated Jun. 8, 2016.
Notice of Allowance for U.S. Appl. No. 15/932,100 dated Feb. 20, 2020, 5 pages.
Notice of Allowance for U.S. Appl. No. 15/940,646, dated Oct. 31, 2019, 8 pages.
Office Action for U.S. Appl. No. 15/885,803 Jan. 8, 2020, 47 pages.
Office Action for U.S. Appl. No. 15/885,811 dated Jan. 17, 2020, 40 pages.
Office Action for U.S. Appl. No. 15/932,092 dated Jan. 22, 2020, 36 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Office Action for U.S. Appl. No. 15/932,099, dated Oct. 3, 2019, 26 pages.
Ojha, "Chaincode for Go Developers, Part 1: Writing Blockchain Chaincode in Go for Hyperledger Fabric v0.6," 2017, 15 pages.

Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.
Salesforce, "Force.com Apex Code Developer's Guide," version 34.0, 2015, 1000 pages.
Sandgaard, J., et al, "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/2017020202304/https://en.wikipeida.org/wiki/Solidity (Year: 2017), 3 pages.
Zyskind, G., et al, "Decentralizing Privacy: Using Blockchain to Protect Personal Data," 2015 IEEE Security and Privacy Workshops (May 1, 2015), 5 pages.
"Deloitte IoT Powered by Blockchain", dated May 2017, 20 pages.
"How Creating Digital Twins in Blockchain Will Protect Brands?", dated Nov. 15, 2018, 4 pages.
"How Smart Certificates of Authenticity Improve Asset Management", Jan. 17, 2019, 4 pages.
"Nasdaq, Using Blockchain Track Assets Proof Ownership", dated Nov. 30, 2016, 30 pages.
Final Office Action for U.S. Appl. No. 15/885,803, dated Jul. 20, 2020, 29 pages.
Final Office Action for U.S. Appl. No. 15/885,811, dated Aug. 5, 2020, 45 pages.
Final Office Action for U.S. Appl. No. 15/932,092 dated Jun. 22, 2020, 42 pages.
Final Office Action for U.S. Appl. No. 15/932,099 dated Jun. 1, 2020, 26 pages.
International Search Report and Written Opinion for Application No. PCT/US2020/01561B dated May 11, 2020, 13 pages.
Notice of allowance for U.S. Appl. No. 16/264,653 dated Nov. 23, 2020, 16 pages.
Office Action for U.S. Appl. No. 16/177,305 dated Jul. 23, 2020, 41 pages.
Office Action for U.S. Appl. No. 16/264,657, dated Sep. 18, 2020, 33 pages.
Office Action for U.S. Appl. No. 16/683,945 dated Sep. 14, 2020, 26 Pages.
Office Action for EP Application No. 19707168.1 dated Sep. 24, 2020, 3 pages.
U.S. Appl. No. 17/153,872, filed Jan. 20, 2021, Prithvi Krishnan Padmanabhan.
U.S. Appl. No. 17/163,547, filed Jan. 31, 2021, Prithvi Krishnan Padmanabhan.
U.S. Appl. No. 17/348,286, filed Jun. 15, 2021, Prithvi Krishnan Padmanabhan.
Bendor-Samuel, P. (2017) Blockchain-enabled "smart-contracts" solve problems in administering IT ecosystem services, CIO, 3 pages.
Final Office Action for U.S. Appl. No. 15/932,099 dated Jun. 1, 2020, 27 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Non-final Office Action for U.S. Appl. No. 16/177,305 dated Jul. 23, 2020, 52 pages.
Normans Media Ltd., Smart Contracts: Blockchain-based contracts that don't require lawyers. 2016, 4 pages.
Notice of Allowance for U.S. Appl. No. 16/264,653 dated Jun. 7, 2021, 21 pages.
Notice of Allowance for U.S. Appl. No. 16/683,945, dated Feb. 10, 2021, 14 pages.

(56) References Cited

OTHER PUBLICATIONS

Office Action for U.S. Appl. No. 15/885,803, dated Apr. 14, 2021, 31 pages.
Office Action for U.S. Appl. No. 15/932,092 dated Mar. 17, 2021, 23 pages.
Office Action for U.S. Appl. No. 16/683,945, dated Sep. 14, 2020, 18 pages.
Shukla, A., et al., "Smart Contracts for Multiagent Plan Execution in Untrusted Cyber-physical Systems," 2018 IEEE 25th International Conference on High Performance Computing Workshops (HiPCW), 10 pages.

* cited by examiner

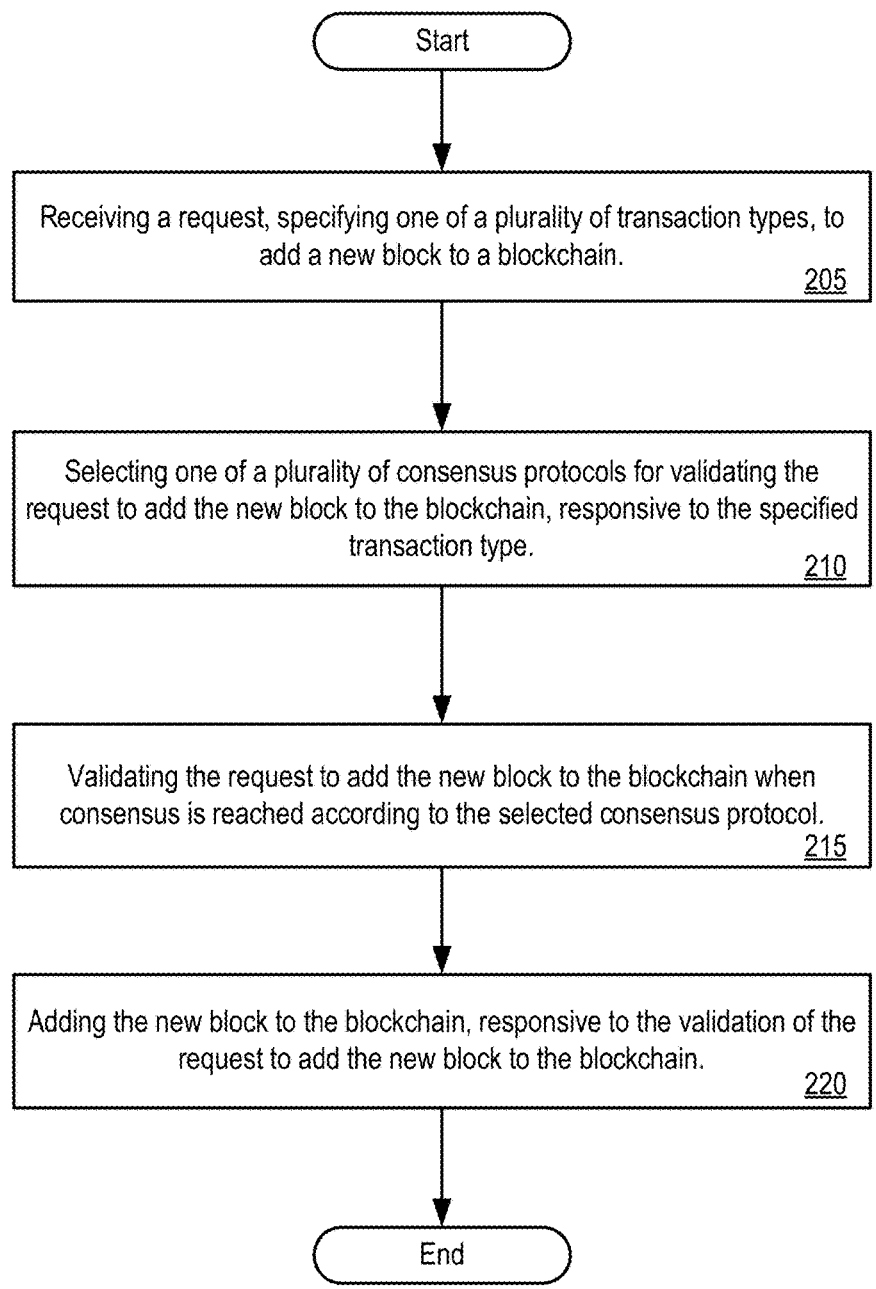

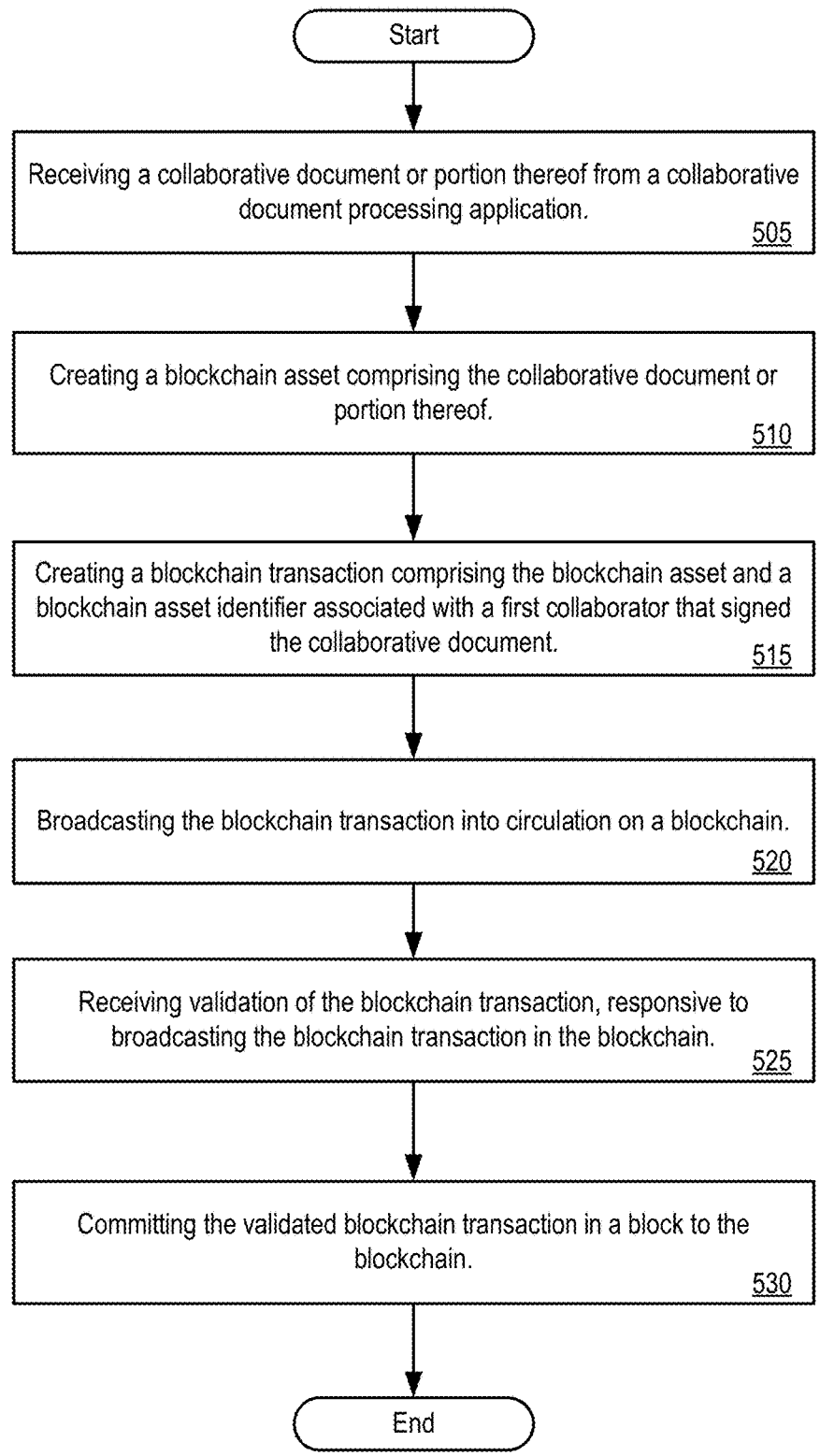

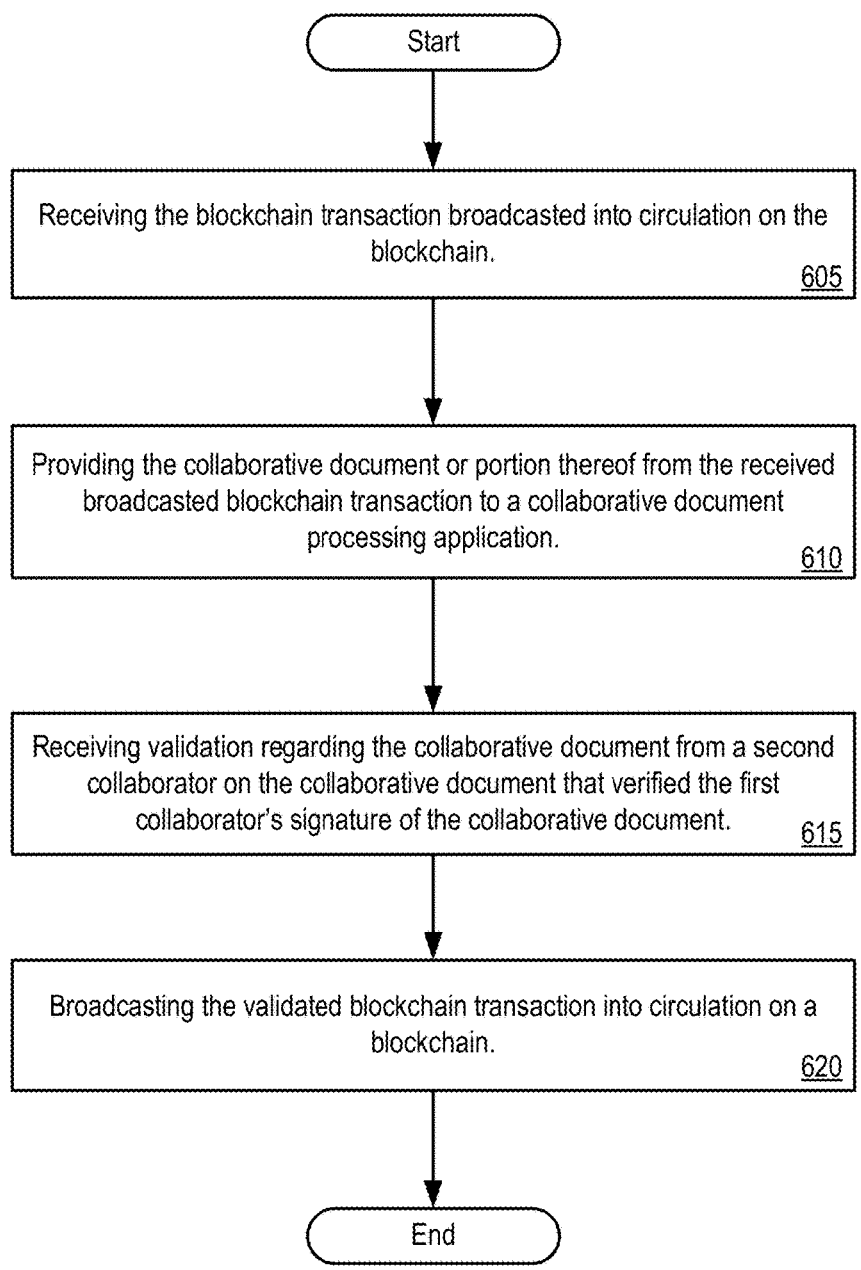

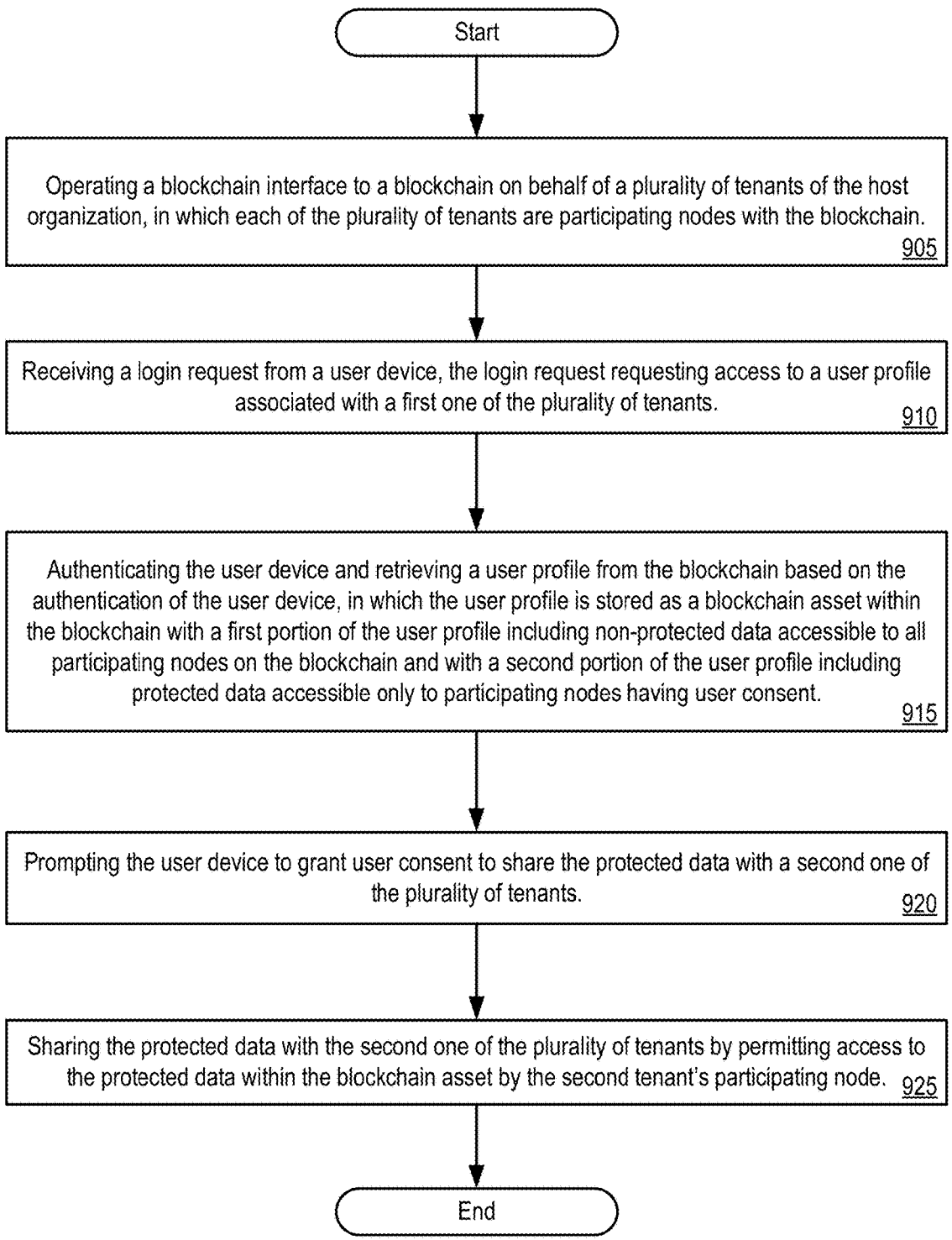

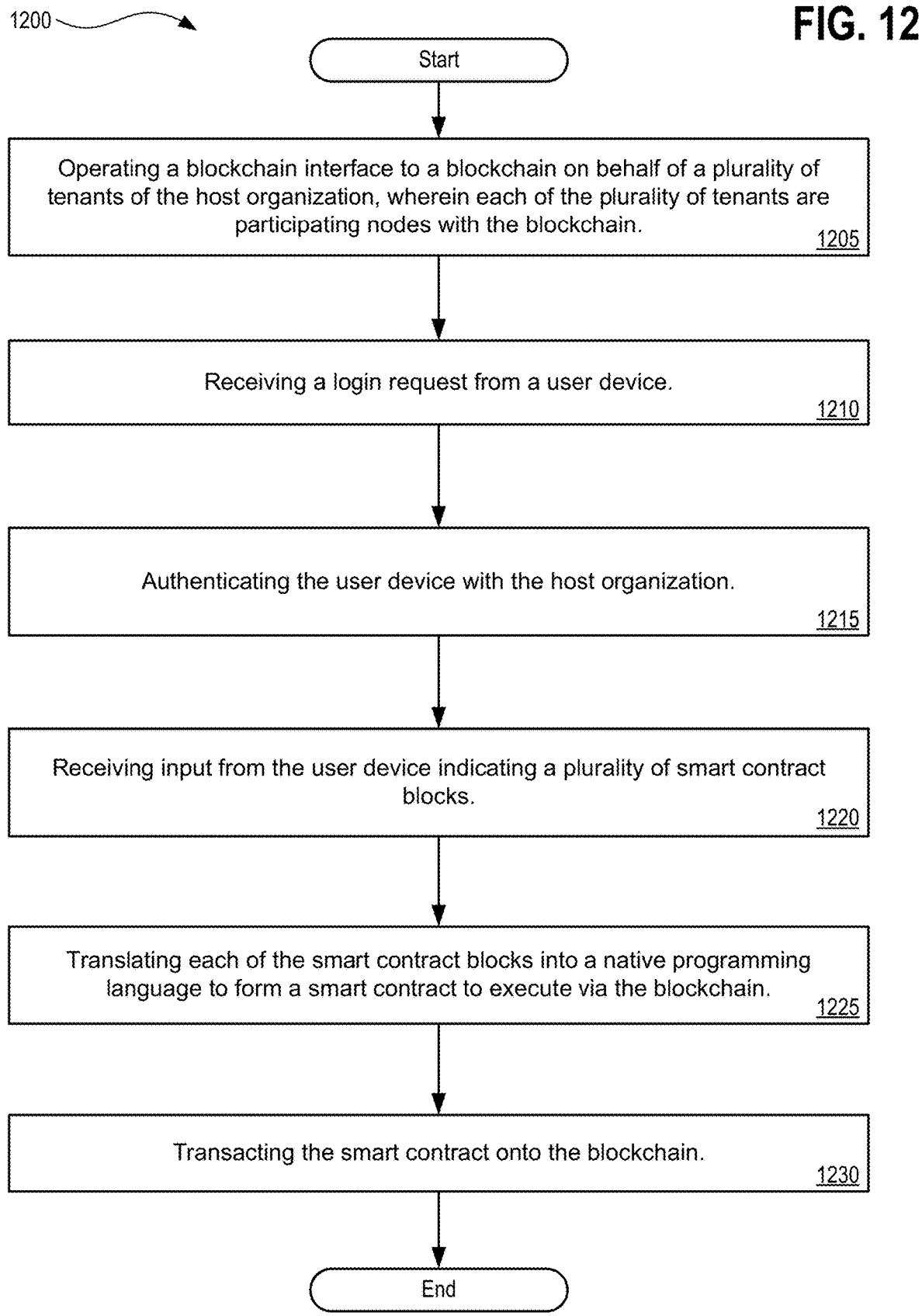

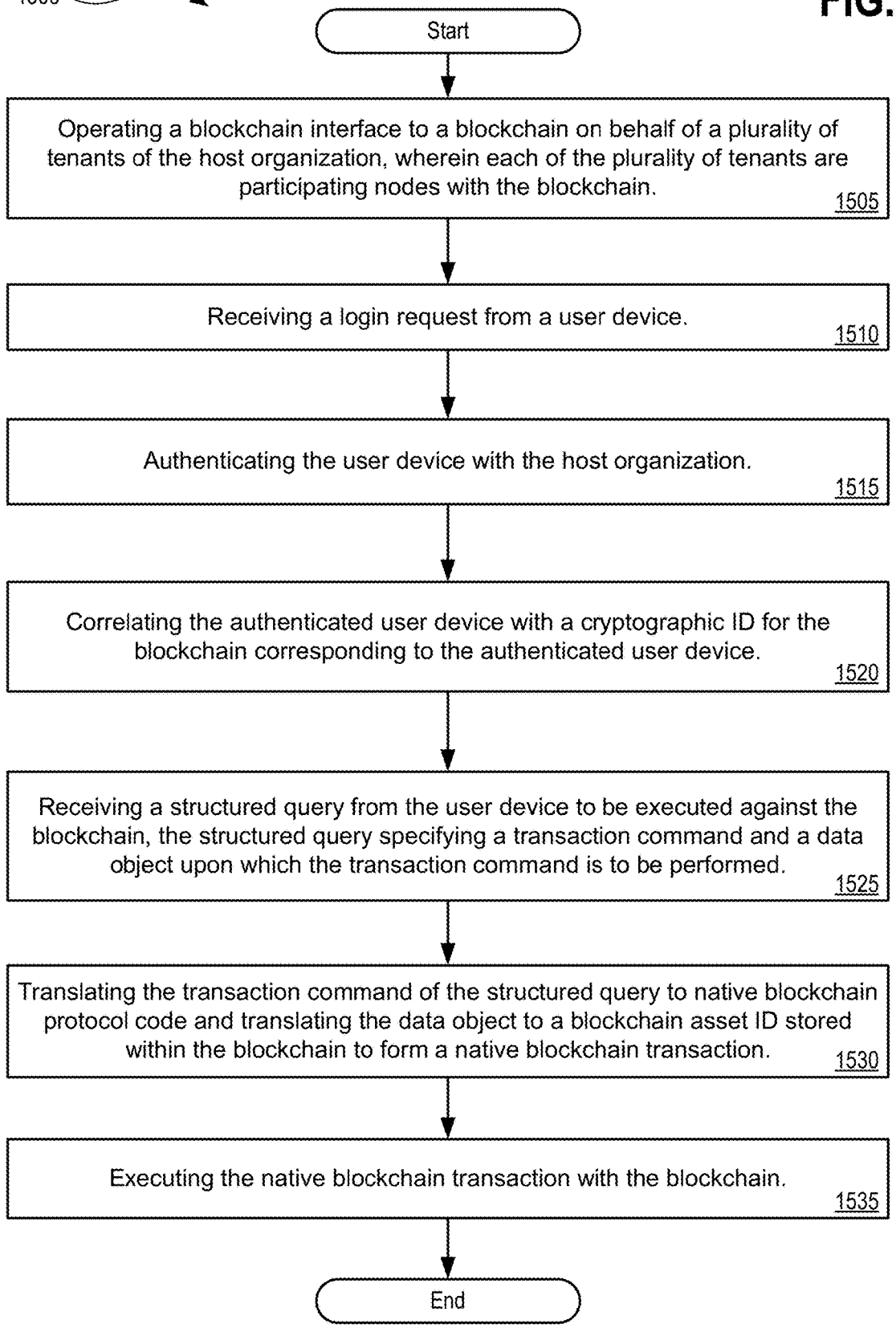

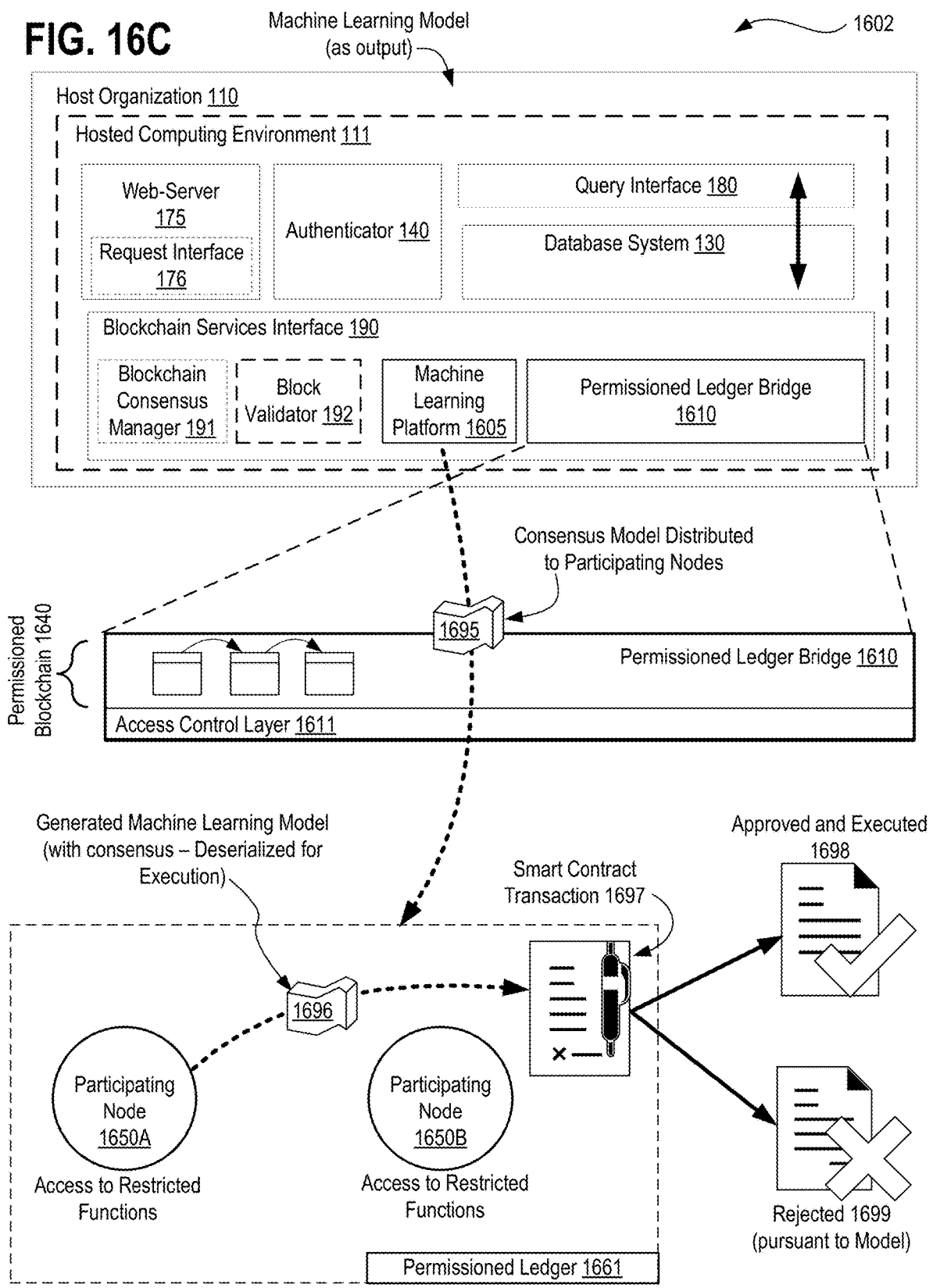

SYSTEMS, METHODS, AND APPARATUSES FOR IMPLEMENTING MACHINE LEARNING MODELS FOR SMART CONTRACTS USING DISTRIBUTED LEDGER TECHNOLOGIES IN A CLOUD BASED COMPUTING ENVIRONMENT

CLAIM OF PRIORITY

This United States Continuation In Part (CIP) patent application is related to, and claims priority to, the non-provisional U.S. Utility Patent Application entitled "SYSTEMS, METHODS, AND APPARATUSES FOR IMPLEMENTING SMART FLOW CONTRACTS USING DISTRIBUTED LEDGER TECHNOLOGIES INA CLOUD BASED COMPUTING ENVIRONMENT," filed Jan. 31, 2018, having an application number of Ser. No. 15/932,092, the entire contents of each being incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology. More particularly, disclosed embodiments relate to systems, methods, and apparatuses for implementing intelligent consensus, smart consensus, and weighted consensus models for distributed ledger technologies in a cloud based computing environment. Other embodiments relate to systems, methods, and apparatuses for implementing document interface and collaboration using Quipchain in a cloud based computing environment. Still other embodiments relate to systems, methods, and apparatuses for implementing super community and community sidechains with consent management for distributed ledger technologies in a cloud based computing environment. Further embodiments relate to systems, methods, and apparatuses for implementing a virtual chain model for distributed ledger technologies in a cloud based computing environment. Additional embodiments relate to systems, methods, and apparatuses for implementing smart flow contracts using distributed ledger technologies in a cloud based computing environment. Additional embodiments relate to systems, methods, and apparatuses for implementing machine learning models for smart contracts using distributed ledger technologies in a cloud based computing environment. Such embodiments may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days, transfers involve fee payments to multiple intermediaries, and reconciliation can involve expensive overhead, it may be difficult to find out the status of a pending transfer or the current owner of an asset, transfers may not complete, and it may be difficult to make one transfer conditional on another, the complexity of the such systems makes it difficult to prevent fraud or theft, and, whether transactions are reversible depends on the transfer mechanism, rather than the business requirements of the transacting party.

Many of these problems can be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity already occurs within restricted networks of financial institutions. A shared ledger operated within this network can take advantage of blockchain technology without sacrificing the efficiency, security, privacy, and flexibility needed by financial institutions.

The present state of the art may therefore benefit from the systems, methods, and apparatuses for improving upon, modifying, and expanding upon distributed ledger technologies and providing such capabilities via an on-demand cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 depicts a flow diagram illustrating a method for implementing a distributed ledger technology method, in accordance with described embodiments;

FIG. 5 depicts a flow diagram illustrating a method for implementing document interface and collaboration using quipchain in a cloud based computing environment, in accordance with described embodiments;

FIG. 6A depicts a flow diagram illustrating a method for implementing a distributed ledger technology method, in accordance with described embodiments;

FIG. 9 depicts a flow diagram illustrating a method for implementing Super community and community sidechains with consent management for distributed ledger technologies in a cloud based computing environment, in accordance with described embodiments;

FIG. 12 depicts a flow diagram illustrating a method for implementing smart flow contracts using distributed ledger technologies in a cloud based computing environment, in accordance with described embodiments;

FIG. 15 depicts a flow diagram illustrating a method for implementing a virtual chain model for distributed ledger technologies in a cloud based computing environment, in accordance with described embodiments;

FIG. 16C depicts another exemplary architecture, with additional detail of a permissioned blockchain which implements machine learning models for smart contracts using distributed ledger technologies in a cloud based computing environment, in accordance with described embodiments;

DETAILED DESCRIPTION

Figure 1A:
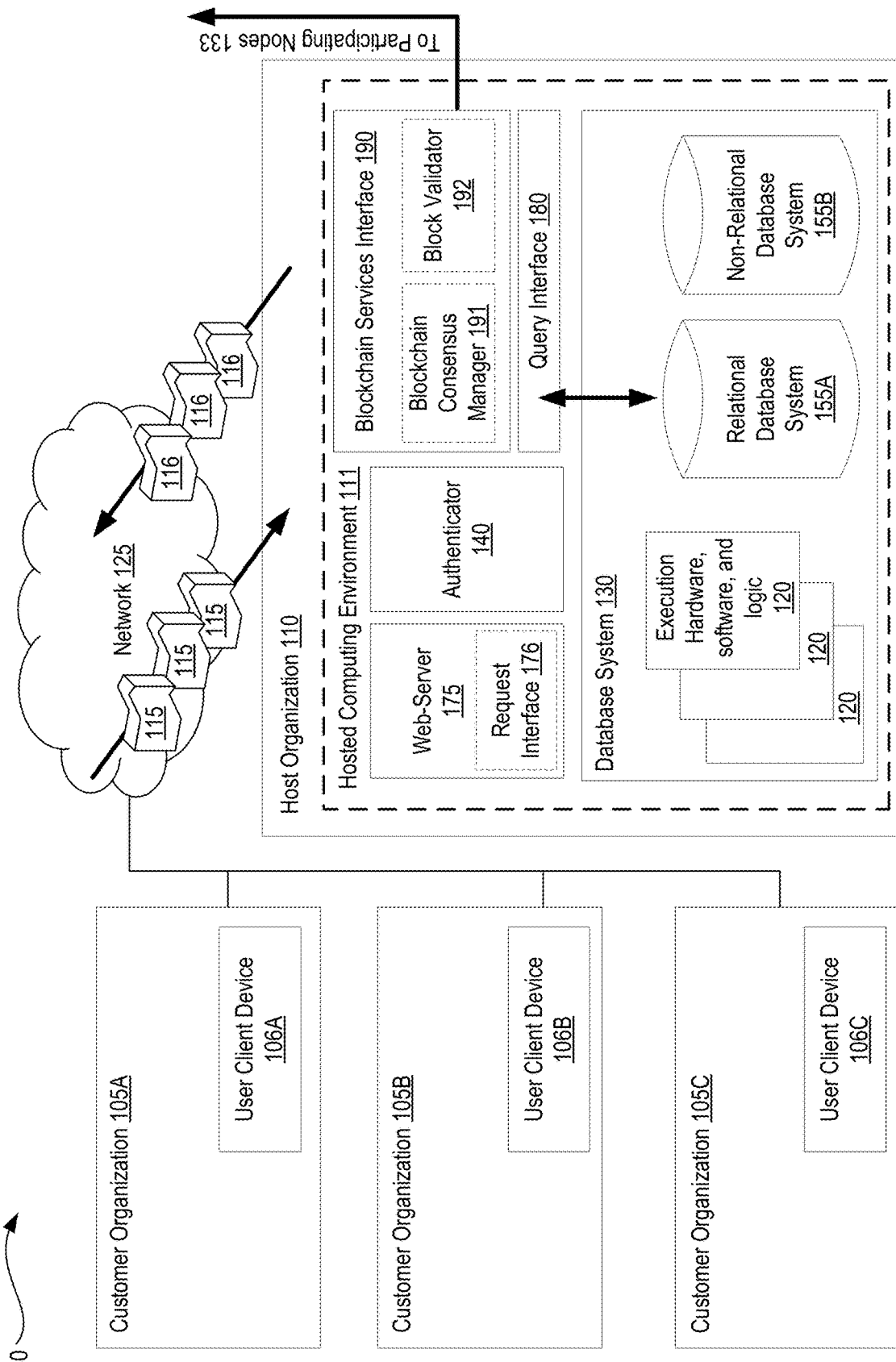
FIG. 1A depicts an exemplary architecture in accordance with described embodiments.

Described herein are systems, methods, and apparatuses for implementing distributed ledger technology in a cloud based computing environment.

For instance, according to a particular embodiment, distributed ledger technology contemplates a distributed ledger technology host, or a blockchain platform host, in a peerto-peer network, the host having at least a processor and a memory therein, receiving a request to add a new block to a blockchain, the new block comprising a plurality of transactions, the request specifying one of a plurality of transaction types. The host selects one of a plurality of consensus protocols for validating the request to add the new block to the blockchain, responsive to the specified transaction type. The host then validates the request to add the new block to the blockchain when consensus is reached according to the selected consensus protocol. Finally, the host adds the new block of the blockchain, responsive to the validation of the request to add the new block to the blockchain.

According to another embodiment, there is a distributed ledger technology platform host, having at least a processor and a memory therein, in which the platform host is to receive a collaborative document or portion thereof from a collaborative document processing application, create a blockchain asset comprising the collaborative document or portion thereof, create a blockchain transaction comprising the blockchain asset and a blockchain asset identifier associated with a first collaborator that signed the collaborative document, broadcast the blockchain transaction into circulation on a blockchain, receive validation of the blockchain transaction, responsive to broadcasting the blockchain transaction in the blockchain, and commit the validated blockchain transaction in a block to the blockchain.

According to another embodiment, there is a system having at least a processor and a memory therein executing within a host organization and having therein: means for operating a blockchain interface to a blockchain on behalf of a plurality of tenants of the host organization, in which each one of the plurality of tenants operate as a participating node with access to the blockchain; receiving historical data from each of the participating nodes on the blockchain, in which the historical data represents historical smart contract transactions on the blockchain for customers of the plurality of tenants and further in which each of the participating nodes provides different historical data; generating a new machine learning model at the host organization by inputting the historical data received from the participating nodes into a neural network of a machine learning platform operating at the host organization; receiving a consensus agreement from the plurality of participating nodes on the blockchain to apply the new machine learning model to smart contract transactions executed via the blockchain; deploying the new machine learning model to the participating nodes as a component of a smart contract to be executed in fulfillment of the smart contract transactions; receiving a transaction at the blockchain and responsively triggering the smart contract to process the transaction onto the blockchain as a new smart contract transaction; and executing the smart contract and executing the new machine learning model as part of the smart contract to determine whether the transaction is valid in fulfillment of processing the transaction onto the blockchain.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 150 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 150 of the database system 130 are separate and distinct from the customer organizations (105A, 105B, and 105C) which utilize web services and other service offerings as provided by the host organization 110 by communicably interfacing to the host organization 110 via network 155. In such a way, host organization 110 may implement on-demand services, on-demand database services or cloud computing services to subscribing customer organizations 105A-C.

Further depicted is the host organization 110 receiving input and other requests 115 from customer organizations 105A-C via network 155 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user client device 106A-C or machine originating such data requests 115.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 and a block validator 192. Blockchain services interface 190 communicatively interfaces the host organization 110 with other participating nodes 133 (e.g., via the network 155) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system can be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers can exploit. Likewise, it has no central point of failure.

Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing it, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority should be considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless, of the semantics, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications can be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
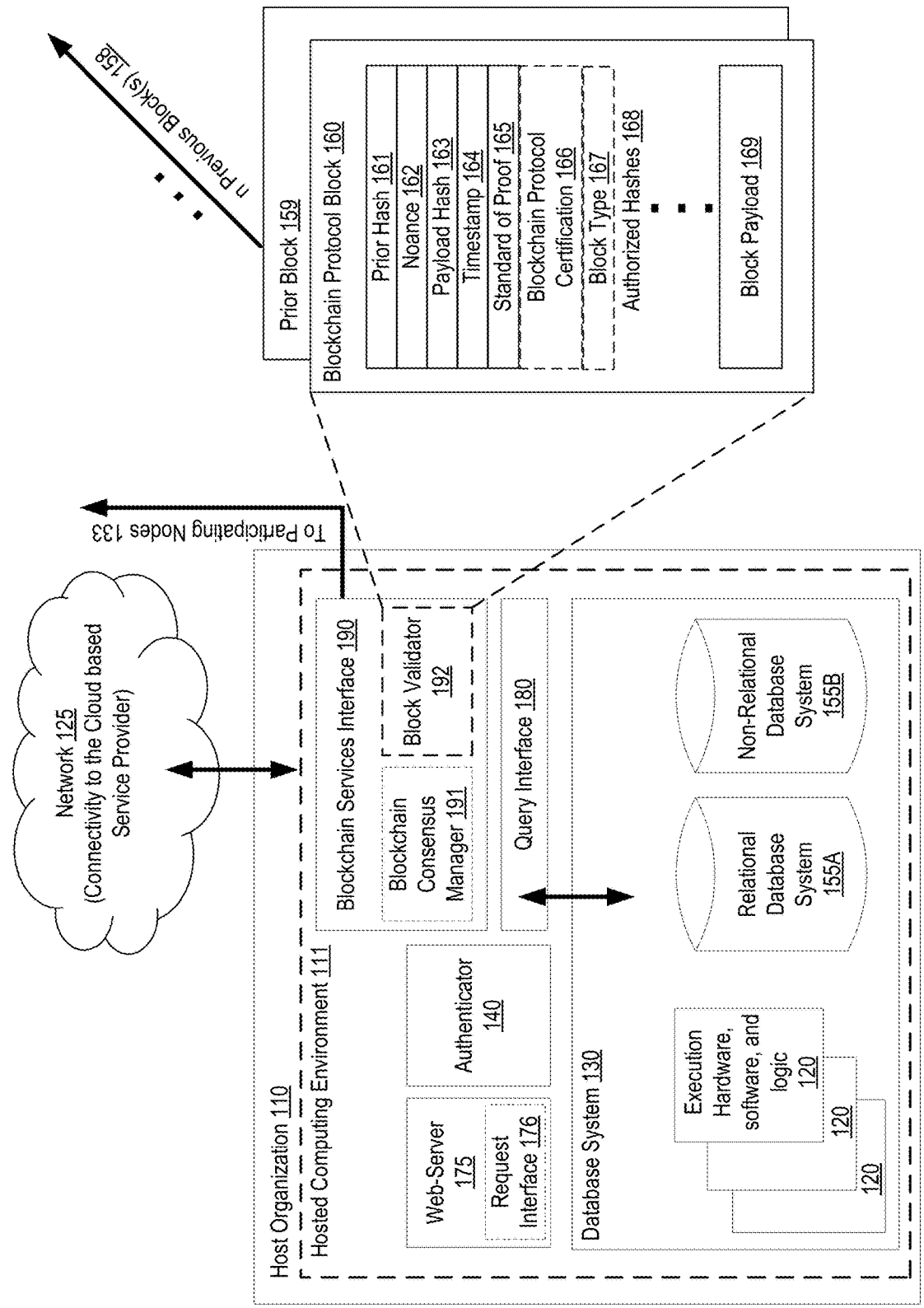
FIG. 1B depicts another exemplary architecture, with additional detail of a blockchain protocol block 160, in accordance with described embodiments.

FIG. 1B depicts another exemplary architecture 101, with additional detail of a blockchain protocol block 160, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

The prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 162 provides a hash of the data stored within the block payload 169 portion of the blockchain protocol block 160 and need not meet any specific standard of proof 165. However, the payload hash is included as part of the input when the hash is calculated for the purpose of storing as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 1C:
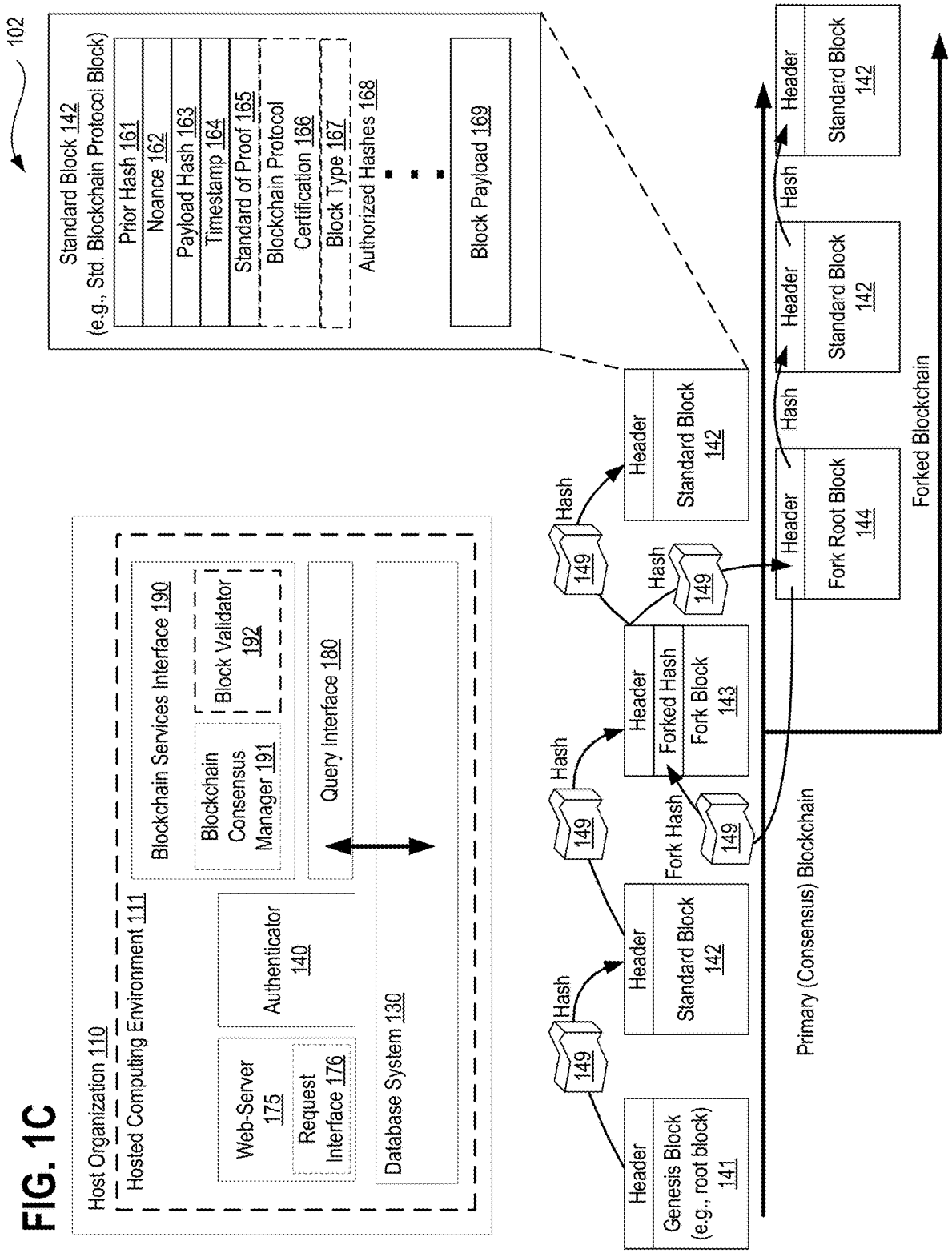
FIG. 1C depicts another exemplary architecture, with additional detail of a blockchain and a forked blockchain, in accordance with described embodiments.

FIG. 1C depicts another exemplary architecture 102, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary block chain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing potentially valid primary blockchains. Once consensus is reached (typically after one or two cycles and new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 1D:
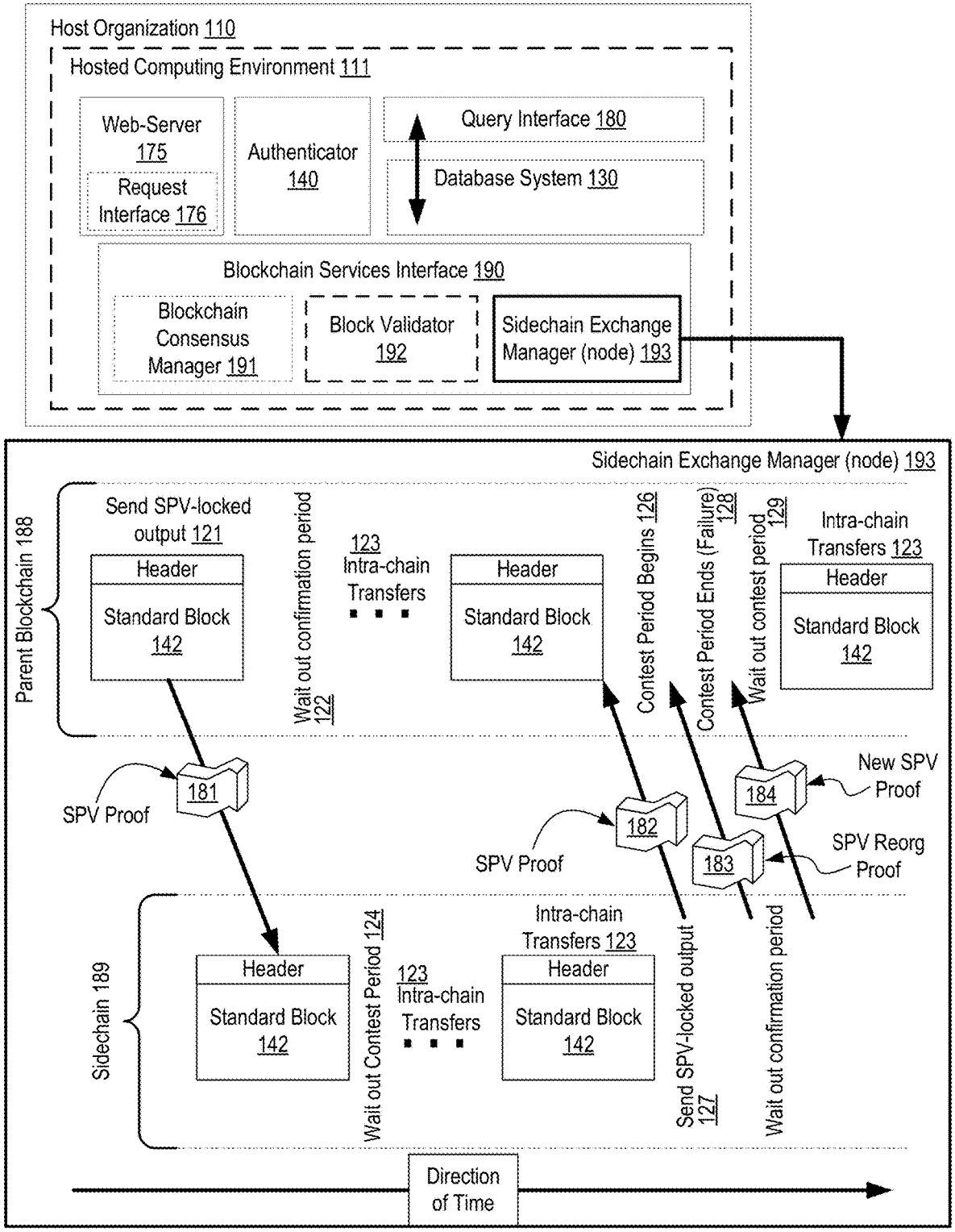
FIG. 1D depicts another exemplary architecture with additional detail for sidechains, in accordance with described embodiments.

FIG. 1D depicts another exemplary architecture 103 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain. Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange tokens, value, or other payload information between them.

As shown here, the sidechain exchange manager 193 of the host organization may send a parent chain asset as an output of the parent blockchain 188 at operation 151.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a confirmation period 152. The confirmation period of a transfer between chains may be a duration for which a coin, token, or other exchanged value is locked on the parent blockchain 188 before may successfully be transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 154, during which time the transfer will be invalidated if a reorganization proof 183 associated with the parent blockchain 188 asset is detected in the parent blockchain.

The contest period at operation 154 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization.

If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 153 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 193 of the host organization 110, may validate the SPV proof 182 associated with the sidechain asset at operation 156. The validated the SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 156, during which a release of the parent chain asset is denied at operation 158 if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 159. The parent blockchain 188 asset may be released if no reorganization proof associated with the sidechain asset is detected during the third predetermined contest period, after which the parent chain asset is free to be transferred within the parent chain via the depicted intra-chain transfers 153 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs should be sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions would necessarily be placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers can be unwound (e.g., transferred back) correctly.

According to certain embodiments, the duration of the contest period could be made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

Figure 3:
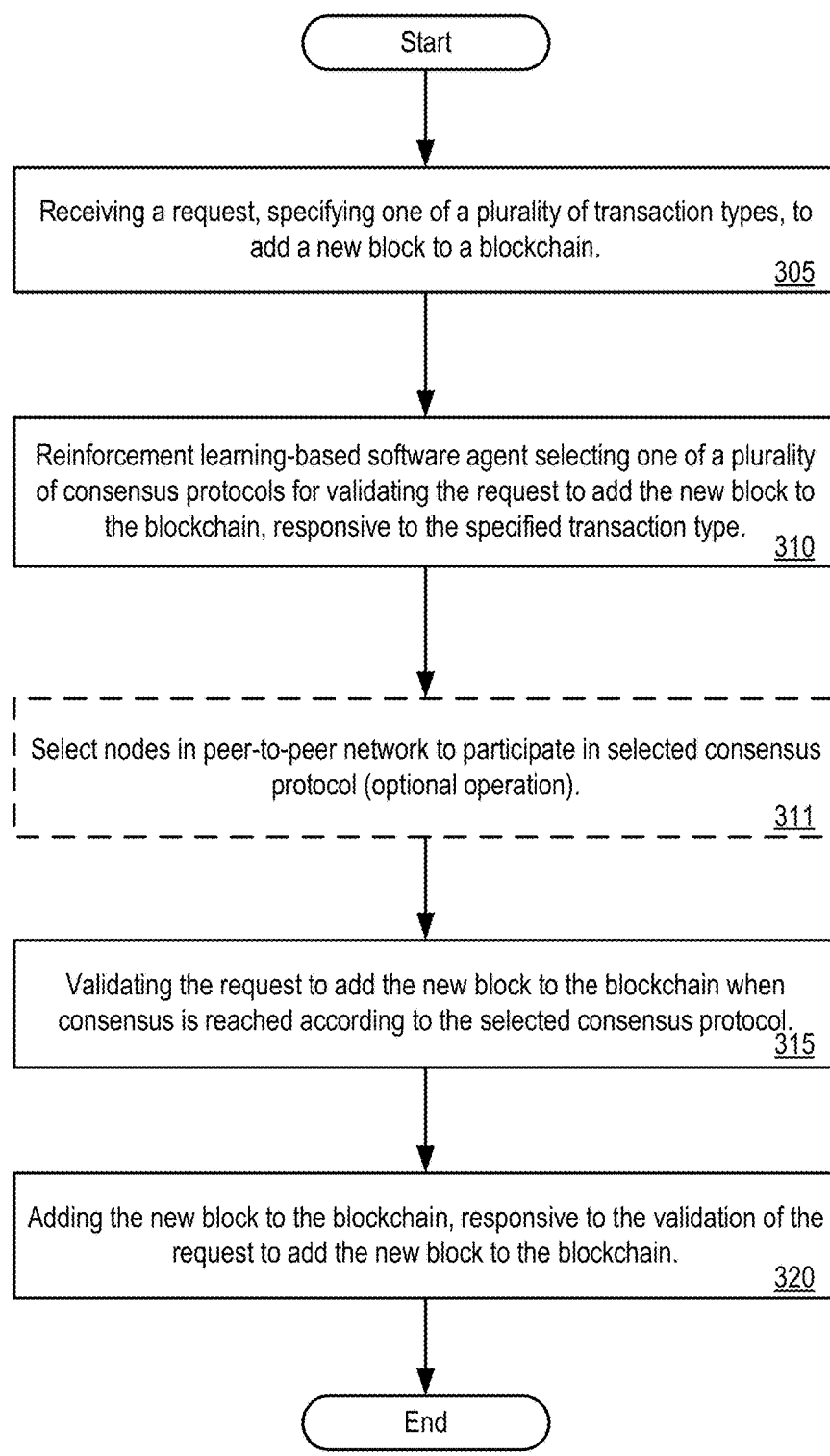
FIG. 3 depicts a flow diagram illustrating a method for implementing intelligent consensus, smart consensus, and weighted consensus models for distributed ledger technologies in a cloud based computing environment, in accordance with described embodiments.
Figure 4:
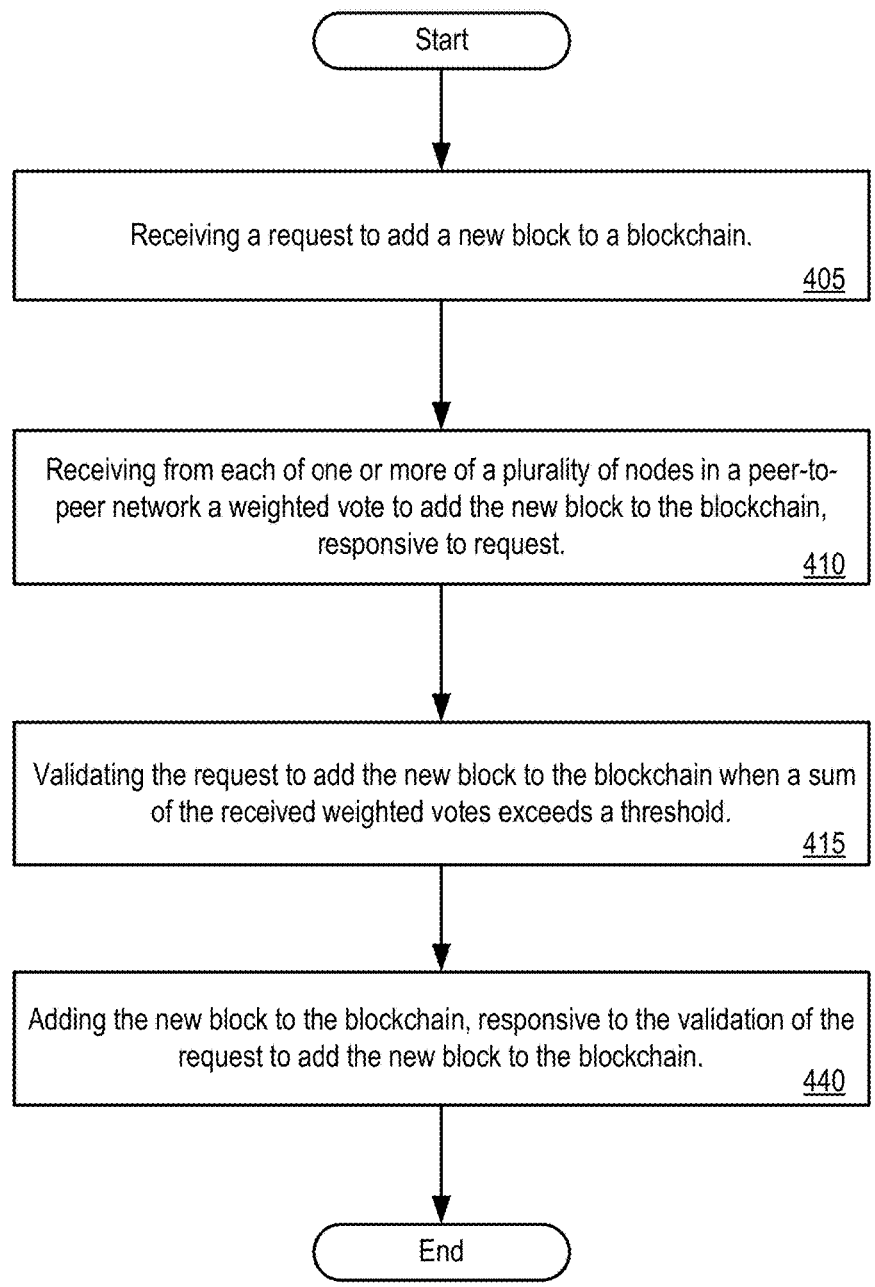
FIG. 4 depicts a flow diagram illustrating a method for implementing a distributed ledger technology method, in accordance with described embodiments.

FIGS. 2-4 depicts a flow diagram illustrating methods for implementing distributed ledger technology in embodiments of the invention. In the embodiments, a hosted blockchain platform is provided based on one or more blockchain framework implementations, including tools for building blockchain business networks and blockchain based applications. The hosted blockchain platform may provide Blockchain as a Service (BaaS) to customers of a cloud based computing environment service provider, such as the assignee of the present patent application, so that the customers do not have to configure and set up a working blockchain and consensus models, including the attendant hardware and software. The described methods may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, its database system 130 as depicted at FIG. 1A, et seq., and other systems and components as described herein may implement the described methodologies. Some of the logic blocks and/or operations listed below are optional in accordance with certain embodiments. The numbering of the logic blocks presented is for the sake of clarity and is not intended to prescribe an order of operations in which the various logic blocks must occur.

Some embodiments of the invention may operate in connection with a permissioned, or private, blockchain-based distributed ledger technology. In one embodiment, a consortium of nodes participate in the permissioned blockchain, wherein each node is operated on or by a different party in the consortium. For example, the consortium might include some number of banking or financing institutions, or insurance companies. In any case, the consortium members each communicate via their respective node with other members of the consortium to add and/or verify assets and/or transactions involving the assets to the permissioned blockchain.

In one embodiment, the nodes have access to a data store, such as a database, an on-demand database service, or a distributed database system, that maintains information about the types of assets and/or transactions that may be committed to the permissioned blockchain, herein below sometimes referred to as the transaction type database. In addition, the data store associates a consensus protocol or consensus protocol type with each transaction type. In one embodiment, one or more nodes maintains the database, while other nodes merely have read access to the database. In other embodiment, a blockchain-based distributed ledger platform host executing on, for example, an application server or cluster of application servers in a cloud computing service provider's cloud computing system, may set up and maintain the database, for example, as part of a Blockchain-as-a-Service (BaaS) application supported by the cloud computing service provider. In such an embodiment, the database is accessible to the application server(s), and the nodes in the consortium access the database by sending requests to, and receiving responses from, the blockchain platform host. In one embodiment, one or more nodes in the consortium, each represented within or as a customer organization or community of the cloud computing service, may access the database as subscribers of the cloud computing service. In some embodiments, the information in the database may be cached by the blockchain platform host, an application server, or a cluster of application servers in a cloud computing service provider's cloud computing system, for ready read-access by or on behalf of nodes in the cloud computing environment.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS.

Thus, continuing on with the example provided above, when a block or transaction therein with a particular transaction having the type "loan" is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

FIG. 2 depicts a flow diagram illustrating a method 200 for implementing a distributed ledger technology method, in accordance with described embodiments.

With reference to FIG. 2, at block 205, processing logic of a distributed ledger technology (DLT) platform host, e.g., a blockchain-based DLT platform host, or simply, a blockchain platform host, receives a request to add a new block to a blockchain. The new block typically includes a number of transactions. The request specifies a transaction type, or if no transaction type is specified, a default transaction type is assumed or applied.

In one embodiment, the request is received from one of the nodes in a peer-to-peer network that make up a consortium. In one embodiment the transaction type is specified in a blockchain protocol packet transmitted by the node. In one embodiment, the transaction type is specified in an application specific data field in a payload portion of the blockchain protocol data packet, in which case, the blockchain protocol itself is unaware of the transaction type being specified, and it is up to logic executing on the blockchain platform host to detect and decode the transaction type in the payload portion of the packet. In another embodiment, the transaction type is specified in a field in a header portion of the blockchain protocol data packet, in which case, the blockchain protocol itself is aware of the transaction type being specified.

At logic block 210, the host obtains the transaction type from the request, queries the transaction type database and returns a corresponding consensus protocol type to use in committing the block or transaction therein to the blockchain. In particular, the host searches the database for the specified transaction type, and having found the specified transaction type in a record in the database, obtains the selected consensus protocol associated with the specified transaction type from the record. This selected consensus protocol type is then communicated to the nodes in the consortium for use in for validating the request to add the new block or transaction therein to the blockchain. At logic block 215, the host validates, or receives validation of, the request to add the new block or transaction therein to the blockchain when the nodes in the consortium reach consensus according to the selected consensus protocol to add the block or transaction therein to the blockchain and communicate such to the host. Finally, at logic block 220 the host adds the validated new block or transaction therein to the blockchain.

FIG. 3 depicts a flow diagram illustrating a method 300 for implementing intelligent consensus, smart consensus, and weighted consensus models for distributed ledger technologies in a cloud based computing environment, which may operate in conjunction with the operations of the other flow diagrams as set forth herein.

According to another embodiment of the invention depicted at 300 in FIG. 3, at block 305, processing logic for a distributed ledger technology (DLT) platform host receives a request to add a new block or transaction therein to a blockchain. The new block typically includes a number of transactions. The request specifies a transaction type, or if no transaction type is specified, a default transaction type is assumed or applied.

In one embodiment, the request is received from one of the nodes in a peer-to-peer network that make up a consortium. In one embodiment the transaction type is specified in a blockchain protocol packet transmitted by the node. In this embodiment, the transaction type may specified in an application specific data field in a payload portion of the blockchain protocol data packet or in a field in a header portion of the blockchain protocol data packet. In either case, at logic block 310, the host obtains the transaction type from the request, and engages a machine learning-based software agent to select one of a number of consensus protocol types to use in committing the block or transaction therein to the blockchain based on the specified transaction type. This machine learning-based software agent may be built into the blockchain platform, blockchain platform host, cloud computing environment platform, an application server or cluster of servers in a cloud computing services platform, for example, as a layer of artificial intelligence that delivers predictions and recommendations based on various selected factors, such as business processes and consortium data. This layer of artificial intelligence may use insights to automate selection of one of a number of consensus protocol types to use in committing the block or transaction therein to the blockchain based on the specified transaction type. In one embodiment, this layer of artificial intelligence may be provided by Salesforce.com's Einstein, an artificial intelligence (AI) layer embedded in Salesforce's cloud computing services architecture.

In one embodiment, the machine learning-based software agent is a reinforcement learning-based software agent, and it selects the one of the number of consensus protocols to use for validating the request to add the new block or transaction therein to the blockchain based on one or more factors, such as the specified transaction type, or a consensus protocol selected for validating one or more previous requests to add a new block or transaction therein to the blockchain that specify the same transaction type.

The selected consensus protocol type is communicated to the nodes in the consortium for use in for validating the request to add the new block or transaction therein to the blockchain. In particular, in one embodiment, the distributed ledger technology platform host transmits a blockchain protocol packet consisting of an application specific data field in a payload portion of the blockchain protocol data packet that provides this information. In another embodiment, a field in a header portion of the blockchain protocol data packet may specify the selected consensus protocol. At logic block 315, the host validates, or receives validation of, the request to add the new block or transaction therein to the blockchain when participating nodes in the consortium reach consensus according to the selected consensus protocol to add the block or transaction therein to the blockchain and communicate such to the host. In other words, not all nodes in the consortium necessarily participate in consensus protocol. To that end, logic block 311 optionally selects which nodes in the peer-to-peer network are to participate in the selected consensus protocol before the host validates, at logic block 315, the request to add the new block or transaction therein to the blockchain based on learning that participating nodes in the consortium have reached consensus according to the selected consensus protocol to add the block or transaction therein to the blockchain. Finally, at logic block 320 the host adds the validated new block or transaction therein to the blockchain.

In one embodiment, selecting the nodes in the peer-to-peer network to participate in the selected consensus protocol may be accomplished by logic block 311 according to a rule-based set of factors, pre-defined and configured for example by the blockchain platform administrator, and/or by engaging a machine learning-based software agent that operates on the fly and over time, for example, a reinforcement learning-based software agent that automates consideration of some or all of the same rule-based factors in determining which nodes are to participate in the selected consensus protocol. Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain. Many of the above-mentioned factors could be considered concurrently, sequentially, hierarchically, or iteratively, in selecting which nodes participate in the selected consensus protocol.

Information about these factors may be communicated by and between the nodes and the blockchain platform host either within the blockchain protocol itself, for example, according to an on-chain messaging protocol, or outside of the blockchain protocol, either by way of a human or traditional (off-chain) communication protocol, a sidechain, or as application specific data or messages communicated in the payload portion of a blockchain protocol data-, control-, or message-packet. Furthermore, or alternatively, nodes may be selected to participate based on a random selection scheme, round robin scheme, weighted round robin scheme, etc.

FIG. 4 depicts a flow diagram illustrating a method 400 for implementing a distributed ledger technology method, in accordance with described embodiments.

According to another embodiment as depicted at 400 in FIG. 4, at block 405, processing logic for a blockchain platform host receives a request to add a new block or transaction therein to a blockchain. The new block typically includes a number of transactions. In one embodiment, the request is received from one of the nodes in a peer-to-peer network of nodes that make up a consortium.

At logic block 410, the host receives from each of one or more of the nodes in a peer-to-peer network a weighted vote to add the new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. At logic block 415, the host validates, or receives validation of, the request to add the new block or transaction therein to the blockchain when a sum of the received weighted votes exceeds a threshold. Finally, at logic block 420 the host adds the validated new block or transaction therein to the blockchain.

According to one embodiment of the process depicted at 400 in FIG. 4, a consortium of nodes participate in a private, or permissioned, blockchain. Each node is assigned a weight that its vote will be given, for example, based on domain (general) knowledge about the transactions, or types of transactions, the nodes can add to a new block in the blockchain. Before a node can add a transaction to a new block of the blockchain, or before the new block including the transaction can be added to the blockchain, other nodes in the consortium vote on adding the transaction to the new block for the blockchain and/or adding the new block to the blockchain. When a majority of nodes agree the transaction and/or new block should be added, the transaction and/or new block is added. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including for example, a party's participation in another blockchain or sidechain. The total weight, W, of the nodes in the consortium is equal to the sum of the individual node weights, $w_1+w_2+ \ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

According to another embodiment of methods 200, 300, and 400, receiving the request to add the new block to the blockchain comprises receiving from one of a plurality of nodes in the peer-to-peer network the request to add the transaction to the new block in the blockchain.

According to another embodiment of methods 200, 300, and 400, validating the request to add the new block to the blockchain when consensus is reached according to the selected consensus protocol comprises validating the request to add the new block to the blockchain when consensus is reached among a plurality of nodes in the peer-to-peer network according to the selected consensus protocol.

According to another embodiment of methods 200, 300, and 400, receiving the request specifying one of a plurality of transaction types comprises receiving a blockchain protocol packet consisting of one of: an application specific data field in a payload portion of the blockchain protocol data packet, and a field in a header portion of the blockchain protocol data packet, that specifies the transaction type.

According to another embodiment of methods 200, 300, and 400, selecting one of a plurality of consensus protocols for validating the request to add the new block to the blockchain, responsive to the specified transaction type, comprises: searching for the specified transaction type in a data store that associates each of the plurality of transaction types with one of the plurality of consensus protocols; and obtaining the selected consensus protocol associated with the specified transaction type, responsive to the searching.

According to another embodiment of methods 200, 300, and 400, selecting one of a plurality of consensus protocols for validating the request to add the new block to the blockchain, responsive to the specified transaction type, comprises a reinforcement learning-based software agent selecting the one of the plurality of consensus protocols for validating the request to add the new block to the blockchain, and the distributed ledger technology platform host transmitting a blockchain protocol packet consisting of one of: an application specific data field in a payload portion of the blockchain protocol data packet, and a field in a header portion of the blockchain protocol data packet, that specifies the selected one of the plurality of consensus protocols.

According to another embodiment of methods 200, 300, and 400, the reinforcement learning-based software agent selects the one of the plurality of consensus protocols for validating the request to add the new block to the blockchain based on one or more of: the specified transaction type, a consensus protocol selected for validating one or more previous requests to add a new block to the blockchain that specify the same transaction type.

According to another embodiment of methods 200, 300, and 400, validating the request to add the new block to the blockchain when consensus is reached according to the selected consensus protocol comprises validating the request to add the new block to the blockchain when consensus is reached among participating nodes of a plurality of nodes in the peer-to-peer network according to the selected consensus protocol.

According to another embodiment of methods 200, 300, and 400, validating the request to add the new block to the blockchain when consensus is reached among participating nodes of the plurality of nodes in the peer-to-peer network according to the selected consensus protocol comprises selecting the nodes in the peer-to-peer network to participate in the selected consensus protocol according to one of: a plurality of rules, and a reinforcement learning-based software agent.

According to another embodiment of methods 200, 300, and 400, one of the selected consensus protocols comprises: receiving from each of one or more of a plurality of nodes in a peer-to-peer network a weighted vote to add the new block to the blockchain, responsive to the request; and validating the request to add the new block to the blockchain when a sum of the received weighted votes exceeds a threshold.

According to a particular embodiment related to the methods 200, 300, and 400, there is a non-transitory computer readable storage media having instructions stored thereon that, when executed by a distributed ledger technology platform host, the host having at least a processor and a memory therein, cause the system to perform the following operations: receiving a request to add a new block to a blockchain, the new block including a plurality of transactions, the request specifying one of a plurality of transaction types; selecting one of a plurality of consensus protocols for validating the request to add the new block to the blockchain, responsive to the specified transaction type; validating the request to add the new block to the blockchain when consensus is reached according to the selected consensus protocol; and adding the new block to the blockchain, responsive to the validation of the request to add the new block to the blockchain.

FIG. 5 depicts a flow diagram illustrating a method 500 for implementing document interface and collaboration using quipchain in a cloud based computing environment, in accordance with described embodiments.

With reference to the flow diagram in FIG. 5, a document collaboration system that makes use of a blockchain-based distributed ledger to provide for decentralized, replicated storage of shared documents or content, thereby improving the auditability and immutability of the documents is described. At logic block 505, a distributed ledger technology (DLT) platform host, for example, a node in a blockchain-based peer-to-peer network, receives a collaborative document or portion thereof from a collaborative document processing application. In one embodiment, logic block 505 receives the collaborative document or portion thereof from a first collaborator via a user interface for a collaborative document processing application. The user interface may be provided on a client user device 106 by a desktop collaborative document processing application executing on the user client device 106 that, in turn, communicates with the DLT platform host executing in host organization 110. In another embodiment, the user interface may be provided on the client user device 106 by a web services-based collaborative document processing application executing on a hosted computing environment 111 that, in turn, communicates with the DLT platform host executing in host organization 110, either within hosted computing environment 111 or a separate hosted computing environment within host organization 110.

In one embodiment, the input regarding the collaborative document received from the first collaborator includes but is not limited to: information regarding one or more of an identifier of the first collaborator (e.g., an email address or a user login identifier); identification of one or more additional collaborators with which the first collaborator is or intends to collaborate with; a message to be exchanged between the first collaborator and the additional collaborator(s) (e.g., a comment or question about, or collaboration notes present alongside of, or version information for, a document); the document itself, or a portion thereof (e.g., a chapter, page, paragraph, clause, section, segment, etc.); the first collaborator's signature of the collaborative document; or a transaction regarding the document or the portion thereof (e.g., the first collaborator requests creating, modifying, or deleting the document, or creating, modifying, or deleting a portion thereof in the document).

The host creates, at logic block 510, a blockchain asset that includes the collaborative document or portion thereof. In addition, at logic block 515, the host creates a blockchain transaction that includes the blockchain asset and a blockchain asset identifier. In one embodiment, the blockchain asset identifier is associated with a user—a collaborator—that actually signed the collaborative document. In one embodiment, the host associates the blockchain asset identifier with information about the user obtained from the collaborative document system or cloud computing environment with which the user interacts. For example, the user may have a login, or particular cryptographic key or security information that identifies the user in the cloud computing environment and/or the collaborative document processing system.

At logic block 520, the host broadcasts the blockchain transaction into circulation on a blockchain and listens for validation of the blockchain transaction in response to broadcasting the blockchain transaction in the blockchain. At logic block 525, the host receives validation. In one embodiment, the receipt of validation of the blockchain transaction, in response to broadcasting the blockchain transaction into circulation on the blockchain involves receiving validation of the blockchain transaction from a second collaborator on the collaborative document that verified the first collaborator's signature of the collaborative document, as further described below. Thereafter, at logic block 530, the DLT host commits the validated blockchain transaction in a block to the blockchain.

According to another embodiment, method 500 further includes: receiving input regarding the collaborative document from the first collaborator via a user interface for a collaborative document processing application; and wherein the receiving of the collaborative document from the collaborative document processing application includes receiving, by the DLT host, the input regarding the collaborative document from the collaborative document processing application.

According to another embodiment of method 500, the receiving of input regarding the collaborative document from the first collaborator includes receiving input regarding one or more of an identifier of the first collaborator, identification of one or more additional collaborators, a message to be exchanged between the first collaborator and the additional collaborator(s), all or a portion of the collaborative document, the first collaborator's signature of the collaborative document, and a transaction regarding all or the portion of the collaborative document {e.g., insert, modify, delete}.

According to another embodiment of method 500, receiving validation of the blockchain transaction, responsive to broadcasting the blockchain transaction into circulation on the blockchain includes receiving validation of the blockchain transaction from a second collaborator on the collaborative document that verified the first collaborator's signature of the collaborative document.

According to another embodiment, the method 500 is further performed by a second distributed ledger technology (DLT) platform host, the second host having at least a processor and a memory therein, the method including: receiving the blockchain transaction broadcasted into circulation on the blockchain; providing the collaborative document or portion thereof from the received broadcasted blockchain transaction to a collaborative document processing application; receiving validation regarding the collaborative document from a second collaborator on the collaborative document that verified the first collaborator's signature of the collaborative document; and broadcasting the validated blockchain transaction into circulation on a blockchain.

According to another embodiment of method 500, receiving validation of the blockchain transaction, responsive to broadcasting the blockchain transaction in the blockchain, includes receiving the validation of the blockchain transaction, responsive to receiving the validated blockchain transaction broadcasted into circulation on the blockchain.

According to another embodiment of method 500, receiving validation regarding the collaborative document from a second collaborator on the collaborative document that verified the first collaborator's signature of the collaborative document includes receiving validation regarding the collaborative document from the second collaborator via a user interface for the collaborative document processing application.

According to another embodiment, the method 500 is further performed by the second DLT platform host, the method further including: receiving a second collaborative document or portion thereof from the collaborative document processing application; creating a second blockchain asset including the second collaborative document or portion thereof; creating a second blockchain transaction including the second blockchain asset and a second blockchain asset identifier associated with the second collaborator that countersigned the second collaborative document; broadcasting the second blockchain transaction into circulation on the blockchain; receiving validation of the second blockchain transaction, responsive to broadcasting the second blockchain transaction in the blockchain; and committing the validated second blockchain transaction in a second block to the blockchain.

In accordance with a particular embodiment, there is a non-transitory computer readable storage media having instructions stored thereon that, when executed by a distributed ledger technology platform host, the host having at least a processor and a memory therein, cause the system to perform the following operations: receiving a collaborative document or portion thereof from a collaborative document processing application; creating a blockchain asset including the collaborative document or portion thereof; creating a blockchain transaction including the blockchain asset and a blockchain asset identifier associated with a first collaborator that signed the collaborative document; broadcasting the blockchain transaction into circulation on a blockchain; receiving validation of the blockchain transaction, responsive to broadcasting the blockchain transaction in the blockchain; and committing the validated blockchain transaction in a block to the blockchain.

FIG. 6A depicts a flow diagram illustrating a method 600 for implementing a distributed ledger technology method, in accordance with described embodiments.

In accordance with further embodiments as described herein, and with reference to the flow diagram in FIG. 6A, at logic block 605, a second distributed ledger technology (DLT) platform host, for example, a second node in a blockchain-based peer-to-peer network, receives the above-mentioned blockchain transaction broadcast into circulation on the blockchain by logic block 520. The DLT platform host processes the broadcasted transaction, including extracting from the payload portion thereof the collaborative document or portion thereof and provides, at logic block 610, a copy of the document or portion thereof to a collaborative document processing application.

At logic block 615, the collaborative document processing application receives validation regarding the collaborative document from a second collaborator via a user interface for the collaborative document processing application. The validation on the collaborative document verifies the first collaborator's signature of the collaborative document. The collaborative document processing application communicates such to the DLT platform, which, in turn, at logic block 620, validates the corresponding blockchain transaction and broadcasts the validated blockchain transaction into circulation on a blockchain.

Figure 6B:
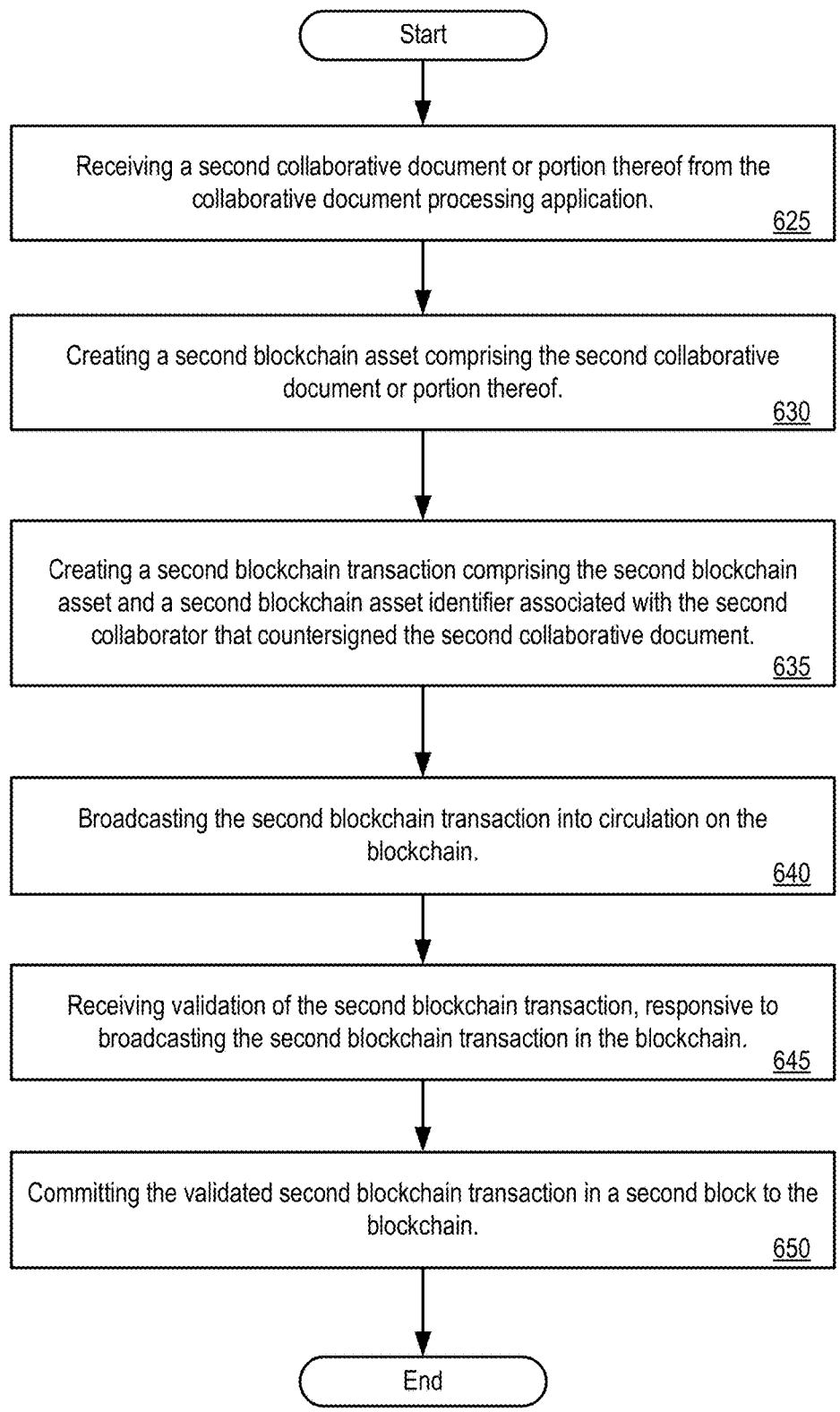
FIG. 6B depicts a flow diagram illustrating a method for implementing a distributed ledger technology method, in accordance with described embodiments.

FIG. 6B depicts a flow diagram illustrating a method 660 for implementing a distributed ledger technology method, in accordance with described embodiments.

In accordance with further embodiments as described herein, and with reference to the flow diagram in FIG. 6B, at logic block 625 the second DLT platform host, in turn, can receive a second collaborative document or portion thereof from the collaborative document processing application. For example, if the second collaborator revises the first document sent by the first collaborator (e.g., inserts, modifies, or removes content), or creates a new document relating to but independent of the first document, the collaborative document processing application provides a copy of such to the second DLT platform host. For example, the second collaborator may simply countersign the first document, creating thereby a second, countersigned document. At logic block 620, the second host creates a second blockchain asset comprising the second collaborative document or portion thereof, and at logic block 635, creates a second blockchain transaction that includes the second blockchain asset and a second blockchain asset identifier associated with the second collaborator, e.g., that countersigned the second collaborative document.

At logic block 640, the second DLT host broadcasts the second blockchain transaction into circulation on the blockchain and listens for validation of the second blockchain transaction in response to broadcasting the second blockchain transaction in the blockchain. At logic block 645, the second host receives validation. In one embodiment, the receipt of validation of the second blockchain transaction, in response to broadcasting the second blockchain transaction into circulation on the blockchain involves receiving validation of the second blockchain transaction from the first collaborator on the collaborative document that verified the second collaborator's signature of the collaborative document, in the same manner as described above with regard to logic blocks 605-620. Thereafter, at logic block 650, the second DLT host commits the validated second blockchain transaction in a block to the blockchain.

Figure 7A:
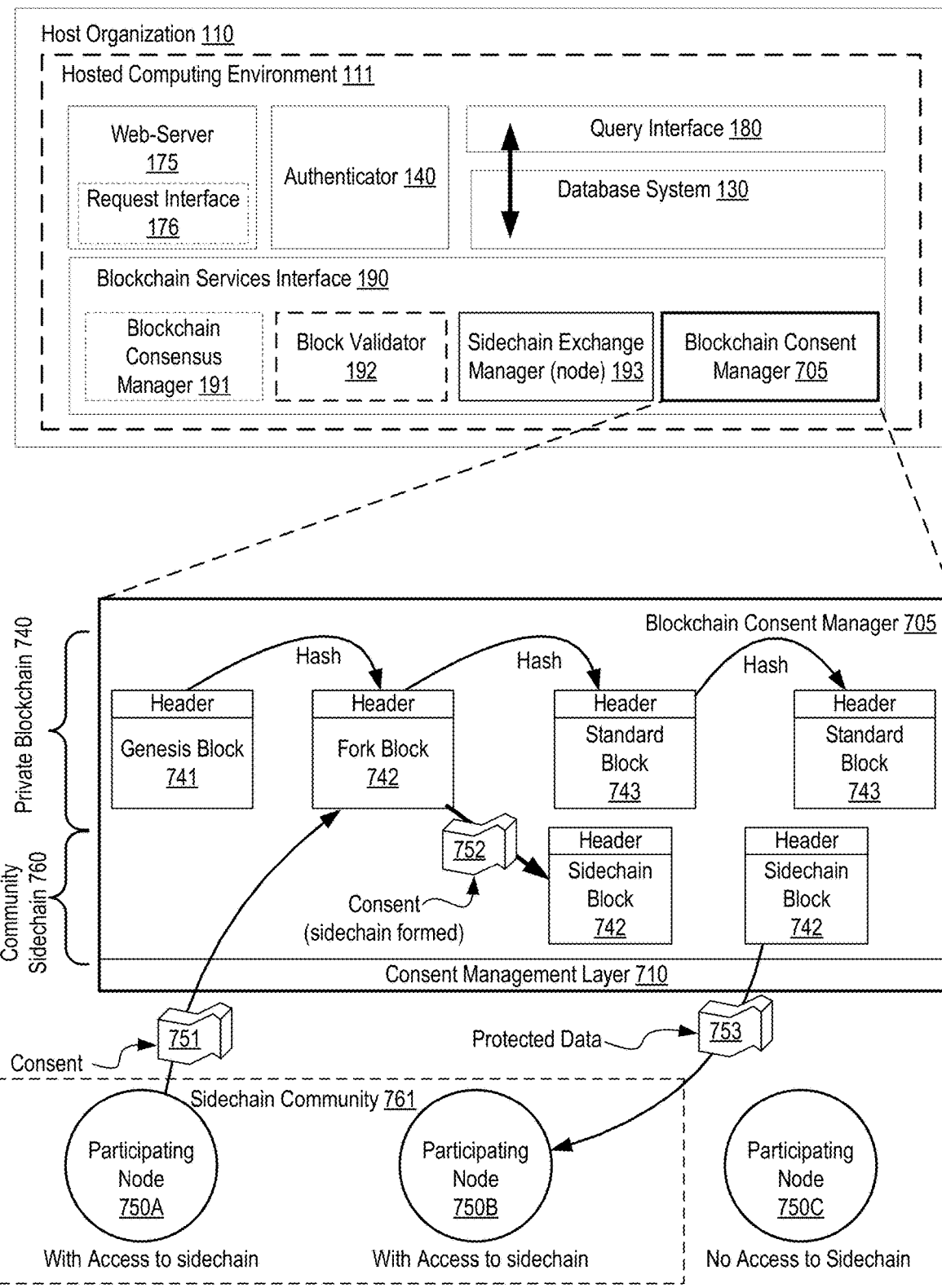
FIG. 7A depicts another exemplary architecture, with additional detail of a blockchain which implements community sidechains with consent management, in accordance with described embodiments.

FIG. 7A depicts another exemplary architecture 700, with additional detail of a blockchain which implements community sidechains with consent management, in accordance with described embodiments.

As depicted here, there is again a host organization 110 having a hosted computing environment 111 operating therein with a web-server 175, request interface 176, authenticator 140, query interface 180, and database system 130. As before, there is also a blockchain services interface 190 via which the host organization 110 provides a variety of blockchain related services to customers, subscribers, and other organizations and tenants which utilize the cloud computing services provided by the host organization 110.

More particularly, there is now depicted within the blockchain services interface 190 a blockchain consent manager 705 which implements community sidechain functionality with consent management to control access rights, readability, exchange permissions and disclosure capabilities of the payload data stored within the blockchain.

Conventionally, blockchain blocks are fully open and readable to any participating node for the blockchain protocol implementation. Such openness is by design as it permits any node to authenticate and validate that transactions are valid independently, without requiring permission from any authority. However, such openness is not always desirable. Therefore, the blockchain consent manager 705 and the blockchain services interface 190 expose additional functionality for certain blockchain protocol implementations supported by the host organization which permit certain data to be subjected to additional access restrictions, while nevertheless utilizing and benefiting from the distributed ledger technologies embodied within the blockchain functionality.

According to a particular embodiment, the blockchain consent manager 705 provides a community sidechain with consent management on a private blockchain. As depicted here, the blockchain consent manager 705 provides a private blockchain 740 (e.g., a community sidechain) which is comprised of an initial genesis block 741 beginning the sidechain as a private blockchain 740 followed by a sequence of standard blocks 743 as the private blockchain continues to grow. The private blockchain 740 is accessible to each of the participating nodes 750A and 750B and 750C. In practice, there are likely to be many more participating nodes for the private blockchain 740.

Community sidechains are useful where it is desirable to share data between two nodes of a blockchain, for instance, such as the ability to share medical information for a patient between a hospital and an insurance provider.

With conventional mechanisms, every participating node 750A-C has full access to all data once that data is written into the blockchain. While useful in many situations, it is readily apparent that medical information should not be freely accessible to view due to privacy concerns as well as HIPAA (Health Insurance Portability and Accountability Act of 1996) requirements. Notwithstanding the shortcomings, or design feature, of prior blockchain protocol implementations, which permit full visibility, the blockchain consent manager j705 of the host organization 110 provides specific customers, organizations, users (e.g., hospitals, doctor offices, insurance providers, etc., within the context of the patient medical records example) to benefit from the use of blockchain functionality such as immutability and non-centralized record keeping, while also respect patient privacy and comply with Federal HIPAA requirements. Financial organization have similar legal requirements to protect private information, yet may also benefit from the blockchain functionality as set forth herein to provide community sidechains with consent management capabilities via the blockchain consent manager 705.

According to one embodiment, the blockchain consent manager 705 implements a consent management layer 710 through which participating nodes 750A-C must traverse if they wish to view, read, or access certain information stored within the private blockchain 740. According to such an embodiment, some of the data within the private blockchain 740 is viewable to all participating nodes 750A-C whereas other data is restricted.

Unlike the distinction between a private blockchain and a public blockchain, in which anyone can access the public blockchain and view any information within it, and anyone having access to the private blockchain can access any information within it, the private blockchain 740 with consent management is different because even if a participating node has authority to access the private blockchain 740, such access does not necessarily confer the "consent" by which to access protected or restricted information stored within the private blockchain 740.

As depicted here, participating node 750A has provided consent 751 which is written into the private blockchain 740. Consequently, a new sidechain community 761 is formed by the blockchain consent manager 705. Specifically, the blockchain consent manager 705 creates a new community sidechain 760 formed from sidechain blocks 742. The community sidechain 760 is formed from the point of the fork block 742 which is viewed by the private blockchain 740 as a standard block, but includes a reference linking the newly formed community sidechain 760 with the private blockchain 740. The main private blockchain 740 then continues on after the creation of the community sidechain 760 via additional standard blocks 743 which follow the fork block 742.

Upon the consent 751 being received from participating node 750A and being written into the private blockchain 740, the blockchain consent manager 705 seeds the new community sidechain 752 with the consent, thus forming the new community sidechain 760. According to certain embodiments, no payload data whatsoever is written into the sidechain blocks 742 of the community sidechain. For example, the protected data 753 is not written into the community sidechain 760, but rather, remains within the private blockchain 740 in protected form, but is accessible to the participating nodes of the sidechain community 761 via a reference between the sidechain blocks 742 accessible only to the participating nodes 750A and 750B of the sidechain community which permits retrieval of the protected data 753 through the consent management layer. In other embodiments, protected data 753 may be written into the payload of the sidechain blocks 742, and through virtue of the participating nodes 750A and 750B residing within the sidechain community 761, those participating nodes 750A and 750B will have access to the protected data 753 without having to access the main chain (e.g., the primary blockchain 740). As depicted here, the community sidechain 760 is linked to the private blockchain 740, and may therefore be considered a forked blockchain, whereas in other implementations, the community sidechain may be formed and permitted to operate independently from the private blockchain, so long as the blockchain consent manager 705 remains in control to manage which participating nodes are permitted to form any newly created sidechain community 761, and therefore, which participating nodes have access to the protected data 753 and which participating nodes do not have access to the protected data 753.

As is depicted here, participating nodes 750A and 750B have access to the sidechain as they form the entirety of the sidechain community 761, and thus, data is sharable between the nodes of the sidechain community, whereas the participating node 750C is not a member node of the sidechain community 761, and therefore cannot access the protected data and cannot share data with the participating nodes 750A and 750B.

Figure 7B:
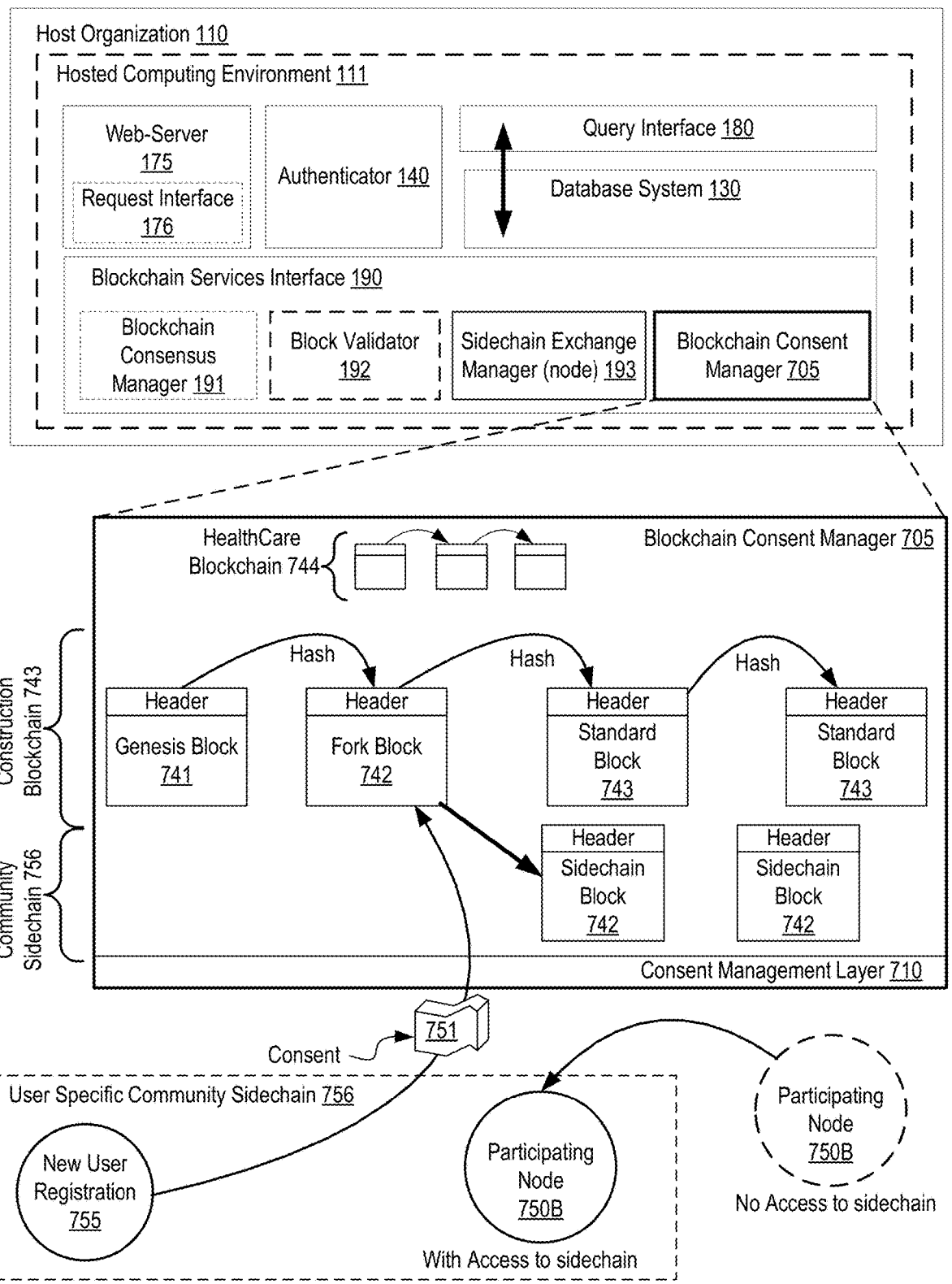
FIG. 7B depicts another exemplary architecture, with additional detail of a community sidechain with consent management, in accordance with described embodiments.

FIG. 7B depicts another exemplary architecture 701, with additional detail of a community sidechain with consent management, in accordance with described embodiments.

Depicted here are further details regarding the introduction of new participating nodes into the private blockchains. As shown here, there now exists two distinct private blockchains which are managed by the blockchain services interface 190, specifically, the healthcare blockchain 744 and the construction blockchain 743. According to described embodiments, there can be many different private blockchains, and they may be organized in a variety of ways. For instance, it is conceivable that different parties in the healthcare industry may wish to share data amongst one another, and therefore, they may participate within the same private healthcare blockchain 744, and where data sharing is needed, consent may be granted, a sidechain formed with the participating nodes needing access to the data to be shared, thus forming a sidechain community, and then the data shared amongst those participants of the newly created sidechain community, just as was described above.

However, there may be other participants which have no need for access to medical data, and therefore, those participating nodes are formed into a distinct private blockchain. For instance, depicted here is the construction blockchain 743 having participants such as hardware stores, construction materials manufacturers, building contractors, etc. While such actors likely have no need to access medical information, they likely would benefit from the ability to securely share data related to their construction industry, such as purchase orders, building plans, construction contracts, etc. These actors may wish to protect certain types of information, yet may nevertheless benefit from the use of blockchain functionality.

According to a particular embodiment, a new user registration (e.g., for instance the creation of a user profile with a website, etc.) within the main construction blockchain 743 resulting in the creation of a new user specific community sidechain 756. Initially, the new user registration is the only participating node for the user specific community sidechain 756 as only that particular user by default will have access to private and protected data. However, the new user registration node 755 may consent 751 to another node, with the consent being written into the construction blockchain 743 (e.g., being written into the fork block 742 by way of example), thus resulting in the community sidechain 756 having how having both the new user registration 755 and also another participating node to whom consent was granted. As shown here, participating node 750B previously was part of the construction blockchain 743 with no access to the sidechain, however, upon the grant of consent for the new user registration node, the participating node 750B is then joined into the user specific community sidechain 756, through which access to private or protected data associated with the new user registration node 755 may be shared. All nodes having consent to enter the user specific community sidechain 756 will be given access to the private and protected information of the new user registration node 755.

If the same user requires different access to be given to different participating nodes, then the user would require a separate new user registration node to be created. For example, if a user creates a profile with a website such as Home Depot or Lowe's within the construction blockchain 743 and elects to share information, for instance with a carpet installer, then consent may be granted to the carpet installer to join the user specific community sidechain 756 and access the relevant information. If the user wishes then to share the same information with, for example, a window installer, then the window installer may also be given consent 751 to join the user specific community sidechain 756 as a new participating node, however, if the user wishes to share different information with each provider, then two profiles would be required. Pragmatically, however, the same information for the user would be pertinent to each installer, and therefore, it is unlikely that the user encounters such problem.

It is therefore in accordance with a particular embodiment that users may create user specific community sidechains within the primary blockchain (e.g., such as the construction blockchain 743 or the healthcare blockchain 744, etc.) by creating a user profile with a participating website and such users may then grant consent to other nodes (e.g., via the same website) to permit sharing of their private or protected information with specified target nodes participating within the primary blockchain but without access to the user specific sidechain before being granted consent.

Although not specific to the concepts which are discussed in detail herein, a website, such as Home Depot, may operate as a node within the construction blockchain 743 and also as a customer of the host organization. Through the website of the customer Home Depot, new users may create user profiles and the blockchain services interface 190 of the host organization will then generate a new node within the construction blockchain 743 or other relevant primary blockchain corresponding to the new user registration 755. The blockchain services interface 190 will additionally generate the user specific community sidechain 756 via which the user may grant consent to share information with other participating nodes for the particular blockchain, such as the construction blockchain in this example. For instance, according to one embodiment, when users login or create a profile with the website, such as with Home Depot, they are authenticating with the host organization 110 upon which the website operates and resides. Because the user is then authenticated with the host organization 110, the same host organization 110 can then create the new node for the new user registration on any blockchain accessible to the host organization 110 through the blockchain services interface 190.

To be clear, information is not shared between two different private blockchains. Therefore, while technically feasible, it is not contemplated that information would be shared between the healthcare blockchain 744 and the construction blockchain 743. Rather, each operates as a separate private blockchain, each with its own participating nodes, users, and sidechains. The same human user could, however, create profiles with different websites resulting in that human user having a node within the healthcare private blockchain and also a node within the construction private blockchain. The fact that both private blockchains are managed by the same host organization is irrelevant and would likely be unknowable to the particular user in question.

It should also be noted that a sidechain of the private blockchain is not a node, but rather, a permissible branch, or fork, from the main private blockchain. The sidechains depicted here remain immutably attached to, and associated with the primary blockchain and do not operate independently. However, if information is to be shared with another independently operated blockchain, such as another healthcare private blockchain separate from the healthcare blockchain 744 managed by the host organization 110, then the user could grant consent to exchange protected data with other independently operated blockchain in the manner described previously (e.g., at FIG. 1D), assuming a defined exchange agreement exists between the two primary blockchains, in which case the healthcare blockchain 744 managed by the host organization would be considered the parent blockchain (e.g., element 188 at FIG. 1D) and the separate independently operated blockchain would be treated as the independently operated sidechain (e.g., element 189 at FIG. 1D).

According to a particular embodiment, when user consent is captured for a particular node within the user specific sidechain, the consent is captured at the sidechain and then written into the primary blockchain where it is permanently kept. In such an embodiment, the fact that consent has been granted is not protected information, however, the restricted data is protected and the consent is only applicable to a specified participating node of the primary blockchain until such time that consent is rescinded. According to certain embodiments, the consent granted may be time limited, and will therefore expire after a specified period of time. In such case, access to the protected information is checked against the time expiration via the blockchain consent manager 705 as part of the blockchain protocol provided by the blockchain services interface 190.

Figure 8A:
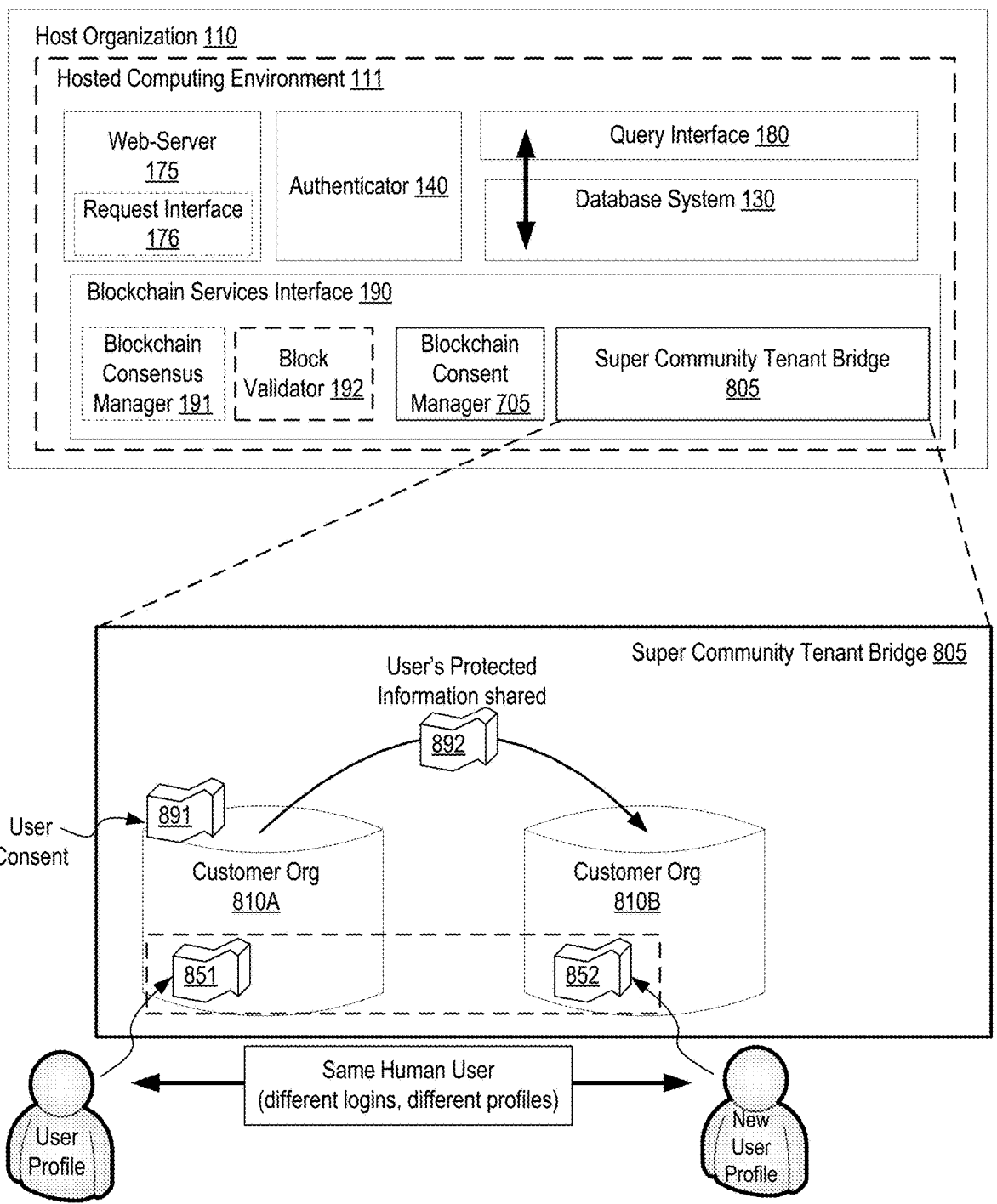
FIG. 8A depicts another exemplary architecture, with additional detail of a blockchain which implements super community sidechains with consent management, in accordance with described embodiments.

FIG. 8A depicts another exemplary architecture 800, with additional detail of a blockchain which implements super community sidechains with consent management, in accordance with described embodiments.

As depicted here, there is again a host organization 110 having a hosted computing environment 111 operating therein with a web-server 175, request interface 176, authenticator 140, query interface 180, and database system 130. As before, there is also a blockchain services interface 190 via which the host organization 110 provides a variety of blockchain related services to customers, subscribers, and other organizations and tenants which utilize the cloud computing services provided by the host organization 110.

An important improvement to prior blockchain technology as described herein is the ability to share information between different tenants of the host organization 110. Notably, however, sharing of information has its own demerits as it requires proper consent from the user when that user's information is to be shared.

Consider an example where two or more tenants of the same host organization 110 participate within the same private blockchain, such as a first tenant Home Depot and a second tenant AAA Carpet Installers participating within a private construction blockchain. Each of the tenants operate as a node within the private construction blockchain provided by the blockchain services interface 190 of the host organization. When a user creates an account with the Home Depot website which is a tenant of the host organization 110, that user's data and credentials are stored by the host organization 110 and the host organization creates a node within the private construction blockchain for the user, as described above. However, if the same human user creates a login and profile with another tenant of the host organization, then the user will again have a node created within the private construction blockchain for the user, but each will have different unique identifiers, each will be different nodes, and the login credentials and profiles for the same human user will be distinct.

This is a common experience as individuals creating a user profile at, for example, Kaiser healthcare may also create a user profile at, for example, Prudential healthcare. Such individuals would not expect the same login credentials to work at both distinct organizations, and indeed, the individual's user profiles are distinct and maintained quite separately.

However, when the two separate organizations are both tenants of the same host organization, the super community tenant bridge 805 provides a mechanism by which the same human user is enabled to share information between the two distinct user profiles.

Consider for example an individual who walks into a Bank, say Wells Fargo, and opens an account. The user will need to provide significant information to the bank, beyond just the individual's name. For instance, the user may be required to supply address, employer, income, marital status, financial assets, social security number, etc. Then the same individual goes to another bank, such as Chase, to open a credit card, predictably, the second bank is going to request much of the same information from the same individual as did the first bank. This is frustrating for the individual and time consuming. Similarly, if the individual seeks treatment from a doctor, upon visiting, the doctor's office will request a litany of personal medical information. If that same doctor then sends the individual to the hospital for treatment, the hospital will then request the identical information from the same individual, despite such information having already been provided to the doctor.

The super community tenant bridge 805 overcomes this problem for an individual where both organizations requesting information are tenants within the same host organization 110. Notwithstanding the fact that the individual will have a first user profile 810A with one tenant organization and a different user profile 852 with the second tenant organization, the host organization 110 nevertheless possesses information about both tenants and can facilitate a data sharing process using blockchain protocols provided by the host organization's blockchain services interface 190, subject to proper consent by the individual with whom both user profiles 851 and 852 are actually associated.

As depicted here, an individual already has a user profile with customer organization 810A, represented by user profile 851. Within the user profile is information the individual has provided or entered, such as personal medical data provided to a doctor's office. Assuming both the doctor's office (as customer organization 810A) and a second customer organization 810B, such as a hospital, are both tenants of the host organization 110 and both utilizing the blockchain services provided by the host organization 110 and are therefore each participating nodes on an applicable blockchain (e.g., such as a healthcare private blockchain managed by the host organization), then the individual can login and authenticate as a known user with either of the two customer organizations 810A and 810B and grant user consent 891 to share information between the two customer organizations, resulting in the user's protected information being shared as depicted by element 892, with the user's protected information being provided to and replicated within customer organization 810B by the super community tenant bridge 805.

Know your customer or "KYC" is the process of a business identifying and verifying the identity of its clients. The term is also used to refer to the bank and anti-money laundering regulations which governs these activities. The objectives of KYC guidelines is to prevent banks from being used, intentionally or unintentionally, by criminal elements for money laundering activities. Related procedures also enable banks to better understand their customers and their financial dealings. This helps them manage their risks prudently.

Some of the KYC policies are effectively mandated by Federal law which require extensive verification of any individual with whom the bank does business.

Similar requirements exist with respect to healthcare organizations which must ensure that the person they are speaking with, treating, or providing insurance covered services to, is indeed, the correct individual.

Banks and healthcare organizations incur very high costs in gathering such data and performing the necessary validation upon any individual with whom they interact, and consequently, it is not just an inconvenience for the individual who must provide the same information over and over to multiple different organizations, but the organizations requesting the information also are inconvenienced.

The super community tenant bridge 805 addresses this need by utilizing a blockchain protocol defined by the host organization 110 to store the relevant information and then using the blockchain services interface 190 and the super community tenant bridge 805 to enable sharing of repetitive but private and protected information between consenting parties, such as two banks or two healthcare organizations, etc. This benefits the individual who is unburdened from having to provide identical information over and over to multiple providers, and this benefits the providers or customer organizations who receive, subject to user consent 891, accurate information more quickly, but also benefit from the fact that the information is stored within a blockchain and is therefore significantly less risky given the computationally burdensome and generally infeasible means by which to maliciously or fraudulently manipulate the blockchain.

As the information for a particular individual accumulates within the blockchain and becomes more seasoned (e.g., older in the blockchain), the information will be deemed increasingly reliable and authentic, and is therefore more trustable to the banks, healthcare organizations, or other entity relying upon such information.

For example, if an individual has provided their drivers license and insurance card to a first organization, such as the doctor's office, and such information is then stored within the blockchain, then a second organization, such as the hospital, has little reason to question the information in the blockchain given that the second organization can both validate the blockchain block itself and also given the fact that because the information is in the blockchain, another provider, the doctor's office, is already attesting to the veracity of the information.

Figure 8B:
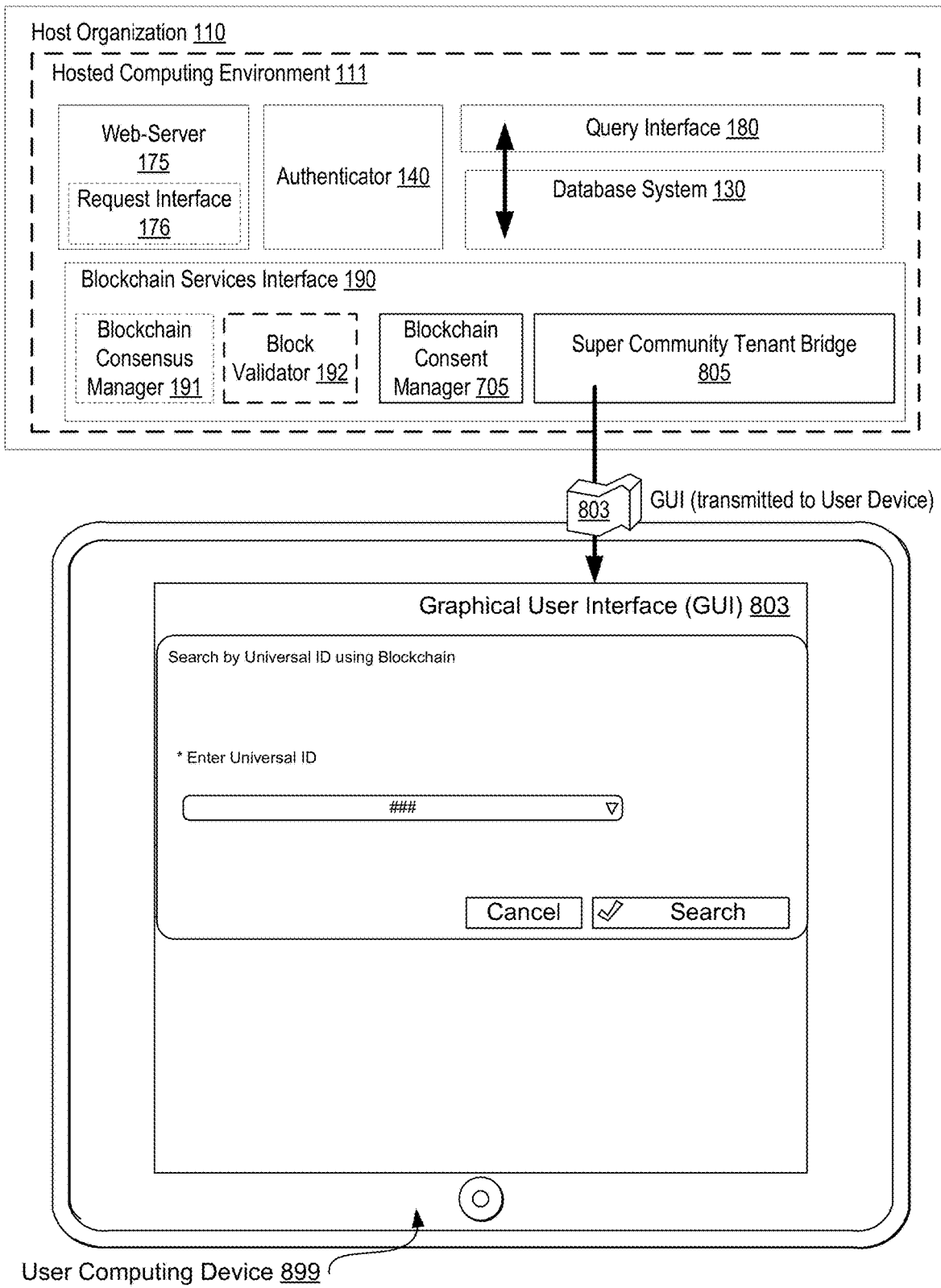
FIG. 8B depicts another exemplary architecture, with additional detail of GUI at a user device interacting with super community functionality, in accordance with described embodiments.

FIG. 8B depicts another exemplary architecture 801, with additional detail of GUI 803 at a user device 899 interacting with super community functionality, in accordance with described embodiments.

As can be seen here, an individual may utilize a user computing device 899 such as the one shown to search the blockchain for all profiles associated with their universal ID which is unique to that individual within the host organization 110.

As shown here, the super community tenant bridge 805 transmits a GUI to the user device which is then displayed, thus permitting the user to enter their universal ID to search for associated profiles. In other embodiments, the user may search for their Universal ID if they are unsure, or navigate a search function to locate their universal ID, which is then used to search for all associated user profiles for the individual.

Ordinarily, a user would be required to log in to each system separately due to the two separate and distinct user accounts or user profiles, even if both customer organizations were tenants of the same host organization 110 as the language, authentication, and user interfaces were unique to each respective customer organization. However, the super community tenant bridge 805 permits users to identify all accounts across multiple tenant organizations within the host organization 110 for which the individual has data or user profiles stored within the blockchain and then from a simple GUI interface, identify which elements or what kinds of data the individual wishes to share between the two distinct customer organizations.

Figure 8C:
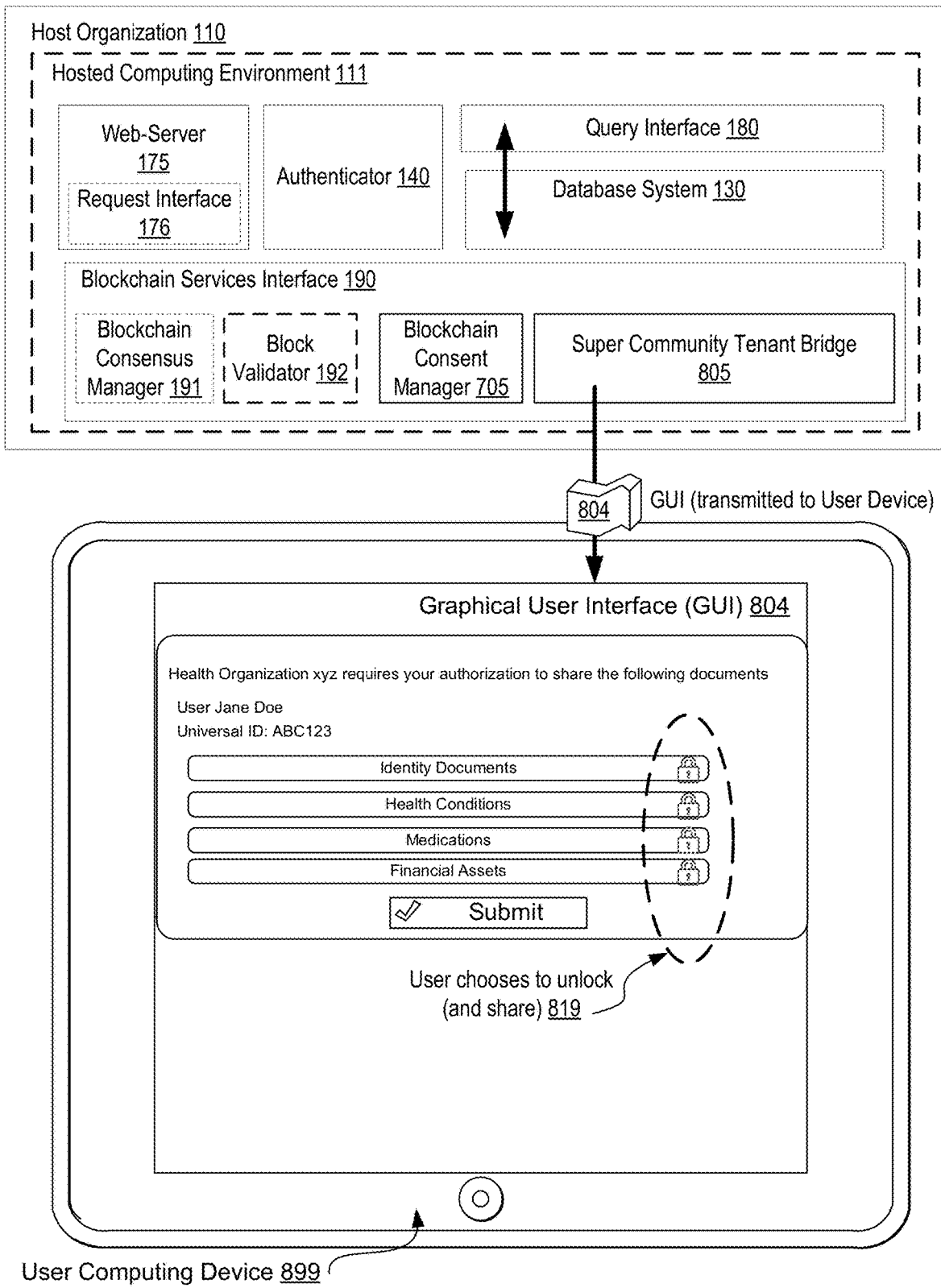
FIG. 8C depicts another exemplary architecture, with additional detail of GUI at a user device interacting with super community functionality, in accordance with described embodiments.

FIG. 8C depicts another exemplary architecture 802, with additional detail of GUI 804 at a user device 899 interacting with super community functionality, in accordance with described embodiments.

As depicted here, the user is prompted at GUI 804 with a request to share documents and information and the user may choose which documents and information to be shared as shown at operation 819. The information here is originating from the first customer organization with whom the user already has created a profile and entered or provided the information, and will be shared with the second customer organization. In certain embodiments, the information is replicated to the second customer organization, whereas in others, the second organization is granted consent to share the information and the second customer organization is then placed into a community sidechain with the user's node via which the information may traverse the consent management layer (e.g., element 710 of FIG. 7C) to gain access to the required information within the primary blockchain without having to replicate the data. Generally, non-replication is preferable as the same information has already been validated and exists within a validated block having consensus of all participating nodes on the blockchain, however, certain implementations may necessitate data replication rather than consent for data access to originally stored information within the blockchain.

Once the user unlocks the chosen data elements to be shared and clicks submit, consent is then granted to the second customer organization in the manner described above.

According to described embodiments, the individual authenticates with either the first or the second customer organization, in which one customer organization has access to the individual's protected data and in which the other customer organization does not, and then the user approves the sharing of data by granting consent either within the customer organization having access to the data already or grants consent to receive the shared data within the customer organization which does not have access to the data. Stated differently, it doesn't matter which user profile the individual authenticates with so long as both are associated with the same universal ID for that particular individual.

Once consent is granted by the user, because both customer organizations are participating nodes for the blockchain, they may then read the data from the blockchain and traverse the consent management layer (e.g., element 710 at FIG. 7B) implemented by the blockchain consent manager (e.g., element 705 at FIG. 7B).

According to one embodiment, the universal ID for a healthcare blockchain is an individual's social security number (SSN) whereas in other embodiments, it is a value generated by the host organization. For other embodiments implementing FinTech for financial institutions, the universal ID may be a business' Tax ID Number or (TIN). Other blockchains for different industries may utilize different numbers or may utilize a universal ID generated by the host organization for each unique individual having one or more profiles with tenants of the host organization. The universal ID is sometimes referred to as the "blockchain identifier." While every user profile with every tenant may be distinct and even have a distinct User ID for that user profile, the universal ID is common amongst all user profile for a particular individual.

According to certain embodiments, when an individual authenticates with any tenant's website, the individuals universal ID is automatically populated or retrieved such that the individual need only grant consent or decline to grant consent, without having to enter their universal ID or search for their universal ID. For instance, where there is a perfect match to a user's profile data based on the blockchain, then the matched data may be utilized to automatically populate the universal ID without the user having to provide it or search for it. For instance, a perfect match may require a matching SSN/TIN, first name, last name, and date of birth (DOB) based on the blockchain.

In other embodiments, two factor authentication is required before any consent may be granted based on an individual's universal ID so as to enhance security and the risk of inadvertent sharing of protected data stored within the blockchain.

According to other embodiments, two user profiles which are not associated with a common universal ID may be linked to a common universal ID utilizing two factor authentication to verify the at the same individual is in control of both accounts as well as another piece of known information, such as a cell phone number or an email account. With the two factor authentication, the individual may then attest that they are indeed the same individual.

According to certain embodiments, a user's universal ID may be searched for and located using personal verification information, such as the individuals SSN or TIN, date of birth, other information knowable to the individual but difficult for others to find.

By providing identity management on behalf of an individuals many user profiles amongst the various tenants of the host organization it is possible to add a much stricter consent management layer which must be traversed to access protected information from the blockchain whereas conventional blockchain implementations permit all data within the blockchain to be freely accessed by any participating node. In certain embodiments, it is not the individual which grants consent, but rather, the nodes themselves (e.g., such as a company representative to whom the node belongs). In such a way, nodes may also consent to share data with other nodes, which may not necessarily correspond to an individual human user.

Once an individual logs in to one of the two customer organization's websites, is prompted for consent to share information, and affirmatively grants consent, then the blockchain consent manager 705 in conjunction with the super community tenant bridge 805 will establish set up the individual's blockchain asset within the blockchain and join the customer organization's node now having consent into a community sidechain with the user's node and the customer organization's node having prior access to the user's protected data, such that all nodes in the community sidechain are enabled to access the protected data in the blockchain.

In such a way, rather than the same individual having to log in to two separate communities (e.g., a community sidechain corresponding to each distinct user profile), they are all joined into one community sidechain spanning the individual's multiple user profiles across multiple distinct tenants of the host organization 110.

According to one embodiment, the user's protected data is owned by a node corresponding to the first customer organization, however, the right to grant consent for the first customer organization to share the data is retained by the individual. Therefore, the individual's consent to share the information permits two nodes participating on the blockchain to share information by being placed into a common community sidechain, however, because, in this example, the user's node does not own the data, it is not necessary for the user's node to be placed into the same community sidechain nor is it necessary for the two customer organizations which are to participate in the data sharing to join the community sidechain within which the user's node resides.

As depicted at GUI 804, the various types of data may be broken out as separate categories or different types, and therefore, a user could grant consent to share a blood test document owned by a hospital node with a node representing the individual's doctor's office, yet deny consent to share the financial assets, thus prohibiting the hospital from sharing the financial information with the doctor's office, even in the event such info was requested and the user was prompted for consent to share the information.

According to another embodiment, the user may click on each category and select specifically which documents, objects, or fields to share or not share, thus providing the user with greater granularity control over the information for which consent to share is granted.

According to described embodiments, granted consent is written into the payload of a blockchain protocol block where all nodes in the blockchain may view and validate the consent as a separate blockchain asset, with the node being given consent having a link via which to pierce the consent management layer to access the user's protected information which is already written into the blockchain but which is inaccessible to all nodes lacking express consent from the user. According to one embodiment, the link is the asset ID within the blockchain.

According to such an embodiment, the node being given consent only requires the asset ID to access the protected information stored within the blockchain.

According to a particular embodiment, a super-community is established which is an amalgamation of small communities, each smaller community being made up of each of the customer organizations that are participating in the blockchain. Whenever data is requested from the blockchain a notification is transmitted to the entire super-community and the consent model is then enforced by the blockchain consent manager 705. In such an embodiment, consent will identify or include at least (i) the blockchain asset that is requested from the blockchain, (ii) the customer organization (e.g. tenant) that is requesting access, (iii) the consumer that owns that data or from whom permission must be obtained, and (iv) the records for which access is being requested. Within the community GUI, a UI component displays to the community user all the requested approvals for that particular user within the super community. User access is pre-provisioned by the identity management of the host organization, for instance, via authenticator 140. Community users in the super community can then decide whether to grant consent as well as drill down for more granular control as to which assets are to be shared, with what other customer organizations (e.g., tenants) those assets are to be shared, thus controlling who has access to what data.

FIG. 9 depicts a flow diagram illustrating a method 900 for implementing Super community and community sidechains with consent management for distributed ledger technologies in a cloud based computing environment such as a database system implementation supported by a processor and a memory to execute such functionality to provide cloud based on-demand functionality to users, customers, and subscribers.

Method 900 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, the hosted computing environment 111, the blockchain services interface 190, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9, at block 905, processing logic operates a blockchain interface to a blockchain on behalf of a plurality of tenants of the host organization, in which each of the plurality of tenants are participating nodes with the blockchain.

At block 910, processing logic receives a login request from a user device, the login request requesting access to a user profile associated with a first one of the plurality of tenants.

At block 915, processing logic authenticates the user device and retrieving a user profile from the blockchain based on the authentication of the user device, in which the user profile is stored as a blockchain asset within the blockchain with a first portion of the user profile including non-protected data accessible to all participating nodes on the blockchain and with a second portion of the user profile including protected data accessible only to participating nodes having user consent.

At block 920, processing logic prompts the user device to grant user consent to share the protected data with a second one of the plurality of tenants.

At block 920, processing logic shares the protected data with the second one of the plurality of tenants by permitting access to the protected data within the blockchain asset by the second tenant's participating node.

According to another embodiment of method 900, a blockchain consent manager of the host organization requires an asset ID to access the protected data from the blockchain.

According to another embodiment, method 900 further includes: receiving a request from the second tenant to create a second user profile; creating a blockchain asset including the non-protected information for the second user profile; generating, via a blockchain services interface, a blockchain transaction including the blockchain asset; broadcasting the blockchain transaction into circulation on the blockchain; and committing the validated blockchain transaction in a block to the blockchain.

According to another embodiment of method 900, prompting the user device to grant user consent to share the protected data with a second one of the plurality of tenants includes: prompting the user device to share the protected data with the second tenant to populate the second user profile, in which both the first user profile and the second user profile are associated with a common universal ID; and in which sharing the protected data with the second one of the plurality of tenants includes populating the second user profile with the protected data retrieved from the blockchain asset by the second tenant's participating node.

According to another embodiment of method 900, sharing the protected data with the second one of the plurality of tenants by permitting access to the protected data within the blockchain asset includes sending an asset ID for the blockchain asset to the second tenant; and in which the method further includes the second tenant presenting the asset ID to a blockchain consent manager to access the protected data within the blockchain asset.

According to another embodiment of method 900, each of the first and second tenants are healthcare customer organizations operating as participating nodes with a healthcare blockchain managed by the host organization; in which the non-protected data includes at least a name of a user associated with the first user profile; in which the protected data includes at least HIPAA (Health Insurance Portability and Accountability Act) protected medical data stored within the healthcare blockchain via the blockchain asset having the first user profile embodied therein on behalf of the user; and in which sharing the protected data with the second one of the plurality of tenants includes the user granting consent to share the HIPAA protected medical data with the second tenant via a second user profile associated with the second tenant.

According to another embodiment of method 900, each of the first and second tenants are financial customer organizations operating as participating nodes with a financial blockchain managed by the host organization; in which the non-protected data includes at least a name of a user associated with the first user profile; in which the protected data includes at least private financial data stored within the financial blockchain via the blockchain asset having the first user profile embodied therein on behalf of the user; and in which sharing the protected data with the second one of the plurality of tenants includes the user granting consent to share the private financial data with the second tenant via a second user profile associated with the second tenant.

According to another embodiment, method 900 further includes: receiving the user consent to share the protected data by one of: (i) receiving the user consent from an authenticated user of the second tenant having been verified as a same individual associated with the first tenant; or (ii) receiving the user consent from the user device authenticated with the first tenant having been verified as a same individual associated with the second tenant.

According to another embodiment of method 900, sharing the protected data with the second one of the plurality of tenants includes the host organization validating, via a blockchain consent manager, that both the first tenant and the second tenant have a user profile associated with one individual; and in which the validating is based on receiving attestation from the one individual that both the first and second tenant's user profiles are associated with a common universal ID which is unique to the one individual within the host organization.

According to another embodiment of method 900, the blockchain asset is identified via a blockchain asset identifier or a Universal ID unique within the blockchain; and in which one individual associated with the protected data is uniquely identifiable to both the first tenant and the second tenant of the host organization based on the blockchain asset identifier or the Universal ID.

According to another embodiment, method 900 further includes: creating a participating node with the blockchain for a user associated with the user profile; generating a user specific community sidechain for the user associated with the user profile; adding both the first tenant's node and the second tenant's node to the user specific community sidechain; and in which sharing the protected data includes granting access to the protected data to all nodes within the user specific community sidechain.

According to another embodiment of method 900, any attempt by a participating node with the blockchain to access the protected data of the user profile triggers the prompting of the user device to grant user consent to share the protected data with the participating node attempting access; in which a GUI is transmitted to the user device with a request to unlock specific categories of protected information or to unlock specific documents, or both; in which the user selects which categories and/or documents to unlock via the GUI; in which a user indication to unlock access to any category or document via the GUI sends a link to the participating node attempting access to the protected data via which the protected information is made accessible from the blockchain through a consent management layer of the host organization.

According to a particular embodiment, there is a non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each of the plurality of tenants are participating nodes with the blockchain; receiving a login request from a user device, the login request requesting access to a user profile associated with a first one of the plurality of tenants; authenticating the user device and retrieving a user profile from the blockchain based on the authentication of the user device, in which the user profile is stored as a blockchain asset within the blockchain with a first portion of the user profile including non-protected data accessible to all participating nodes on the blockchain and with a second portion of the user profile including protected data accessible only to participating nodes having user consent; prompting the user device to grant user consent to share the protected data with a second one of the plurality of tenants; and sharing the protected data with the second one of the plurality of tenants by permitting access to the protected data within the blockchain asset by the second tenant's participating node.

Figure 10:
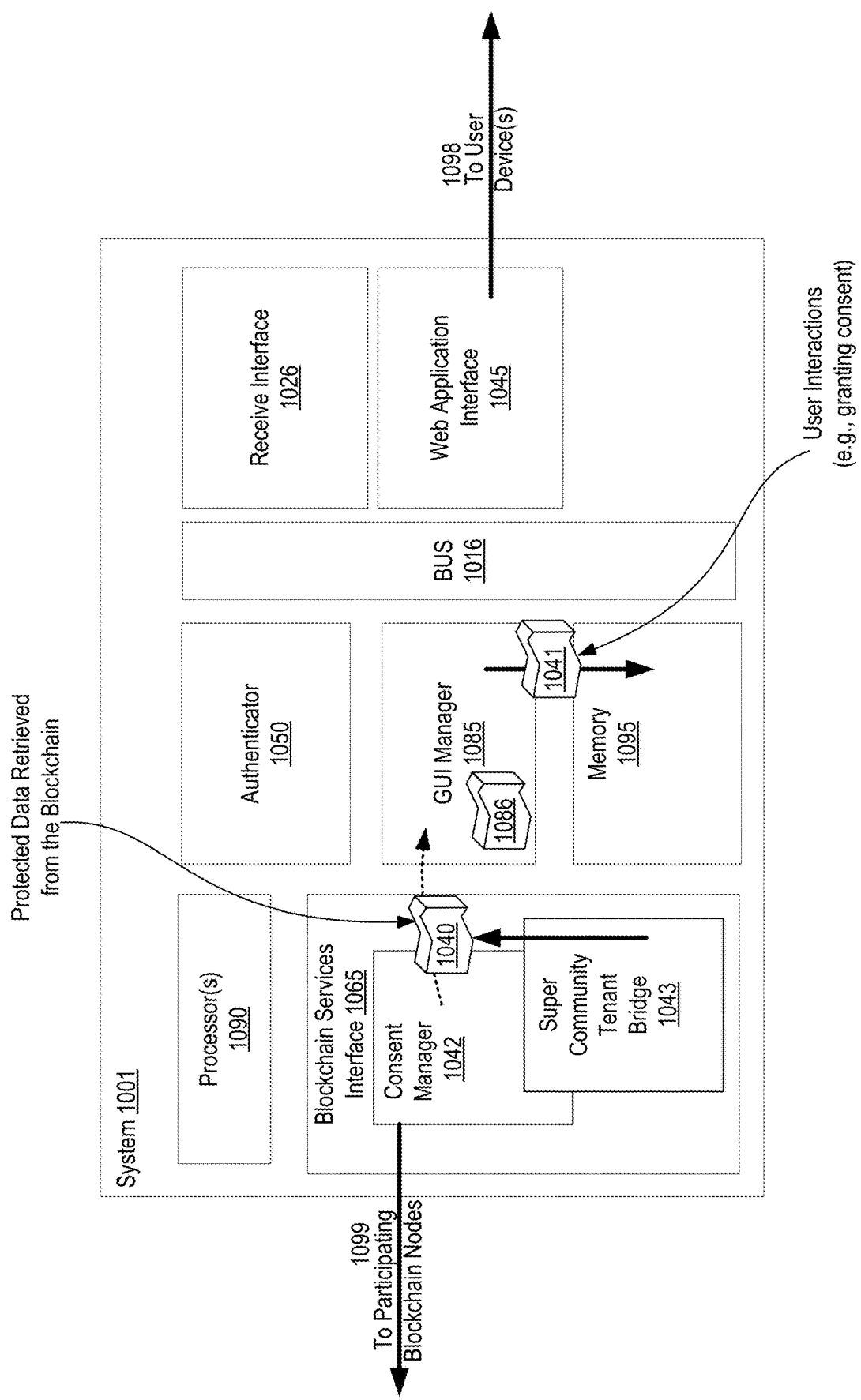
FIG. 10 shows a diagrammatic representation of a system within which embodiments may operate, be installed, integrated, or configured, in accordance with described embodiments.

FIG. 10 shows a diagrammatic representation of a system 1001 within which embodiments may operate, be installed, integrated, or configured. In accordance with one embodiment, there is a system 1001 having at least a processor 1090 and a memory 1095 therein to execute implementing application code 1096 for the methodologies as described herein. Such a system 1001 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 1001, which may operate within a host organization, includes the processor 1090 and the memory 1095 to execute instructions at the system 1001. According to such an embodiment, the processor 1090 is to execute a blockchain services interface 1065 to interface with a blockchain on behalf of a plurality of tenants of the host organization, in which each of the plurality of tenants are participating nodes 1099 with the blockchain; a receive interface 1026 is to receive a login request from a user device 1098, the login request requesting access to a user profile associated with a first one of the plurality of tenants; an authenticator 1050 to authenticate the user device 1098 and to retrieve a user profile from the blockchain based on the authentication of the user device, in which the user profile is stored as a blockchain asset within the blockchain with a first portion of the user profile including non-protected data accessible to all participating nodes on the blockchain and with a second portion of the user profile including protected data 1040 accessible only to participating nodes having user consent; a blockchain consent manager 1042 to prompt the user device to grant user consent (e.g., element 1041 showing granted consent) to share the protected data with a second one of the plurality of tenants (e.g., via a GUI 1086 transmitted and managed by GUI manager 1085); and a super community tenant bridge 1043 to share the protected data with the second one of the plurality of tenants by permitting access to the protected data within the blockchain asset by the second tenant's participating node.

According to another embodiment of the system 1001, the receive interface 1026 communicates with a user client device 1098 remote from the system and communicatively links the user device with the system via a public Internet. According to such an embodiment, the system operates at a host organization as a cloud based service provider to the user device 1099; in which the cloud based service provider hosts a receive interface 1026 exposed to the user client device via the public Internet, and further in which the receive interface receives inputs from the user device as a request for services from the cloud based service provider.

Bus 1016 interfaces the various components of the system 1001 amongst each other, with any other peripheral(s) of the system 1001, and with external components such as external network elements, other machines, client devices, cloud computing services, etc. Communications may further include communicating with external devices via a network interface over a LAN, WAN, or the public Internet.

According to such an embodiment, the system may further include the receive interface to receive a request from the second tenant to create a second user profile; a blockchain services interface to create a blockchain asset including the non-protected information for the second user profile; the blockchain services interface to generate a blockchain transaction including the blockchain asset; the blockchain services interface to broadcast the blockchain transaction into circulation on the blockchain; and the blockchain services interface to commit the validated blockchain transaction in a block to the blockchain.

Figure 11A:
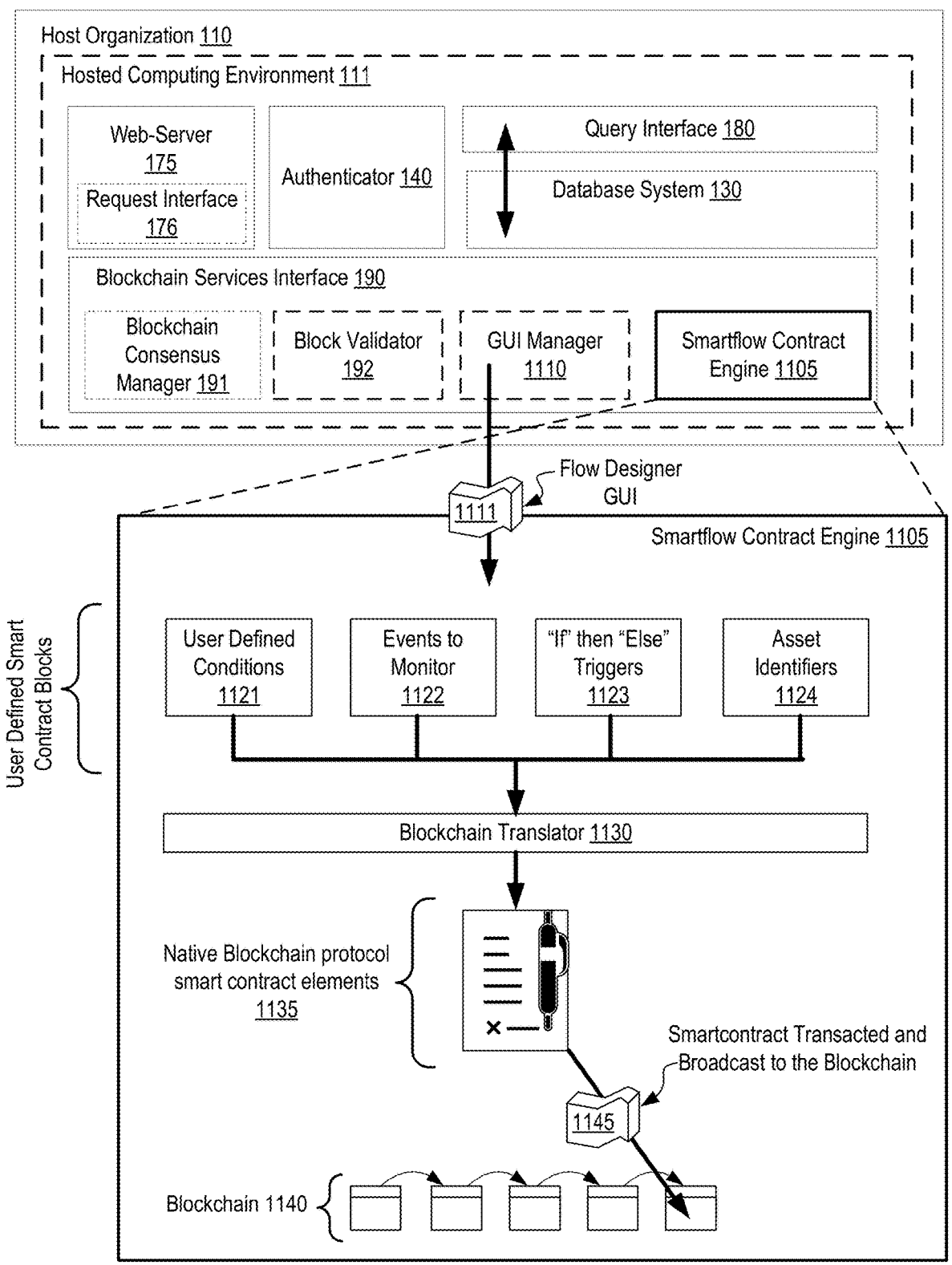
FIG. 11A depicts another exemplary architecture, with additional detail of a blockchain implemented smart contract created utilizing a smartflow contract engine, in accordance with described embodiments.

FIG. 11A depicts another exemplary architecture 1100, with additional detail of a blockchain implemented smart contract created utilizing a smartflow contract engine 1105, in accordance with described embodiments.

In particular, there is depicted here within the host organization the blockchain services interface 190 which now includes the smartflow contract engine 1105 and additionally includes the GUI manager 1110.

Because blockchain utilizes a distributed ledger, creation and execution of smart contracts can be technically complex, especially for novice users. Consequently, a smart flow visual designer allow implementation of smart contracts with greater ease. The resulting smart flow contract has mathematically verifiable auto-generated code, as created by the blockchain translator 1130 freeing customers and users from having to worry about the programming language used in any given blockchain protocol. Moreover, the smart flow contract engine implements visual designers that coordinate with the blockchain translator 1130 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 1110 presents a flow designer GUI 1111 interface to a user device via which users may interact with the host organization. The smartflow contract engine 1105 in coordination with the GUI manager interprets the various rules, conditions, and operations provided by the user, to generate a smartflow contract which is then translated or written into the target blockchain protocol.

Through the flow designer GUI 1111, a user can completely define utilizing visual flow elements how a particular process, event, agreement, contract, purchase, or some other transaction needs to occur, including dependencies, checks, required process inputs and outputs, triggers, etc.

Using the flow designer GUI 1111, the user simply drags and drops operational blocks and defines various conditions and "if then else" events, such as if this event occurs, then take this action. As depicted here, there are a variety of user defined smart contract blocks including user defined conditions 1151, events to monitor 1152, "if" then "else" triggers 1153, and asset identifiers 1154.

Once the user has completed defining the flow including all of its operational blocks, conditions, triggers and events, the smartflow contract engine takes each of the individual blocks and translates them into a native target blockchain protocol via the blockchain translator 1130, and then generates a transaction to write the translated smartflow contract 1145 into the blockchain 1140 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 1130 depicted here translates the user defined smart contract blocks into the native or required language and structure of the targeted blockchain 1140 onto which the resulting smart contract is to be written or transacted.

Once the smart contract is transacted and broadcast to the blockchain 1145 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 1130 translates the user defined smart contract blocks into a blockchain smart contract.

The resulting native blockchain protocol smart contract elements 1135 may be embodied within a code, structure, or language as dictated by the blockchain 1140 onto which the smart contract is to be written. For instance, if the smart contract is to be written to Ethereum then the blockchain translator 113 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they can be cumbersome to implement due to the requirement that they be programmed in different languages depending on the particular blockchain being targeted. Therefore, not only must users understand programming constructs, but also the particular syntactical nuances of the required programming language for the blockchain protocol in question.

By utilizing the smart flow contract engine 1105, even novice users can create compliant smart contracts by generating the smart contract elements with the flow designer and then leveraging the blockchain translator 1130 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 1105 through which the user may generate whatever flow he wishes. When done, the user, via the flow designer GUI 1111, instructs the blockchain services interface 190 to execute the smart contract, thus causing the smartflow contract engine to translate the user's custom designed smartflow contract into Ethereum compliant "Solidity" code, subsequent to which the smartcontract is then written into the blockchain for execution. The vendor need not know how to program or even understand the details of transacting with the blockchain. Rather, the cloud based services accessible through the host organization 110 remove the complexity from the process and present the user with a simple flow designer GUI 1111 through which all the necessary operations may thus be carried out.

According to such embodiments, writing the smartcontract to the blockchain requires storing metadata defining the smartcontract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smartcontract, having been translated and transacted onto the blockchain, triggers events on the within the host organization.

For example, consider that Wal-Mart and Nestle have an agreement that a shipment must be transported within a climate controlled trailer within a range of 35 to 39 degrees Fahrenheit at all time. Moreover, if the temperature exceeds 39 degrees at any time, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment when can then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 11B:
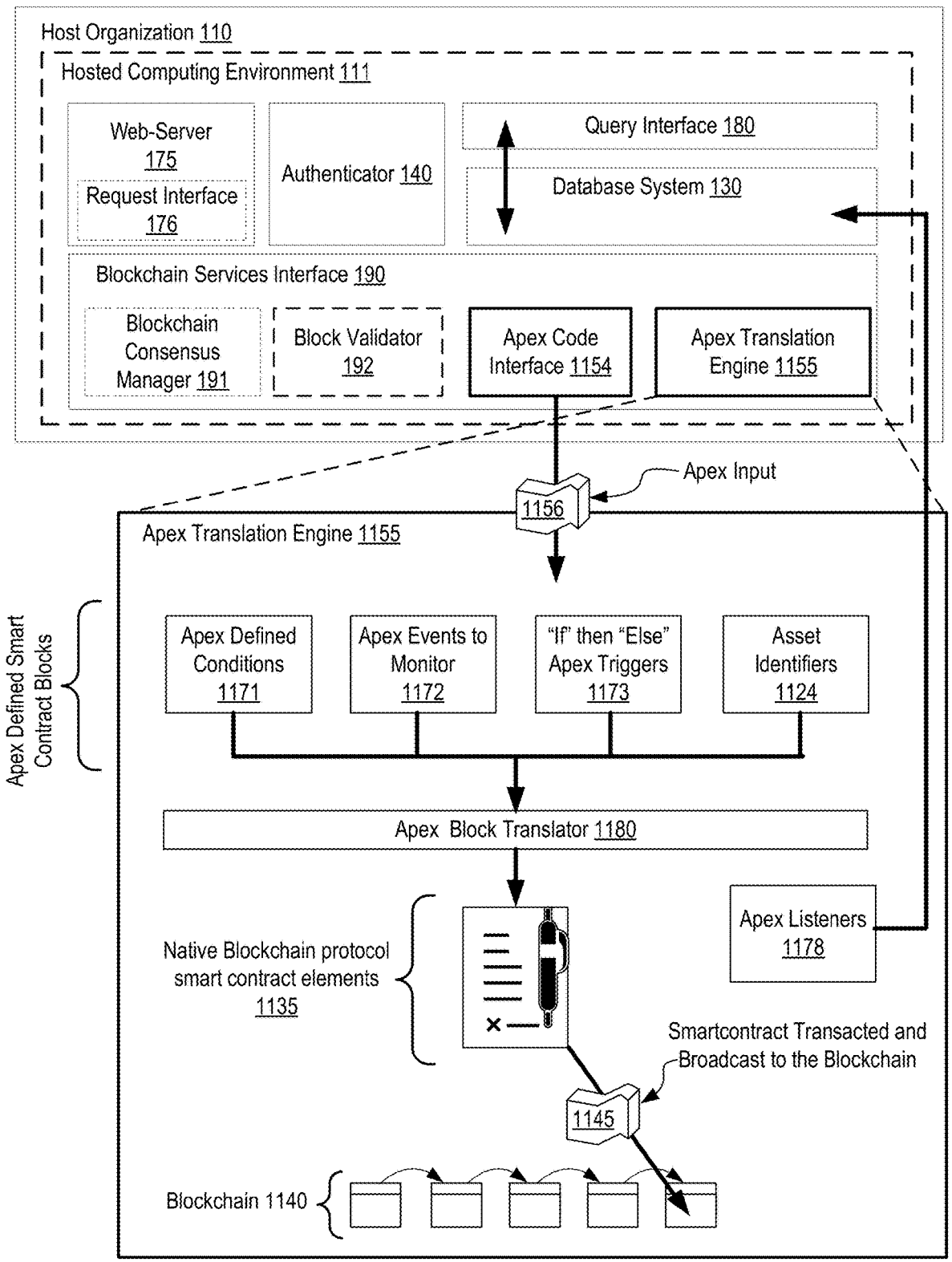
FIG. 11B depicts another exemplary architecture, with additional detail of a blockchain implemented smart contract created utilizing an Apex translation engine, in accordance with described embodiments.

FIG. 11B depicts another exemplary architecture 1101, with additional detail of a blockchain implemented smart contract created utilizing an Apex translation engine 1155, in accordance with described embodiments.

As depicted here, there is an Apex translation engine 1155 within the blockchain services interface 190.

Apex is a programming language provided by the Force.com platform for developers. Apex is similar to Java and C# as it is a strongly typed, object-oriented based language, utilizing a dot-notation and curly-brackets syntax. Apex can be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of a metadata. Therefore, the Apex translation engine 1155 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 1156 to the Apex translation engine 1155 via the depicted Apex code interface, for example, by uploading a text file having the developer's Apex code embedded therein.

The Apex translation engine 1155 parses the Apex input 1156 to identify the Apex defined smart contract blocks and breaks them out in preparation for translation. As depicted here, there are Apex defined conditions 1171, Apex events to monitor 1172, "if" then "else" Apex triggers 1173, and as before, asset identifiers 1154 which are not Apex specific.

The Apex defined smart contract blocks are then provided to the Apex block translator 1180 which converts them into the native blockchain protocol smart contract elements 1135 for the targeted blockchain protocol. Once translated, the process is as described above, in which the translated smart contract is transacted and broadcast 1145 to the blockchain 1140 for execution 1145.

Unlike the visual flow GUI, because Apex is programmatic, users writing Apex code can write programs to execute on a smart contract and are not limited by the available functions within the visual flow GUI.

According to a particular embodiment, the Apex input 1156 is first translated into JavaScript and then subsequently translated into a specific blockchain API appropriate for the targeted blockchain protocol upon which the smart contract is to be executed.

According to another embodiment, listening events may be written using the Apex language and provided in the Apex input 1156, however, such listening events are to be executed by the host organization. Therefore, the Apex block translator 1180 separates out any identified Apex listeners 1178 and returns those to the host organization 110 where they may be implemented within the appropriate CRM system or other event monitoring system. In such a way, developers can write the Apex input 1156 as a single program and not have to separately create the smart contract and also the related listening events in separate systems.

FIG. 12 depicts a flow diagram illustrating a method 1200 for implementing smart flow contracts using distributed ledger technologies in a cloud based computing environment such as a database system implementation supported by a processor and a memory to execute such functionality to provide cloud based on-demand functionality to users, customers, and subscribers.

Method 1200 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, the hosted computing environment 111, the blockchain services interface 1120, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1200 depicted at FIG. 12, at block 1205, processing logic operates a blockchain interface to a blockchain on behalf of a plurality of tenants of the host organization, wherein each of the plurality of tenants are participating nodes with the blockchain.

At block 1210, processing logic receives a login request from a user device.

At block 1215, processing logic authenticates the user device with the host organization.

At block 1220, processing logic receives input from the user device indicating a plurality of smart contract blocks.

At block 1225, processing logic translates each of the smart contract blocks into a native programming language to form a smart contract to execute via the blockchain.

At block 1230, processing logic transacts the smart contract onto the blockchain.

According to another embodiment, method 1200 further includes: transmitting a flow designer GUI to the user device; and in which receiving the input from the user device includes receiving inputs via the flow designer GUI indicating user selections of the plurality of smart contract blocks with a plurality of flow sequence, flow conditions, flow triggers, and/or flow event operations.

According to another embodiment of method 1200, receiving the input from the user device indicating the plurality of smart contract blocks includes receiving an Apex input file programmed in Apex programming language; in which the method further includes parsing a plurality of Apex defined smart contract blocks from the Apex input file; and in which translating each of the smart contract blocks includes translating the plurality of parsed Apex defined smart contract blocks into the native programming language to form the smart contract to execute via the blockchain.

According to another embodiment of method 1200, translating each of the smart contract blocks into the native programming language to form a smart contract includes translating each of the plurality of smart contract blocks into a defined sequence of process operations for the smart contract, a defined smart contract condition, a defined smart contract trigger, and/or a defined smart contract event.

According to another embodiment of method 1200, transacting the smart contract onto the blockchain includes: writing the smart contract into the blockchain as metadata via a blockchain services interface of the host organization; and in which the smart contract executes via the blockchain for one or more transactions occurring on the blockchain.

According to another embodiment, method 1200 further includes: extracting an event listener from the input received from the user, in which the event listener monitors the blockchain transactions for defined events having a corresponding smart contract condition or smart contract trigger within the smart contract transacted onto the blockchain; and executing the event listener separate from the blockchain, in which the event listener executes within the host organization and triggers a pre-programmed action within the host organization upon occurrence of the event within a transaction on the blockchain.

According to another embodiment of method 1200, the event listener executes within a Customer Relationship Management (CRM) platform of the host organization on behalf of a tenant of the host organization which is a participating party to the smart contract executing on the blockchain; and in which executing the event includes one of: halting a payment via the CRM system pursuant to a violation of terms or conditions defined by the smart contract executing within the blockchain or authorizing payment via the CRM system pursuant to fulfillment of all terms and conditions defined by the smart contract executing within the blockchain.

According to another embodiment of method 1200, translating each of the smart contract blocks into a native programming language to form a smart contract to execute via the blockchain, includes: translating each of the smart contract blocks into an Ethereum compliant Solidity programming language; in which the host organization operates a participating node on an Ethereum blockchain via a blockchain services interface of the host organization; and in which transacting the smart contract onto the blockchain includes transacting the smart contract onto the Ethereum blockchain via the participating node for execution via the Ethereum blockchain.

According to another embodiment of method 1200, translating each of the smart contract blocks into a native programming language to form a smart contract to execute via the blockchain, includes: translating each of the smart contract blocks into a Hyperledger compliant Go programming language; in which the host organization operates a participating node on a Hyperledger blockchain via a blockchain services interface of the host organization; and in which transacting the smart contract onto the blockchain includes transacting the smart contract onto the Hyperledger blockchain via the participating node for execution via the Hyperledger blockchain.

According to another embodiment of method 1200, receiving the input from the user device indicating a plurality of smart contract blocks includes: transmitting a flow designer GUI from a GUI manager of the host organization to the user device for display at the user device; and receiving mouse movement events at the flow designer GUI displayed to the user device indicating drag and drop selections and sequencing of available smart contract conditions, triggers, and events available via the flow designer GUI.

Figure 13:
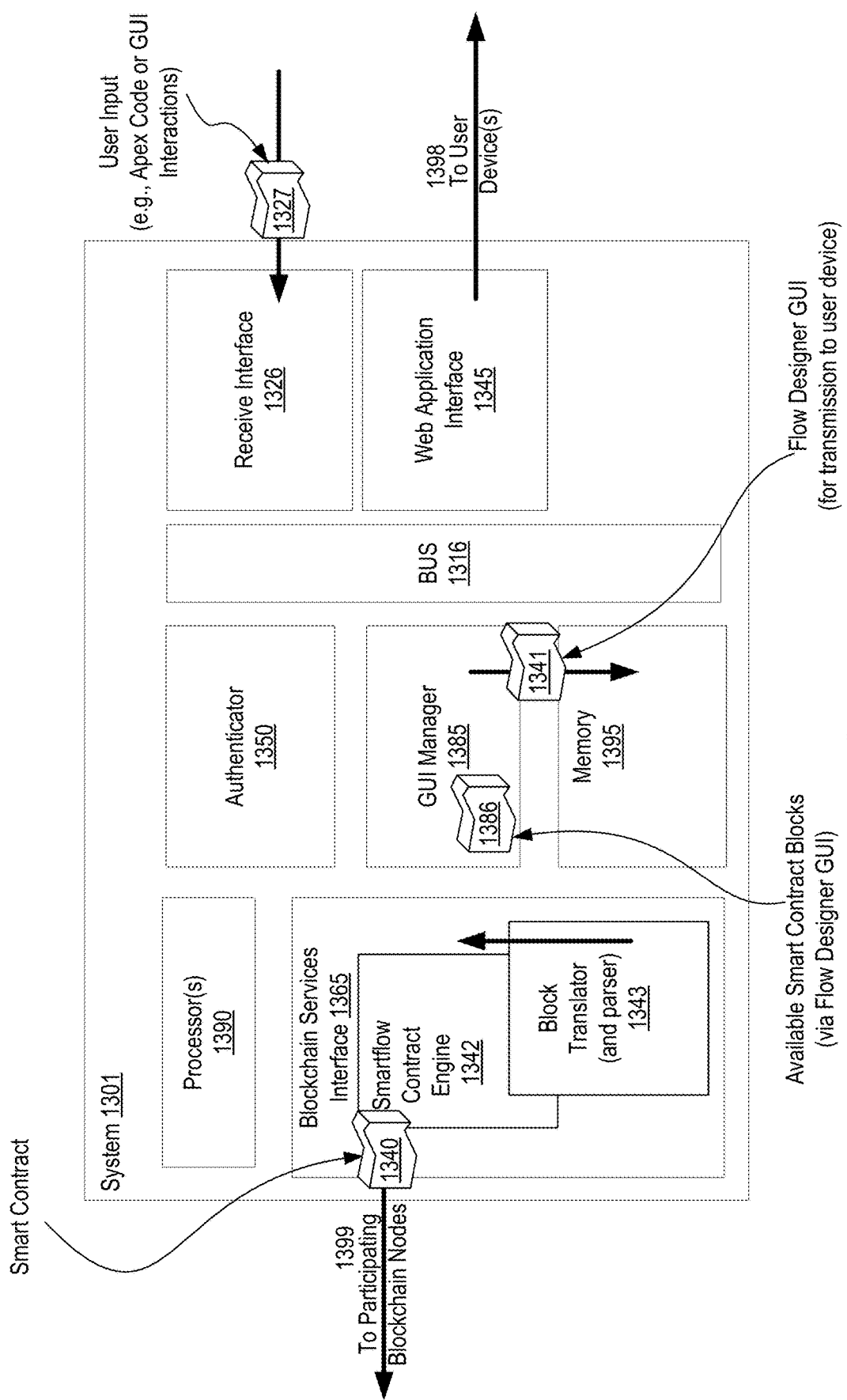
FIG. 13 shows a diagrammatic representation of a system within which embodiments may operate, be installed, integrated, or configured, in accordance with described embodiments.

FIG. 13 shows a diagrammatic representation of a system 1301 within which embodiments may operate, be installed, integrated, or configured. In accordance with one embodiment, there is a system 1301 having at least a processor 1390 and a memory 1395 therein to execute implementing application code 1396 for the methodologies as described herein. Such a system 1301 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 1301, which may operate within a host organization, includes the processor 1390 and the memory 1395 to execute instructions at the system 1301. According to such an embodiment, the processor 1390 is to execute a blockchain services interface 1365 to interface with a blockchain on behalf of a plurality of tenants of the host organization, in which each of the plurality of tenants are participating nodes 1399 with the blockchain; a receive interface 1326 is to receive a login request from a user device 1398. According to such an embodiment, there is an authenticator 1350 to authenticate the user device 1398 with the host organization. The receive interface 1326 to further receive input 1327 from the user device 1398 indicating a plurality of smart contract blocks; a translator (and parser) 1343 is to translate each of the smart contract blocks into a native programming language on behalf of a smartflow contract engine so as to form a smart contract 1340 to execute via the blockchain. The blockchain services interface 1365 is then to transact the smart contract 1340 onto the blockchain.

According to another embodiment of system 1301, the system further includes a GUI manager 1385 to transmit a flow designer GUI 1341 to the user device; and in which the receive interface is to receive inputs 1327 via the flow designer GUI indicating user selections of the plurality of smart contract blocks 1386 with a plurality of flow sequence, flow conditions, flow triggers, and/or flow event operations.

According to another embodiment of the system 1301, the receive interface 1326 communicates with a user client device 1398 remote from the system and communicatively links the user device with the system via a public Internet. According to such an embodiment, the system operates at a host organization as a cloud based service provider to the user device 1399; in which the cloud based service provider hosts a receive interface 1326 exposed to the user client device via the public Internet, and further in which the receive interface receives inputs from the user device as a request for services from the cloud based service provider.

Bus 1316 interfaces the various components of the system 1301 amongst each other, with any other peripheral(s) of the system 1301, and with external components such as external network elements, other machines, client devices, cloud computing services, etc. Communications may further include communicating with external devices via a network interface over a LAN, WAN, or the public Internet.

According to a particular embedment, there is a non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each of the plurality of tenants are participating nodes with the blockchain; receiving a login request from a user device; authenticating the user device with the host organization; receiving input from the user device indicating a plurality of smart contract blocks; translating each of the smart contract blocks into a native programming language to form a smart contract to execute via the blockchain; and transacting the smart contract onto the blockchain.

Figure 14:
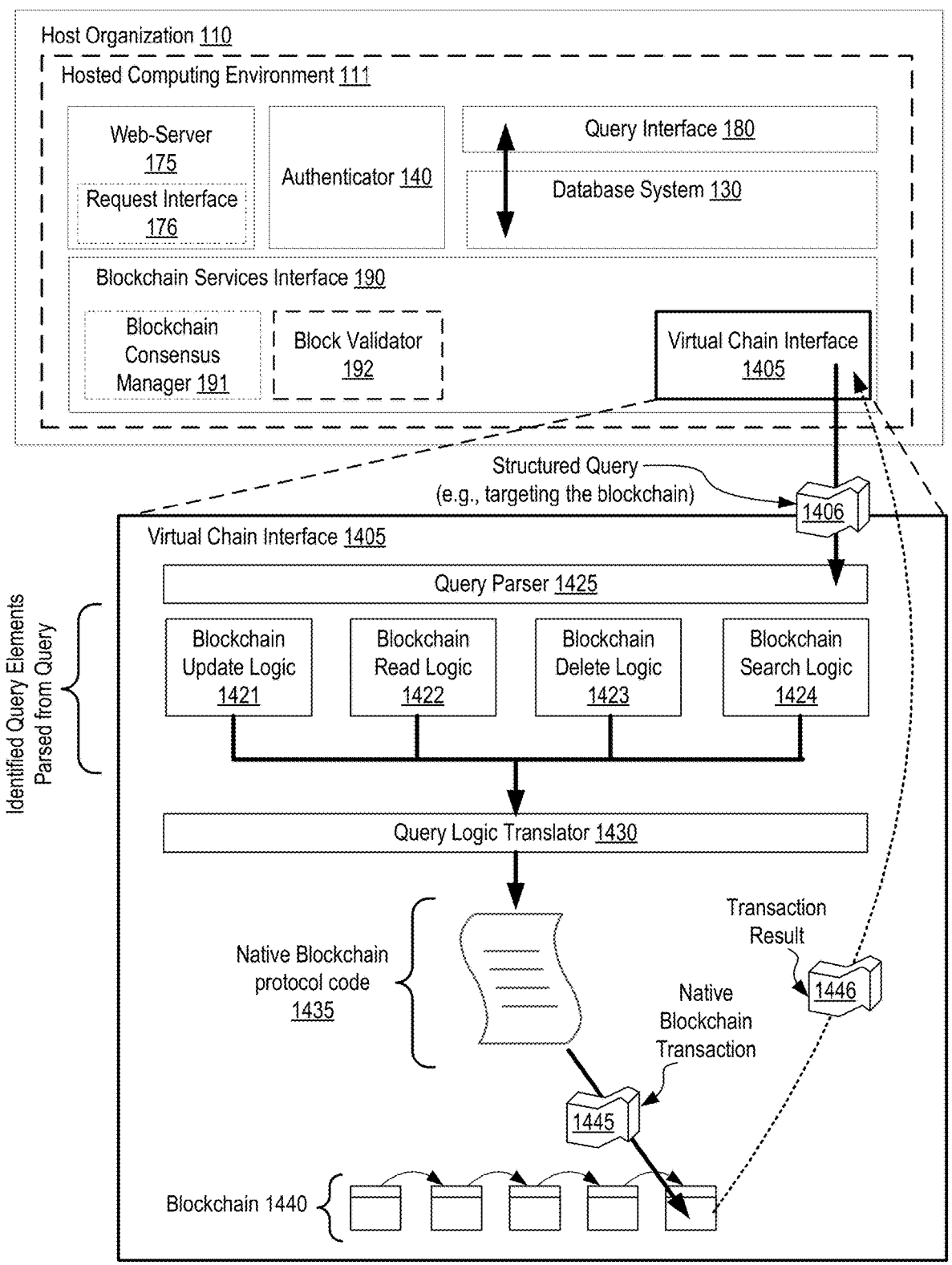
FIG. 14 depicts another exemplary architecture, with additional detail of a virtual chain model utilized to interface with for distributed ledger technologies via a cloud based computing environment, in accordance with described embodiments.

FIG. 14 depicts another exemplary architecture 1400, with additional detail of a virtual chain model utilized to interface with for distributed ledger technologies via a cloud based computing environment, in accordance with described embodiments.

Depicted here is the host organization and its various elements as described previously, however, there is further depicted a virtual chain interface 1405 within the blockchain services interface 190 which provides an alternative programmatic interface to support blockchain protocol implementations, be they public blockchains upon which the host organization operates as a participating node, or public blockchain protocol implementations provided by the host organization 110 or private blockchains provided by the host organization 110.

Developers utilizing distributed ledger technologies to interface with private and public blockchains conventionally were required to utilize the native programming language of those blockchains, rather than having the ability to utilize the programming language of their own choosing. This requirement creates some difficulty for developers who may be required to program using languages with which they have far less familiarity, thus inhibiting use of blockchain technologies.

Within the host organization 110, it is very common for developers to interact with the database system 130 via the query interface 180 utilizing a structured query language, such as SQL or PL/SOQL.

It is therefore in accordance with the described embodiments that the host organization 110 provides the ability to interact with a blockchain through the virtual chain interface 1405 utilizing syntax similar to a normal SQL query ordinarily utilized to query a relational database.

As depicted here, the virtual chain interface 1405 is able to receive a structured query 1406 from a user targeting the blockchain and then route the structured query 1406 through a query parser 1425 which breaks down the elements of the structured query 1406. For instance, the query parser 1425 as depicted here breaks down the structured query 1406 into blockchain update logic 1421, blockchain read logic 1422, blockchain delete logic 1423 (e.g., equivalent to removing a row from a database), and blockchain search logic 1424, resulting in the identified query elements being parsed from the structured query received at the virtual chain interface 1405 from the user.

The identified query elements are then mapped to corresponding native blockchain functions, code, or logic by the query logic translator 1430 so as to result in native blockchain protocol code 1435 constituting the equivalent functionality of the structured query 1406 and thus resulting in the native blockchain transaction 1445 which is then transacted onto the blockchain 1440 triggering the return of the transaction result to the virtual chain interface.

According to one embodiment, the virtual chain interface 1405 provides a virtual table or a list of entries and conversions which mimic the blockchain, thus permitting a mapping, conversion, or translation of operational elements within the structured query 1406 to be replaced with native blockchain code or functions, based on the virtual table.

Once the functional elements are converted from the incoming structured query into the native blockchain functions, the resulting native blockchain transaction is simply executed via the blockchain, for instance, by broadcasting the transaction, writing the transaction into a block of the blockchain, validating the block, and then committing the validated block to the blockchain.

According to one embodiment, the structured query 1406 received at the virtual chain interface is written using standard SQL syntax, however, behind the scenes and invisible to the user, the virtual chain interface 1405 identifies the contextually relevant information based on the user and the structured query elements utilized to generate a properly formed transaction for the blockchain.

Consider for instance a received structured query 1406 which provides an SQL INSERT statement. Normally, the syntax would be INSERT INTO table_name (column1, column2, column3, . . . ), however, the virtual chain interface will translate the INSERT command into an appropriate native blockchain command. The commands are different depending on the blockchain protocol and interface script being utilized, but one such command to insert data onto a blockchain is OP_RETURN<the data you want to add> and therefore, the INSERT is converted to an OP_RETURN the INTO is converted into a targeted location such as metadata, contracts, blockchain asset, etc., which may be identified automatically by the virtual chain interface's understanding of the user's context submitting the structured query as the submitter will be associated with specific blockchain elements.

Similarly, if the user presents a structured query 1406 specifying an UPDATE command, then it is necessary to convert the UPDATE command into a relevant command for the blockchain since the immutable nature of the blockchain means that no accepted block in the chain can ever be modified. Consequently, an UPDATE command of a structured query 1406 must be converted to an add. Therefore, where a user specifies, for example, UPDATE table_name, SET column1=value1, column2=value2, . . . , WHERE condition, the virtual chain interface will translate the incoming structured query elements into an insert block command as well as populate the necessary user management, including, for example, adding the necessary user keys and any other formalities required to transact with the blockchain.

For example, while the host organization operates as node on the blockchain and therefore has access to data within the blockchain, it is necessary for blockchain transactions to be performed from the appropriate participating node where data is being added or modified (e.g., via a new add which supersedes old data). Therefore, the virtual chain interface additionally maps the user ID or requestor of the structured query 1406 to a participating node and transacts the native blockchain transaction from a participating node corresponding to the user ID or the requestor of the incoming structured query 1406.

Similarly, where a user specifies via the structured query a SELECT FROM command, such as specifying, SELECT column1, column2, . . . FROM table_name, then the virtual chain interface will attain translate the query elements to the appropriate blockchain native protocol code required to retrieve data from the blockchain, including translating or mapping the table_name field to an appropriate blockchain asset, metadata, or other readable storage location. For instance, if the structured query specifies an object, then the virtual chain interface will translate the target object name to the corresponding blockchain asset from which the blockchain's payload data may then be read and returned in reply to the structured query.

From a user or customer perspective, structured queries may thus be programmed within applications, reports, and ad-hoc targeting a specified blockchain distributed ledger for which the user or customer has a participating node, and the virtual chain interface will transparently handle the conversion of the structured query to the requisite native blockchain protocol code 1435 without requiring further involvement or technical know-how from the user.

According to described embodiments, each tenant of the host organization having data stored within a specified blockchain will have at least one participating node with the blockchain, however, certain tenants of the host organization may have multiple participating nodes on a single blockchain.

For example, a tenant of the host organization having multiple different products or product lines may elect to have distinct participating nodes with the blockchain for each product or product line, and therefore, the "table_name" referenced by a structured query is mapped to the appropriate participating node and blockchain asset for the tenant, where more than one exists. In another embodiment, a single tenant of the host organization may have multiple customer organizations, and therefore, such a tenant may organize each customer organization into its own participating node with the blockchain, in which case the virtual chain interface will map the designated table_name or object within a structured query 1406 to a participating node with the blockchain based on the OrgID for the tenant being used to submit the structured query.

In other embodiments, a single tenant may utilize multiple different blockchains, and therefore, the virtual chain interface needs to map the specified table_name or object to a targeted blockchain, as well as to the participating node and blockchain asset with the targeted blockchain. Consider for example Walmart as a tenant of the host organization which utilizes a financial private blockchain to store financial related information and utilizes a different blockchain, such as a private shipping blockchain, to store supply chain data. In such an event, Walmart would be a participating on each of the financial private blockchain and the private shipping blockchain, and thus, Walmart would have at least those two participating nodes. Consequently, the virtual chain interface must map any specified table_name or storage location specified by a SQL command to the appropriate blockchain and the participating node and blockchain asset with the targeted blockchain.

In such a way, users, customer organizations, and tenants can issue commands such as "SELECT FROM" this "OBJECT" or "INSERT BLOCK" or "UPDATE BLOCK" without having to understand the native blockchain protocol code as the translation is handled by the virtual chain interface 1405 on behalf of the user. Moreover, because the user is authenticated with the host organization, the virtual chain interface also handles all the backend administration required to transact with the blockchain, such as providing and automatically populating the requisite asset ID, etc.

Upon the very first transaction, the virtual chain interface will need to perform an insert command into the blockchain to create a new participating node, however, once created, the existing participant may be used from then forward as the entries within the blockchain are never removed. For instance, if the user has never conducted a transaction on the target blockchain, then the virtual chain interface will handle the administrative tasks to create a participant in the blockchain based on that user's credentials and then generate a key for that user for use with the blockchain, as all transactions are based on the key. Once complete, then the virtual chain interface will translate the structured query into a statement referred to as the asset payload of blockchain based on the mapping.

According to certain embodiments, the virtual chain interface additionally handles synchronization with the blockchain, for instance, recognizing the difference between pending transactions on the blockchain for which consensus has not yet been reached versus those validated transactions having consensus may therefore be considered as committed transactions to the blockchain. For example, where a pending transaction is submitted but never reaches consensus the virtual chain interface will handle the equivalent of a rollback transaction. In SQL, a "ROLLBACK" is a command that causes all data changes since the last BEGIN WORK or S TART TRANSACT ION to be discarded by the relational database management systems (RDBMS), so that the state of the data is "rolled back" to the way it was before those changes were made. Similarly, a transaction broadcast to the blockchain participating nodes which is written to a block which is subsequently invalidated, truncated, or ignored, in favor of a different block (e.g., on the basis of consensus, proof of work, etc.) will result in the broadcast transaction being effectively nullified, and thus, the virtual chain interface 1405 tracks the status and reflects such a failed condition so as to maintain synchronization between the blockchain and the structured query requestor.

For instance, information is returned to the user submitting a structured query that the query reads from, updates, or in some way affects a pending transaction. Upon submitting such a query, the user will be presented with information indicating that the transaction has been posted but is on pending commit.

Once the transaction is committed into the blockchain, only then will the user see that it can be retrieved as a committed transaction versus being retrievable only as a pending/non-committed transaction.

The virtual chain interface 1405 additionally supports smart contracting with the blockchain such that if a defined event occurs within a transaction on the blockchain, then the entire smart contract will be executed via the blockchain. The virtual chain interface 1405 will automatically listen to specified events and then perform pre-defined actions when those events are observed to occur on the blockchain.

Consider for example the SQL SELECT FROM statement, which is incompatible with the available blockchain protocols. For instance, where a structured query specifies to SELECT a, b, c FROM, financial account B, then the "B" will be interpreted as an identifier within the blockchain. Similarly, a modified dot notation may be utilized, such specifying SELECT "ID" FROM blockchain financial account B will thus interpret the leading "blockchain" as the targeted blockchain to be utilized, with the virtual chain interface identifying the appropriate participating node, and the "B" being interpreted as an identifier with the specified blockchain, in which the identifier represents a specific payload within the blockchain from which to retrieve the data.

The virtual chain interface 1405 additionally maintains its mapping by pulling the latest transaction from the blockchain or the latest block from the blockchain for that specific customer across all assets within the blockchain.

According to another embodiment, the virtual chain interface 1405 supports retrieval of historical data from the blockchain. For example, for an entity specifying financia1_account-history_b, the virtual chain interface 1405 will generate native blockchain protocol code to pull all transactions that have ever happened within the specified blockchain for that specified asset, thus returning a series of transactions that have occurred over time. Unlike a database which may overwrite the data after a committed update, the blockchain never discards the information, and therefore, the latest current information may be retrieved or the complete historical information may also be retrieved.

Consider for example, a transaction to add a customer in which the first transaction specifies the customer's first and last name, but is missing the SSN. Then a second transaction specifies the SSN which is added to the blockchain. Then a third transaction updates the contact information for the customer. A fourth transaction then changes the customer's phone number. All of these transactions are applied the same customer asset, however, all four are distinct transactions with the blockchain. Consequently, a structured query may specify SELECT a, b, c from customer_b. in which will result in the latest most up to date information being returned for that customer. However, if instead the structured query specifies SELECT a, b, c from customer_history_b, then the virtual chain interface 1405 will retrieve the entire historical record of all changes to the customer_b, such that it may be viewable that the initial entry pursuant to a first transaction was missing SSN and that a fourth transaction resulted in the change to the customer's telephone number, ultimately ending with the latest most up to date information for that blockchain asset.

According to certain embodiments, the virtual chain interface 1405 handles all mapping automatically between the parsed structured query elements and the native blockchain protocol code, however, in alternative embodiments, the customer may provide mappings from the customer's information, table names, variables, participant ID, and query elements to the corresponding native blockchain protocol code 1435 elements. For instance, via the customer provided mapping, a customer may define an object such as entity, table, or a database object as part of the mapping, however, because the customer defined object exists as part of the mapping and does not exist within the database or the blockchain, it may be considered a virtual entity. For instance, an admin may define the entities within via the virtual chain interface 1405 as well as define users and any required configuration fields or custom defined mappings.

For example, the customer may store data within table "X" within the host organization, but when it is going into blockchain, it is mapped to X+Y, which may be user specified. Therefore, the virtual chain interface will map the SQL-type commands to the blockchain data which is called X+Y based on the customer provided mapping. Such mappings may be stored as metadata on behalf of the customer, for instance, within a configuration file which is read by the virtual chain interface.

The customer may have data in the blockchain called ABC, and then wish, for whatever reason, to change the data to A1B1C1. The customer can specify such a mapping and the virtual chain interface will then automatically generate an add asset transaction in the blockchain and put the transaction pending for the user so that the user knows that the transaction is in a pending state and not committed until consensus is reached and sufficient mining has occurred such that the transaction is committed to the blockchain.

Once committed, an event is triggered from blockchain which the host organization's blockchain services interface 190 listens for, at which point the host organization also marks the data as committed, so as to keep the data status synchronized.

Also possible is that consensus is never reached and therefore the transaction fails. Again, the host organization's blockchain services interface 190 listens for the event indicating failure of the transaction, at which point the host organization marks the transaction as failed and the virtual chain interface performs any necessary rollback operation so as to maintain synchronization.

It is also feasible that some other participating node adds updated information to the blockchain superseding old data for an asset. When the data is refreshed by any participating node, including being read by the virtual chain interface pursuant to a structured query requesting the data to be retrieved, the latest value will be retrieved, regardless of what entity updated the value. Because the data is stored within a distributed ledger, any participating node specifying the correct key may submit a transaction to update the blockchain asset according to such an embodiment.

According to another embodiment, the host organization's blockchain services interface 190 listens for any event or change to specified blockchain assets, upon which an event will be triggered, such that a user requesting notification pertaining to changes to a specified asset will be notified by the host organization, without having to go and retrieve the data to and check to determine if changes have been made.

For instance, as part of the transaction management performed by the virtual chain interface, whenever an asset is created in the blockchain, the blockchain services interface 190 keeps the blockchain asset ID with the Salesforce ID together so that commit and non-commit status can be tracked. Therefore, the blockchain asset ID with the Salesforce ID for that particular asset can also be monitored for any changes by another entity.

According to certain embodiments, the data within the blockchain asset is available within the host organization via the participating node of the host organization, and therefore, the latest copy is always available to the host organization from the distributed ledger, assuming the data has been committed.

According to one embodiment, a user that authenticates with the host organization will result in the virtual chain interface contextually mapping that user's host organization identifier to a cryptographic ID utilized by the blockchain. In such a way, the user need not know or provide the cryptographic ID as it will be supplied for all transactions by the virtual chain interface 1405.

FIG. 15 depicts a flow diagram illustrating a method 1500 for implementing a virtual chain model for distributed ledger technologies in a cloud based computing environment such as a database system implementation supported by a processor and a memory to execute such functionality to provide cloud based on-demand functionality to users, customers, and subscribers.

Method 1500 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, the hosted computing environment 111, the blockchain services interface 1150, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1500 depicted at FIG. 15, at block 1505, processing logic operates a blockchain interface to a blockchain on behalf of a plurality of tenants of the host organization, wherein each of the plurality of tenants are participating nodes with the blockchain.

At block 1510, processing logic receives a login request from a user device.

At block 1515, processing logic authenticates the user device with the host organization.

At block 1520, processing logic correlates the authenticated user device with a cryptographic ID for the blockchain corresponding to the authenticated user device.

At block 1525, processing logic receives a structured query from the user device to be executed against the blockchain, the structured query specifying a transaction command and a data object upon which the transaction command is to be performed.

At block 1530, processing logic translates the transaction command of the structured query to native blockchain protocol code and translating the data object to a blockchain asset ID stored within the blockchain to form a native blockchain transaction.

At block 1535, processing logic executes the native blockchain transaction with the blockchain.

According to another embodiment of method 1500, the data object specified via the structured query is specified via a host organization object ID; and in which translating the data object to a blockchain asset ID includes translating the host organization object ID to the blockchain asset ID based on a 1:1 mapping maintained by a virtual chain interface of the host organization.

According to another embodiment of method 1500, correlating the authenticated user device with the cryptographic ID for the blockchain corresponding to the authenticated user device includes identifying the cryptographic ID for the blockchain based on a userID utilized to authenticate the user device with the host organization or based on a customer organization ID (OrgID) contextually associated with the authenticated user device, in which the user device is an authenticated member of the customer organization associated with the OrgID.

According to another embodiment, method 1500 further includes: parsing a plurality of query elements from the structured query via a query parser to identify query elements; and translating the parsed query elements to native blockchain protocol code via a query logic translator to form the native blockchain transaction.

According to another embodiment of method 1500, the native blockchain transaction specifies the cryptographic ID, the blockchain asset ID stored within the blockchain, and data to be added or retrieved from the payload of the asset ID based on the structured query received from the user device.

According to another embodiment of method 1500, executing the native blockchain transaction with the blockchain includes executing an asynchronous transaction via the blockchain; and tracking status of the native blockchain transaction to determine whether the native blockchain transaction is pending, committed, or failed.

According to another embodiment, method 1500 further includes: maintaining both the blockchain asset ID with a host organization object ID corresponding to the data object specified via the structured query and tracking the status of the native blockchain transaction based on the blockchain asset ID by subscribing to any events within the blockchain associated with the blockchain asset ID; receiving an event from the blockchain associated with the blockchain asset ID; correlating the blockchain asset ID to the host organization object ID; and notifying the user device of the event, in which the event specifies one of (i) the native blockchain transaction remains pending, (ii) the native blockchain transaction is committed to the blockchain, or (iii) the native blockchain transaction has failed.

According to another embodiment, method 1500 further includes: determining the native blockchain transaction has failed and performing a rollback procedure for the native blockchain transaction including notifying the user device that the native blockchain transaction has failed.

According to another embodiment of method 1500, the structured query from the user device corresponds to a blockchain asset for which a prior transaction remains in a pending and non-committed state; and indicating to the user device that the blockchain asset addressed by the structured query is subject to the prior transaction which remains in the pending and non-committed state.

According to another embodiment of method 1500, the structured query specifies one of a SELECT command term, an UPDATE command term, or an INSERT command term; and in which translating the transaction command of the structured query includes translating the SELECT command term, the UPDATE command term, or the INSERT command term into a native command term compliant with the blockchain.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each of the plurality of tenants are participating nodes with the blockchain; receiving a login request from a user device; authenticating the user device with the host organization; correlating the authenticated user device with a cryptographic ID for the blockchain corresponding to the authenticated user device; receiving a structured query from the user device to be executed against the blockchain, the structured query specifying a transaction command and a data object upon which the transaction command is to be performed; translating the transaction command of the structured query to native blockchain protocol code and translating the data object to a blockchain asset ID stored within the blockchain to form a native blockchain transaction; and executing the native blockchain transaction with the blockchain.

According to another embodiment, there is a system to execute at a host organization, in which the system includes: a memory to store instructions; a processor to execute instructions; in which the processor is to execute a blockchain interface to a blockchain on behalf of a plurality of tenants of the host organization, in which each of the plurality of tenants are participating nodes with the blockchain; a receive interface to receive a login request from a user device; an authenticator to authenticate the user device with the host organization; a virtual chain interface correlate the authenticated user device with a cryptographic ID for the blockchain corresponding to the authenticated user device; the receive interface to receive a structured query from the user device to be executed against the blockchain, the structured query specifying a transaction command and a data object upon which the transaction command is to be performed; a query logic translator to translate the transaction command of the structured query to native blockchain protocol code and translating the data object to a blockchain asset ID stored within the blockchain to form a native blockchain transaction; and a blockchain services interface to execute the native blockchain transaction with the blockchain.

Figure 16A:
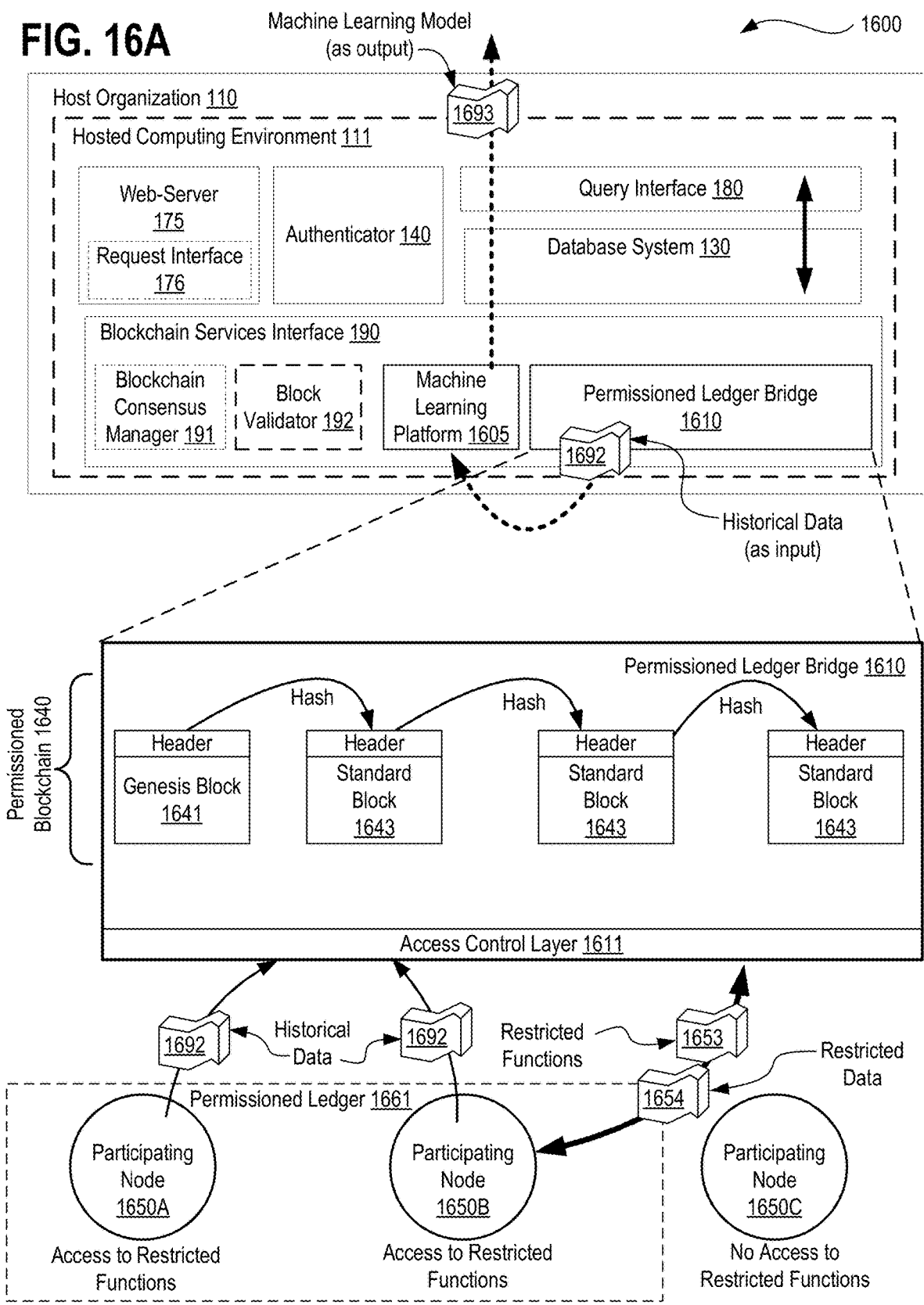
FIG. 16A depicts another exemplary architecture, with additional detail of a permissioned blockchain which implements machine learning models for smart contracts using distributed ledger technologies in a cloud based computing environment, in accordance with described embodiments.

FIG. 16A depicts another exemplary architecture 1600, with additional detail of a permissioned blockchain 1640 which implements machine learning models for smart contracts using distributed ledger technologies in a cloud based computing environment, in accordance with described embodiments.

Smart contracts, in accordance with the described embodiments, are implemented and executed as part of distributed ledger, utilizing distributed ledger technology (DLT). Unfortunately, conventional DLT mechanisms lack a mechanism by which smart contracts may be enabled to run machine learning models (e.g., such as a neural network) as part of the smart contract transaction execution on the blockchain network. Such machine learning models may be necessary for certain use cases or simply prove beneficial in other instances. Consider for example the problem of fraud detection for a transaction utilizing a specified smart contract. Pursuant to the smart contract, it may be appropriate to reject and/or alert for transactions in a DLT in which the reject and/or alert rules are specified pursuant to a machine learning model rather than created manually.

It is therefore in accordance with the described embodiments that the host organization executes and exposes to remote users, a cloud based and on-demand machine learning platform (e.g., such as the salesforce Einstein machine learning platform), in which historical data is uploaded by each of a plurality of participating nodes that are part of a permissioned ledger 1661 into the cloud based machine learning platform 1605. Based on the tuned and weighted parameters of the machine learning platform 1605, a machine learning model 1693 is generated as an output from the host organization's machine learning platform 1605. Next, a smartflow contract administrator can specify a smart contract where the newly generated machine learning model 1693 is to be used.

According to a particular embodiment, the machine learning model is saved in a highly encrypted format in an IPFS/Distributed Ledger File System as encrypted JSON. Pursuant to such embodiments, the generated machine learning model is immutable and cannot be modified, even by the participating nodes of the permissioned blockchain 1640 network. For instance, the encrypted and immutable machine learning model 1693 may be stored via an Inter-Planetary File System (IPFS) implementation, which is a protocol and network designed to create a content-addressable, peer-to-peer method of storing and sharing hypermedia in a distributed file system.

Once the machine learning model is trained, generated, and stored, smart code is then generated as part of the specified smart contract utilizing the machine learning model stored within the IPFS. Ultimately, when a transaction arrives for processing via the permissioned blockchain 1640 network, the smart contract is executed, and as part of the smart contract execution, the machine learning model stored as encrypted JSON via the IPFS/DLT will be deserialized and executed by each of the participating nodes of the permissioned blockchain network 1640 which can then accept or reject the transaction pursuant to the criteria defined by the machine learning model 1693.

As depicted here, there is again a host organization 110 having a hosted computing environment 111 operating therein with a web-server 175, request interface 176, authenticator 140, query interface 180, and database system 130. As before, there is also a blockchain services interface 190 via which the host organization 110 provides a variety of blockchain related services to customers, subscribers, and other organizations and tenants which utilize the cloud computing services provided by the host organization 110, including consensus management via the blockchain consensus manager 191 and block validation via the blockchain validator 192.

Further depicted within the permissioned blockchain 1640 are a series of blocks forming the accepted blockchain, formed from the genesis block 1641 and then a series of standard blocks 1643, each having a header connected to a prior hash. There are not currently any fork blocks or side chain blocks for this permissioned blockchain, although such mechanisms remain permissible.

According to described embodiments, the host organization 110 hosts a cloud-based machine learning platform 1605 such as the salesforce Einstein machine learning platform. As described herein, the machine learning platform 1605 provides an Artificial Intelligence (AI) application enabled to analyze and process customer data, such as sales data and other common business metrics. According to certain embodiments, the machine learning platform 1605 receives as input, customer data from either the databases 130 of the host organization or receives data from external sources as directed by the customer (e.g., retrievable via the query interface 180), which is then received via the host organization 110 at, for example, the request interface 176 and directed toward the machine learning platform 1605 for processing.

The machine learning platform 1605 then processes the received information as training data for a neural network of the machine learning platform to generate a machine learning model 1693 which may then be utilized to deliver accurate predictions and to provide suggestions that are tailored to a business' or a customer organization's unique needs.

The machine learning platform 1605 may further be equipped with an automation capability that proactively applies machine learning methodologies to the customer data so as to yield a more in-depth understanding of customer data or other business metrics by which a customer organization may then better leverage their existing data or better understand how to connect with current and prospective customers on a deeper level.

Using the machine learning platform 1605, sales representatives may access data science features even without prior knowledge of such features and without a technical understanding of how such features work, thus making such sales representatives more efficient and better capable to handle customers.

Further still, such a machine learning platform 1605 exposes a development platform where users can design and publish their own intelligent and predictive applications to further tailor machine learning models and solutions enabled by the machine learning platform 1605 to the unique and specific requirements of their particular customer organization, including applying the machine learning model 1693 generated by the machine learning platform 1605 to smart contract transactions executed on behalf of the customer organizations.

For instance, the machine learning platform 1605 may be utilized by businesses to gain a deeper understanding of their sales operations by, for example analyzing data and identifying patterns that occur within their data and then in turn accurately predicting future trends or to accurately predict whether a transaction is legitimate or fraudulent and apply an approval, rejection, or alert condition to such transactions based on the machine learning model 1693. Such capabilities enable businesses to remain competitive and attentive to the needs of their customers and to protect themselves from potential fraud. Moreover, because the process is fully automated on behalf of the user, the business can attend to their core business objectives without having to learn the technical complexities, training requirements, and implementation details associated with use of a machine learning platform 1605. Rather, the host organization 110 exposes an intuitive interface (such as the smart flow engine depicted at FIG. 11A) by which such users may leverage the machine learning platform 1605 capabilities of the host organization as an on-demand cloud based service, even as a novice user.

According to certain embodiments, the machine learning platform 1605 references historical data 1692, in which the historical data 1692 is uploaded into the machine learning platform 1605 by each of a plurality of blockchain participating nodes 1650A and 1650B that are part of a permissioned ledger 1661 implemented by a permissioned blockchain 1640 network, with the historical data 1692 consumed as an input for the machine learning platform 1605. According to such an embodiment, the historical data 1692 is uploaded by the participating nodes 1650A and 1650B into the machine learning platform 1605 via the permissioned ledger bridge 1610 which provides an interface between the machine learning platform 1605 and the permissioned ledger 1661.

Based on a plurality of configurable weights and parameters, which may be tuned for the specific customer organization, the machine learning platform then generates a machine learning model 1693 as its output, which is specific to the particular user or the particular customer organization utilizing the machine learning platform.

According to one embodiment, the permissioned ledger bridge 1610 implements a declarative mechanism which permits an admin to specify a smart contract which is to consume the generated machine learning model 1693 output by the machine learning platform 1605 as part of the execution of the smart contract for any transaction to which the smart contract applies, based on a transaction type for the smartcontract, or based on the machine learning model being specified as a default for smartcontract transactions processed via the permissioned blockchain network 1640.

For instance, with reference back to FIG. 11A, the GUI manager at element 1110 of FIG. 11A depicts the flow designer GUI 1111 interface to a user device via which users may interact with the host organization. As described above, a smartflow contract engine 1105 in coordination with the GUI manager interprets the various rules, conditions, and operations provided by the user, to generate a smartflow contract which is then translated or written into the target blockchain protocol or applied by a blockchain protocol to transactions executed by the blockchain to which that blockchain protocol applies. According to such an embodiment, an admin may thus further specify a machine learning model for use with the generated smart flow contract, including specifying the machine learning model 1693 generated as the output by the machine learning platform 1605. According to a particular embodiment, the generated machine learning model is called directly from the generated smart flow contract, and thus, when a smart flow transaction is processed via the permissioned blockchain, the flow for the smart contract is executed, which in turn calls and executes the referenced machine learning model.

In such a way, an admin may thus utilize the flow designer GUI 1111 of FIG. 11A to completely define how a particular process, event, agreement, contract, purchase, or some other transaction needs to occur, including dependencies, checks, required process inputs and outputs, triggers, etc., some of which are defined by the machine learning model 1693 generated as the output of the machine learning platform 1605 based on the specific customer organization's historical data 1692 as received by the machine learning platform 1605 from the permissioned ledger 1661 (e.g., via the permissioned ledger bridge 1610).

In accordance with such an embodiment, once a user has completed defining the smart contract flow, including all of its operational blocks, conditions, triggers and events, and which machine learning model 1693 is to be consumed or utilized for the smart contract, the smartflow contract engine 1105 of FIG. 11A then takes each of the individual blocks and translates them into a native target blockchain protocol via the blockchain translator 1130, and then generates a transaction to write the translated smartflow contract 1145 into the blockchain 1140 via the blockchain services interface 190.

With reference again to FIG. 16A, as depicted here, a permissioned ledger 1661 (as implemented by the permissioned blockchain 1640) provides a blockchain implementation which maintains an access control layer 1611 by which to permit or prohibit access to certain functions and/or data, with only those participating nodes 1650A and 1650B having access to the restricted functions being permitted to be perform and/or view the restricted functions 1653 and restricted data 1654 of the permissioned blockchain 1640.

For instance, the access control layer 1611 may specify a subset of restricted functions 1653 which are permissibly performed and accessed only by certain identifiable participants of the permissioned ledger 1661, such as the participating node 1650A and participating node 1650B which fall within the dashed line forming the permissioned ledger 1661. Notably, there is also a participating node 1650C which has the ability to view the content of the permissioned blockchain 1640, yet participating node 1650C has no access to the restricted functions 1653 for the permissioned ledger 1651 as specified and managed by the access control layer 1611 for the permissioned ledger. In other embodiments, read-only view access to the permissioned ledger may be wholly restricted to only those with access to the restricted functions 1653, such as participating nodes 1650A and 1650B, and thus, participating node 1650C would not only lack access to the restricted functions 1653 for the permissioned ledger 1661, but also lack access to any of the restricted data 1654 stored by the permissioned blockchain 1640 itself.

Such permissioned blockchains differ from public blockchains and differ also from private blockchains. Depending on the particular blockchain protocol and the implementation decisions for the blockchain, a blockchain can be built and accessed in multiple ways. For instance, Bitcoin provides a popular cryptocurrency blockchain which allows anyone to participate in the network (as a participating node) and with the uninhibited functional capacity of a full node, or a contributing miner. Therefore, an access control layer 1611 simply does not exist for the Bitcoin blockchain protocol implementation, which thus permits any system to take on a read-only role, or to introduce and make legitimate and permissible changes to the blockchain, such as adding a new block or maintaining a full copy of the entire blockchain.

Such blockchains, which allow equal and open rights to all participants, are referred to as open, public, or unpermissioned blockchains, readily identifiable by the lack of an access control layer 1611.

Additionally, there are certain blockchains that need special permissions to read, access, and write information on them. The intrinsic configuration of such blockchains controls the participants' transactions and defines their roles in which each participant can access and contribute to the blockchain. The configuration may also include maintaining the identity of each blockchain participant on the network. Such blockchains are therefore called permissioned blockchains, such as the permissioned blockchain 1640 which is utilized here and which implements the permissioned ledger 1661. For example, the blockchain protocol for the permissioned blockchain may specify roles for a select number of participants who can act as transaction validators on the permissioned blockchain network.

Permissioned blockchains sometimes used by industry-level enterprises and businesses, for which security, identity and role definition are important. For instance, a manufacturer producing a product may use a permissioned blockchain that also takes care of supply chain management. However, the transactions that occur on such a blockchain may also involve logistics partners, financing banks, and other vendors involved in the supply and financing process. These external parties, though part of the permissioned blockchain network 1640, need not know the price at which the manufacturer supplies the products to various clients, with such information being controlled via the access control layer 1611 of the permissioned blockchain network 1640 as restricted data 1654 or perhaps certain participants are prohibited from accessing restricted functions 1653 of the permissioned blockchain network pursuant to their role, such as adding a transaction to the permissioned blockchain or voting in a consensus mechanism for the permissioned blockchain. Use of permissioned blockchains allows such role-limited implementations.

A developer configuring a permissioned blockchain may opt to make a few select records, like product name and quantity involved in a transaction, available for every participating node 1650A, 1650B, and 1650C to read, despite participating node lacking access to the restricted functions 1653 and lacking access to restricted data 1654. However, only select participants 1650A and 1650B are allowed to view the transaction price which is defined as restricted data 1654 or to perform certain protected functions, which are defined by the access control layer 1611 as restricted functions 1653. Other implementations may include limiting participants from acting as participating nodes on the permissioned blockchain 1640 network, which enhances the network's security.

According to certain embodiments, the permissioned blockchain 1640 network provisions the access-control layer 1611 in such a way that it is built into the blockchain participating nodes 1650A-C themselves and all permissioning and profile maintenance is handled by the access-control layer 1611, and thus, the permissioned blockchain 1640 differs from un-permissioned and public blockchain networks which do not implement such an access control layer 1611.

Permissioned blockchains are further distinguished from the private blockchain networks described above, as private blockchain networks only allow known nodes to participate in the network. The nodes either have access to the network and thus have access to all functionality or they do not have access to the network, and therefore, cannot view any data and cannot perform any functions on the private blockchain network. For example, a bank may operate a private blockchain through specified group of nodes internal to the bank or a bank may participate as a participating node with access to restricted data and restricted functions within a permissioned blockchain network 1640.

Figure 16B:
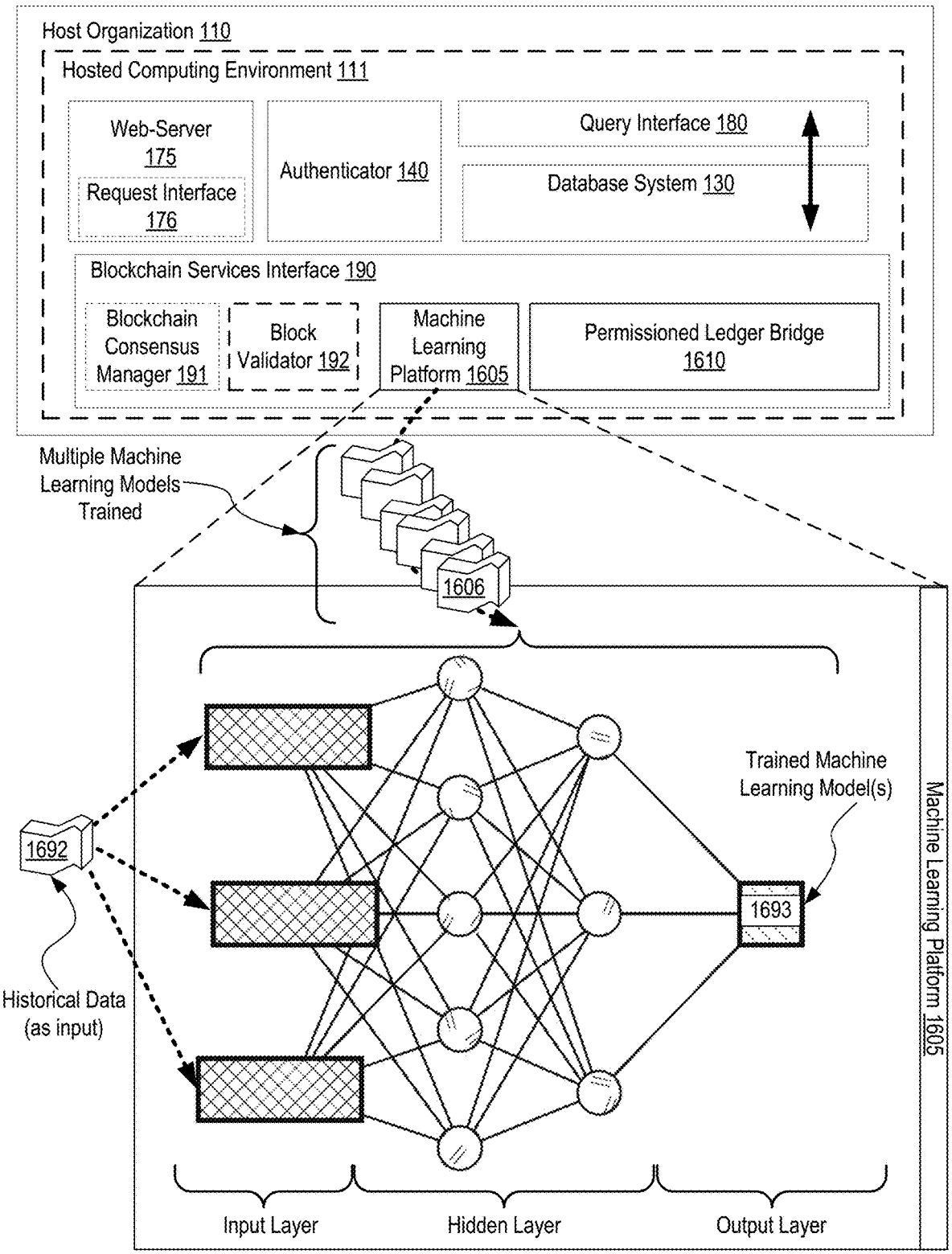
FIG. 16B depicts another exemplary architecture, with additional detail of a pertaining to the neural network of the machine learning platform, in accordance with described embodiments.

FIG. 16B depicts another exemplary architecture 1601, with additional detail of a pertaining to the neural network of the machine learning platform 1605, in accordance with described embodiments.

According to one embodiment, the machine learning platform implemented via the host organization implements a partner marketplace within which all partners (e.g., all of the participating nodes on the permissioned blockchain) can contribute their data in an anonymized format to the machine learning platform 1605 for use in training the new machine learning model. In such a way, the partners can collaborate and collectively present to the machine learning platform a large collection of historical data 1692 for use in training the neural network of the machine learning platform 1605, while ensuring that their customer's private and protected information is not exposed.

According to certain embodiments, the machine learning platform persists multiple models 1606 via which can be serialized and de-serialized and maintained by the machine learning platform 1605. The machine learning platform then applies the received partner data in its anonymized format to the variously available machine learning models 1606 maintained by the machine learning platform so as to generate multiple candidate machine learning models. Then, according to such an embodiment, one of the potential candidate machine learning models output from the machine learning platform is selected based on the prediction accuracy of the candidate machine learning model, or some other hyperparameter or model evaluation parameters for machine learning models.

For instance, based on training data for the machine learning model which identifies past historical smart contract transactions as being either fraudulent or non-fraudulent (e.g., valid, allowable, legitimate, etc.) the machine learning model operates to derive or "learn" which conditions, parameters, criteria, etc., for those past historical smart contract transactions contributed to any given smart contract transactions being considered fraudulent or non-fraudulent. For instance, the originating IP address associated with a smart contract transaction may provide some correlation to fraudulent transactions. Similarly, transaction amount, transaction conditions, transaction timing, transaction participants, transaction format, transaction goods/services, transaction frequency, etc., may likewise provide some correlation to fraudulent transactions or some correlation to transactions which are not fraudulent.

Once trained, the machine learning model can be applied to the same or to a different learning set of training data to establish various evaluation parameters, including a predictive accuracy for any given model and any given set of training data utilized.

Neural network hyperparameters are utilized by machine learning model algorithms to set variables that are to be utilized for optimizing the machine learning model's parameters. Setting the values of hyperparameters influences model selection from among the multiple machine learning models trained 1606 by selecting which model is to be used from a hypothesized set of all possible models or from the available models maintained by the machine learning platform. In certain embodiments, the hyperparameters are manually selected whereas in other embodiments, the hyperparameters are selected by a search algorithm, or optimized by some "hyper-learner" implementation.

The neural network implemented by the machine learning platform can have many hyperparameters, including those which specify the structure of the network itself and those which determine how the network is trained.

For instance, the exemplary Artificial Neural Network (ANN) depicted here utilizes machine learning algorithms in which the input variables defined by the multiple machine learning models to be trained 1606 and the historical data 1692 provided predict the model's accuracy and expected error for the smart contract transactions (e.g., whether a transaction is accurately or erroneously indicated as legitimate or fraudulent, etc.), in accordance with described embodiments.

The neural network consumes as input several input hyperparameters which are which are utilized to train the neural network and produce candidate machine learning models for potential use by the permissioned blockchain network pursuant to consensus by the participating nodes or other selection criteria.

Neural networks, such as the Artificial Neural Network (ANN) shown here, are able to approximate any arbitrary formula. Therefore, in accordance with described embodiments, a neural network is trained pursuant to each of a plurality of distinct machine learning models 1606 maintained by the machine learning platform of the host organization 110 to describe the relationship between a smart contract's characteristics, features, and other data elements and the ultimate status of that transaction as being legitimate or fraudulent.

The neural network must consume a sufficient quantity of input parameters at the input layer in the form of the historical data for past transactions as provided by the partner network for known fraudulent and known legitimate transactions, so as to enable such learning.

Through the application of machine learning techniques using, for instance, the depicted Artificial Neural Network (ANN) as well as Convolutional Neural Networks (CNN), it is possible to train the available multiple machine learning models 1606 maintained by the machine learning platform 1605 to more accurately predict whether an incoming smart contract transaction is legitimate or fraudulent, assuming that model is selected and utilized as part of the smart contract transaction processing, in which the machine learning models 1606 process the available inputs and parameters via the algorithms embedded within the hidden layer(s) to derive a trained candidate machine learning model for each of the multiple machine learning models 1606 maintained by the machine learning platform 1605. One of the candidate machine learning models may then be selected for use based on its performance criteria.

Within the context of machine learning, an Artificial Neural Network (ANN) is a computational approach which is based on a large collection of neural units loosely modeling the way a biological brain solves problems with large clusters of biological neurons connected by axons. Each neural unit is connected with many others, and links can be enforcing or inhibitory in their effect on the activation state of connected neural units. Such systems are self-learning and trained rather than explicitly programmed and they excel in areas where the solution (e.g., accurate fraud detection) is difficult to express in a traditional computer program.

A so-called convolutional neural network (CNN, or ConvNet) is a type of feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation.

According to certain embodiments, geometric, geographic, or other visually perceptible source information derived from the historical data provided as input to the available machine learning models 1606 maintained by the machine learning platform is utilized to directly train the neural network to predict the amount of model error associated with the geometry or other layout defined. Once trained, the neural network provides a more accurate model which can then be implemented by manually configuring or manually programming selection criteria for legitimate or fraudulent smart contract transactions presented to the permissioned blockchain.

FIG. 16C depicts another exemplary architecture 1602, with additional detail of a permissioned blockchain 1640 which implements machine learning models for smart contracts using distributed ledger technologies in a cloud based computing environment, in accordance with described embodiments.

As described above, the machine learning platform 1605 generates as its output a machine learning model 1693 based on historical data 1692 received as input from the various participating nodes 1650A-C of the permissioned blockchain network's permissioned ledger 1661.

When a smart contract transaction reaches the permissioned blockchain network 1640, the generated machine learning model having consensus for use with transactions on the permissioned blockchain network is then retrieved, deserialized into, for example, JSON, object code, etc., as depicted by element 1696. The deserialized output of the retrieved machine learning model is then executed as part of the smart contract transaction on the permissioned blockchain network 1640.

In computing, JavaScript Object Notation (JSON) is an open-standard file format that uses human-readable text to transmit data objects consisting of attribute-value pairs and array data types (or any other serializable value) and provides a commonly utilized data format used for asynchronous browser-server communication, including as a replacement for XML in some AJAX-style systems.

Based on the data provided with the received smart contract transaction 1697 arriving at the permissioned blockchain network 1640, certain machine learning models may be applied and executed for the smart contract transaction 1697. For instance, a particular machine learning model may be selected and applied based specifically on a transaction type specified via the header of the incoming smart contract transaction. For example, based on the particular type of the transaction specified, as indicated by the header, different machine learning models may be executed for different smart contract transactions arriving at the same permissioned blockchain network 1640.

If the transaction type is not specified by the header of the incoming smart contract transaction, then a default machine learning model may be selected for the transaction, despite there being pre-specified transaction type/machine learning model pairs available for transactions on the permissioned blockchain network associating particular machine learning models that are to be applied to the pre-specified transaction types.

According to a particular embodiment, there is a transaction type to machine learning model mapping stored within the permissioned blockchain, and it is based on the mapping via which the particular machine learning model is identified, determined, and selected for use for any smart contract transaction being processed by the permissioned blockchain.

Regardless, upon the smart contract transaction 1697 arriving to the permissioned blockchain network 1640 for execution and a machine learning model being identified as a default or identified as an associated model for the transaction type specified, then the smart contract transaction 1697 executes its embodied business logic as defined by that smart contract and then, according to such an embodiment, at the end of the smart contract execution, a certain action is taken, as configured by the smart contract itself. In such a case, the administrator or developer of that smart contract transaction, has specified that this particular smart contract, when executed as a smart contract transaction 1697 by the permissioned blockchain network 1640 is to expressly execute the previously determined machine learning model as part of the final smart contract transaction 1697 execution to determine whether the particular transaction is a fraudulent transaction and thus rejected 1699 pursuant to the machine learning model, or to determine if the transaction is to be approved and executed 1698 as a valid transaction for the blockchain without alerts, or to determine if the transaction is suspect and thus trigger an alert which must be cleared prior to approval of the transaction, without immediately rejecting the transaction. Such determinations for approval, rejection, alert, etc., are again based on the particular filters, criteria, and other parameters established by the particular machine learning model applied to the smart contract transaction 1697, as generated by the machine learning platform 1605 of the host organization 110.

As depicted here, the machine learning platform 1605 of the host organization 110 may interact with different participating nodes 1650 of the permissioned blockchain 1640 via the permissioned ledger bridge 1610, such as a node representing each one of a collection of different customer organizations. In such an embodiment, each of the multiple distinct customer organizations may contribute historical data to the machine learning platform 1605, which is then utilized by the machine learning platform to inform the machine learning model. In such a way, the machine learning platform 1605 utilizes the historical data from the participating nodes 1650 in the permissioned blockchain network 1640 to train the neural network which generates the machine learning model for use with execution of a specified smart contract.

The generated machine learning model may be stored by the host organization 110, or stored within the permissioned blockchain network itself, for instance, within each of the participating nodes 1650, or stored within an IPFS, or stored within another queryable data source, such as a database system 130 within the host organization 110 or stored within a queryable source external from the host organization 110.

For instance, the generated machine learning model may be stored within a private sidechain of the permissioned blockchain 1640 which only the participating nodes 1650A and 1650B with access to restricted data and restricted functions are permitted to access, thus, participating nodes 1650C of the permissioned blockchain without access to the sidechain cannot access the generated machine learning model.

According to certain embodiments, once the machine learning model is generated, it is then distributed to each of the participating nodes 1650 of the permissioned blockchain network 1640 which possess sufficient access to the restricted functions and the restricted data of the permissioned blockchain network, such as participating nodes 1650A and 1650B which operate within the permissioned ledger 1661 of the blockchain network, separate from previously depicted participating node 1650C which lacks access to the restricted functions and restricted data.

According to one embodiment, the generated machine learning model is purposefully stored separately from the permissioned blockchain network 1640, rather than being stored within the permissioned blockchain itself, such as being stored within an IPFS network separate from the permissioned blockchain 1640.

Once generated and stored, the generated machine learning model is then specified as the model for use with executing the smart contracts (e.g., by default for smart contract transactions on that permissioned blockchain network or as specified for a particular type of smart contract transaction on that permissioned blockchain network), and the generated machine learning model is deployed to the participating nodes of the permissioned blockchain network which stored the generated machine learning model, or alternatively, access details and permissions are distributed to the participating nodes 1650 of the permissioned blockchain network 1650 such that the participating nodes can access the generated machine learning model when needed. Subsequently, when a smart contract transaction 1697 is initiated on that permissioned blockchain network 1640, the generated machine learning model is then applied on top of the executing smart contract transaction 1697, for instance, to control the approval, rejection, or alert status of such a transaction based on the parameters, criteria, filters, and other characteristics established by the machine learning model applied.

According to one embodiment, once the machine learning model is generated, it is presented to the permissioned blockchain network for validation by the participating nodes 1650 of the permissioned blockchain network. Thus, a specified machine learning model is not simply accepted and utilized, but rather, the participating nodes 1650 must establish consensus that the machine learning model presented is valid and appropriate for use for smart contract transactions on that blockchain.

Once consensus is reached by the participating nodes 1650 of the permissioned blockchain network 1640, the generated machine learning model then becomes the active or correct or validated machine learning model to be utilized for smart contract transactions 1697 executing against the permissioned blockchain network 1640. In such an embodiment, where consensus is reached by the participating nodes of the permissioned blockchain network, smart contract transactions 1697 cannot be executed without consuming the machine learning model and applying its various parameters, criteria, filters, and other characteristics established by the machine learning model (e.g., without referencing and utilizing the triggers, approval and rejection conditions, and filters as specified by the consensus agreed machine learning model). Stated differently, upon consensus being reached by the participating nodes of the permissioned blockchain network, all smart contract transactions 1697 on the permissioned blockchain network 1640 must apply the specified machine learning model 1696 based on the transaction type or based on the generated machine learning model having been agreed by consensus of the participating nodes 1650 as the default machine learning model for smart contract transactions 1697 on the permissioned blockchain network 1640.

According to certain embodiments, only participating nodes with access to the restricted functions of the permissioned blockchain network are capable of contributing to the consensus mechanism or voting for consensus of the presented machine learning model to be utilized for smart contract transactions 1697 on the permissioned blockchain network 1640. Similarly, only participating nodes with access to the restricted data of the permissioned blockchain network have access to the generated machine learning model upon consensus being reached for the presented machine learning model.

Take for instance a permissioned blockchain 1640 having implemented a permissioned ledger 1661 for banking industry participants, such as Chase, Bank of America and JP Morgan, and others. Any participating node 1650 within the permissioned ledger can utilize the cloud computing platform 1605 to specify the kinds of historical data that they wish to utilize for training the machine learning model about valid and legitimate transactions as well as the historical data that they have captured for fraudulent transactions.

Although the participating nodes represent different companies or different banks, such as Chase, Bank of America and JP Morgan, and therefore are technically in competition with one another, the participating nodes 1650 nevertheless have a common interest to participate on the permissioned blockchain network and contribute historical data to the machine learning platform via the permissioned blockchain network for training of the neural network and the generation of the machine learning model as all of the participating nodes will collectively benefit from improved fraud transactions for the smart contract transactions 1697 which are conducted amongst them or on behalf of any of them.

This is because where Chase, Bank of America and JP Morgan and the other participating nodes on the permissioned blockchain network contribute historical data to the machine learning platform 1605 for training and generation of the machine learning model, the machine learning model will be improved and thus better equipped to detect and correctly process valid transactions and to correctly reject fraudulent transactions executed as smart contract transactions 1697 on the permissioned blockchain network 1640.

In certain embodiments, many banks may participate on the permissioned blockchain network and utilize the machine learning model generated and applied to all smart contract transactions 1697 executed by the permissioned blockchain network 1640, however, only a subset of banks or a subset of the participating nodes may contribute historical data to the machine learning platform, as managed by the access control layer 1611, via which the machine learning model is trained and generated. In such a way, a subset of participating nodes may act as gate-holders for the historical data that is provided to the machine learning platform 1605 in the event that those participating nodes with access to the restricted functions which to limit participation on the basis of security, etc.

Figure 17:
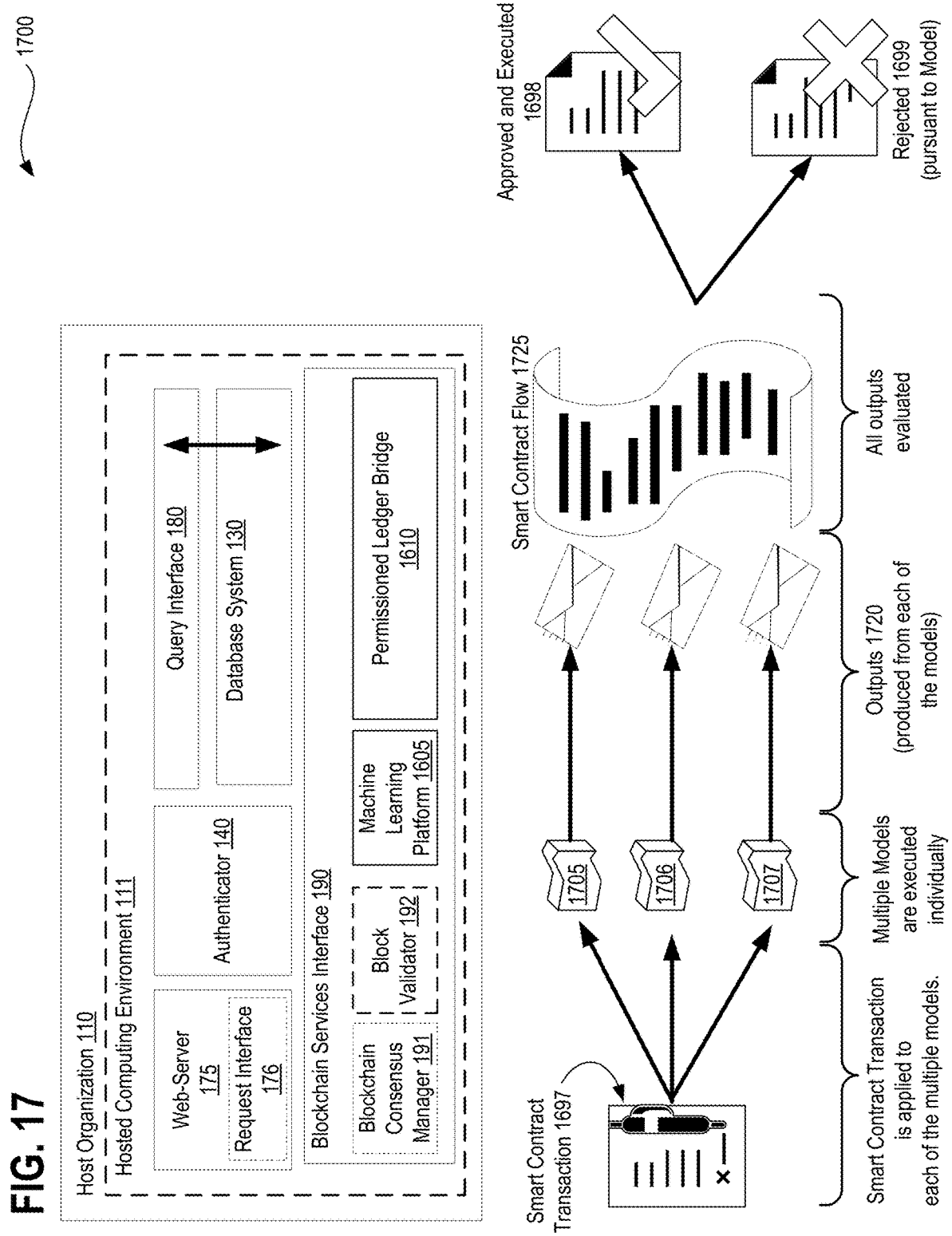
FIG. 17 depicts another exemplary architecture, with additional detail of a permissioned blockchain which implements machine learning models for smart contracts using distributed ledger technologies in a cloud based computing environment, in accordance with described embodiments.

FIG. 17 depicts another exemplary architecture 1700, with additional detail of a permissioned blockchain 1640 which implements machine learning models for smart contracts using distributed ledger technologies in a cloud based computing environment, in accordance with described embodiments.

As before, there is again depicted a host organization 110 having therein the hosted computing environment with its web-server 175, request interface 176, authenticator 140, query interface 180, database system(s) 130, and blockchain services interface 190, which includes the blockchain consensus manager 191, the block validator 192, the machine learning platform 1605 and the permissioned ledger bridge.

According to a particular embodiment, the candidate machine learning models available for selection or the machine learning model to be validated and agreed upon by the participating nodes via consensus is never shared with the participating nodes. Rather, only the accuracy of the model or other model evaluation parameters are shared with the participating nodes so as to maintain secrecy of the model's particular parameters and considerations which are utilized to determine whether a particular smart contract transaction is legitimate or fraudulent. In other embodiments, the participating nodes can view the model, but cannot modify the model as it is stored in an immutable format, despite being viewable by the participants.

According to certain embodiments, multiple candidate models are selected for execution by default for smart contract transactions or multiple candidate models are selected for execution specific to a particular transaction type for smart contract transactions. Consequently, there are multiple models 1705, 1706, and 1707 which are to be executed individually for every smart contract transaction 1697 to which they are mapped as the corresponding models for the smart contract transaction type or for which the multiple models 1705, 1706, and 1707 are configured as the default models 1705, 1706, and 1707 to be applied to the smart contract transaction 1697.

In such an event, the multiple selected models will be executed in serial, one after another, until all such models are executed for the smart contract transaction, in which each of the multiple selected models will produce an output which is then to be evaluated by the smart contract flow for every transaction, upon which the smart contract logic determines based on the output whether the transaction is valid, fraudulent, suspicious, etc. Alternatively the models may be executed in parallel or in any specified order which is configurable via the smart contract flow.

As shown here, the models 1705, 1706, and 1707 are executed individually and each produces output, resulting in outputs 1720, which are then evaluated by the smart contract flow 1725 logic. Ultimately, the smart contract flow 1725 logic determines, based on the model outputs 1720, whether the smart contract transaction is to be approved and executed 1698 and thus written into the blockchain or rejected 1699.

Figure 18:
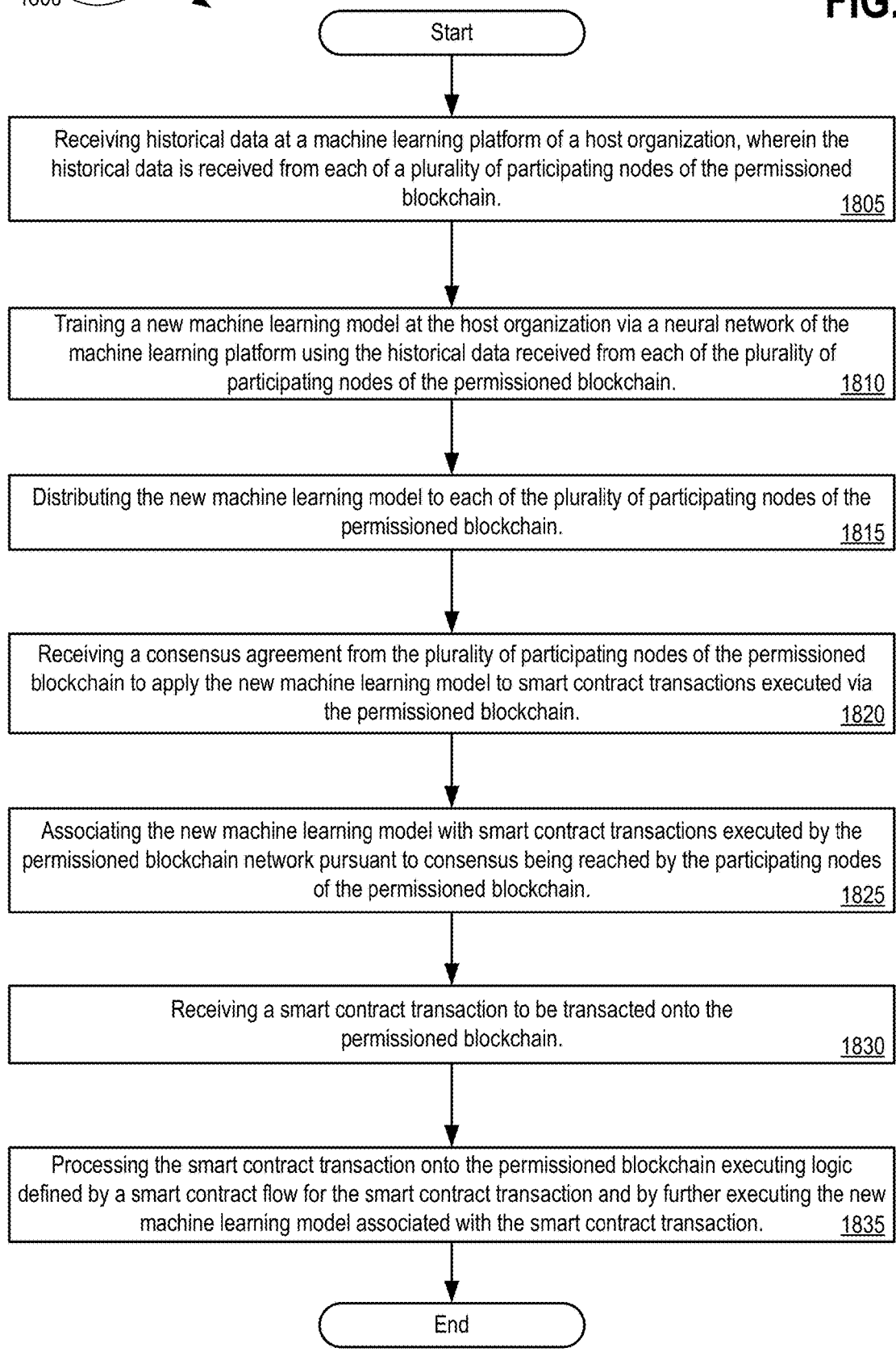
FIGS. 18 and 19 depict flow diagrams illustrating methods for implementing machine learning models for smart contracts using distributed ledger technologies in a cloud based computing environment, in accordance with described embodiments.
Figure 19:
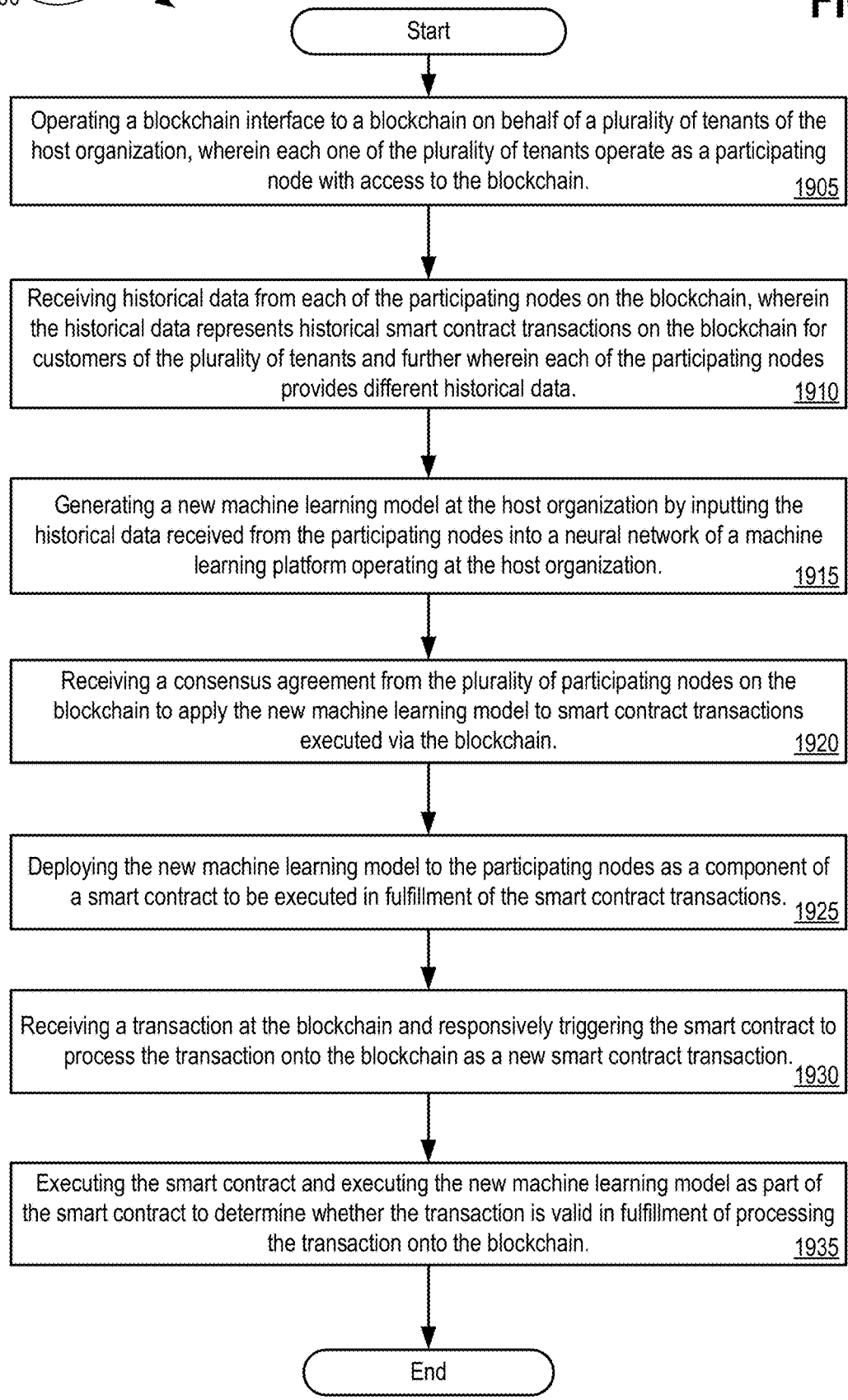

FIGS. 18 and 19 depict flow diagrams illustrating methods 1800 and 1900 for implementing machine learning models for smart contracts using distributed ledger technologies in a cloud based computing environment such as a database system implementation supported by a processor and a memory to execute such functionality to provide cloud based on-demand functionality to users, customers, and subscribers.

Methods 1800 and 1900 may be performed by processing logic that may include hardware (e.g., circuitry, dedicated logic, programmable logic, microcode, etc.), software (e.g., instructions run on a processing device) to perform various operations such as receiving, training, distributing, associating, transacting, processing, transmitting, analyzing, triggering, pushing, recommending, defining, retrieving, parsing, persisting, exposing, loading, operating, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1150, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1800 depicted at FIG. 18, at block 1805, processing logic receives historical data at a machine learning platform of a host organization, wherein the historical data is received from each of a plurality of participating nodes of the permissioned blockchain.

At block 1810, processing logic trains a new machine learning model at the host organization via a neural network of the machine learning platform using the historical data received from each of the plurality of participating nodes of the permissioned blockchain.

At block 1815, processing logic distributes the new machine learning model to each of the plurality of participating nodes of the permissioned blockchain.

At block 1820, processing logic receives a consensus agreement from the plurality of participating nodes of the permissioned blockchain to apply the new machine learning model to smart contract transactions executed via the permissioned blockchain.

At block 1825, processing logic associates the new machine learning model with smart contract transactions executed by the permissioned blockchain network pursuant to consensus being reached by the participating nodes of the permissioned blockchain.

At block 1830, processing logic receives a smart contract transaction to be transacted onto the permissioned blockchain.

At block 1835, processing logic processes the smart contract transaction onto the permissioned blockchain executing logic defined by a smart contract flow for the smart contract transaction and by executing the new machine learning model associated with the smart contract transaction.

According to such an embodiment, the new machine learning model may be utilized to predict whether the smart contract transaction is legitimate and should therefore be approved, or is predicted to be fraudulent, and should therefore be rejected.

With reference to the method 1900 depicted at FIG. 19, at block 1905, processing logic operates a blockchain interface to a blockchain on behalf of a plurality of tenants of the host organization, wherein each one of the plurality of tenants operate as a participating node with access to the blockchain.

At block 1910, processing logic receives historical data from each of the participating nodes on the blockchain, wherein the historical data represents historical smart contract transactions on the blockchain for customers of the plurality of tenants and further wherein each of the participating nodes provides different historical data.

At block 1915, processing logic generates a new machine learning model at the host organization by inputting the historical data received from the participating nodes into a neural network of a machine learning platform operating at the host organization.

At block 1920, processing logic receives a consensus agreement from the plurality of participating nodes on the blockchain to apply the new machine learning model to smart contract transactions executed via the blockchain.

At block 1925, processing logic deploys the new machine learning model to the participating nodes as a component of a smart contract to be executed in fulfillment of the smart contract transactions.

At block 1930, processing logic receives a transaction at the blockchain and responsively triggering the smart contract to process the transaction onto the blockchain as a new smart contract transaction.

At block 1935, processing logic executes the smart contract and executing the new machine learning model as part of the smart contract to determine whether the transaction is valid in fulfillment of processing the transaction onto the blockchain.

For instance, the transaction arriving at the blockchain may be considered the trigger, such that when the transaction arrives at the blockchain for processing, an event listener of the host organization or other mechanism monitoring the blockchain evaluates the arriving transaction to determine whether the transaction matches a specified smart contract. For instance, when the arriving transaction of a type ABC, arriving from entity XYZ, then the smart contract is matched to that transaction and respectively executed. Moreover, because the machine learning model is an element of, or a part of, or referenced by that particular smart contract matched to the arriving transaction, then triggering the smart contract will in turn initiate execution of the new machine learning model due to the fact that the new machine learning model is referenced by the smart flow for the smart contract, in which the smart flow dictates what elements and logic is to be executed in fulfillment of and processing for the arriving transaction having now been mached to the smart contract in question. Thus, the transaction arrives at the blockchain, is matched to the smart contract which initiates processing of the transaction via the smart flow's logic for that smart contract, within which the new machine learning model is referenced and thus executed, with the execution of the new machine learning model providing as an output, and indication of whether that transaction shall be considered valid or invalid or fraudulent or non-fraudulent, etc. Assuming the transaction is considered valid, then the smart contract's execution will transact the arriving transaction onto the blockchain as a new smart contract transaction.

According to another embodiment, it is the smart contract's execution which actually creates a transaction (e.g., creates the new smart contract transaction) and it is this new smart contract transaction which is then transacted onto the blockchain itself in fulfillment of the arriving transaction, with the smart contract carrying out the creation of the new smart contract transaction, the execution of the smart contract's smart flow and the execution of the new machine learning model which is referenced or embedded within the smart contract's smart flow, thus permitting the new machine learning model to be processed as a component of, or an element of, the smart contract.

According to another embodiment of methods 1800 and 1900, the smart contract to be executed in fulfillment of the smart contract transactions is generated from smart flow for the smart contract; and wherein deploying the new machine learning model to the participating nodes as a component of a smart contract comprises linking the new machine learning model via the smart flow for the smart contract; in which linking the new machine learning model causes the smart contract to execute the new machine learning model as part of the smart contract's smart flow for any smart contract transaction on the blockchain processed utilizing the smart contract having the new machine learning model linked therein; and wherein output of the new machine learning model execution specifies whether the smart contract transaction is to be accepted or rejected.

According to another embodiment of methods 1800 and 1900, the new machine learning model is stored as an encrypted JavaScript Object Notation (JSON) compatible object; wherein deploying the new machine learning model to the participating nodes as a component of a smart contract comprises linking the new machine learning model via the smart flow for the smart contract to the encrypted JSON compatible object. According to such an embodiment, executing the smart contract includes resolving the link to the encrypted JSON compatible object and deserializing the encrypted JSON compatible object for execution as part of executing the smart contract.

According to another embodiment, methods 1800 and 1900 further include: transacting the new smart contract transaction onto the blockchain when the machine learning model indicates the new smart contract transaction is valid and prohibiting the new smart contract transaction from being transacted onto the blockchain when the machine learning model indicates the new smart contract transaction is fraudulent; and in which the machine learning model indicates the new smart contract transaction is valid or fraudulent via one of: returning an "invalid" output for the new smart contract transaction; returning a "fraudulent" output for the new smart contract transaction; returning a predictive result and a corresponding confidence score that the new smart contract transaction is "invalid" or "fraudulent"; and returning the predictive result and the corresponding confidence score that the new smart contract transaction is "valid," "allowable" or "non-fraudulent".

According to another embodiment of methods 1800 and 1900, operating the blockchain interface to the blockchain on behalf of a plurality of tenants of the host organization, includes: executing the blockchain interface to a permissioned blockchain network which defines one or more of restricted functions and restricted data; and in which each of the tenants operating as participating nodes on the permissioned blockchain collectively form a permissioned ledger of the permissioned blockchain granting access rights for the participating nodes to the restricted functions and the restricted data defined by the permissioned blockchain network.

According to another embodiment of methods 1800 and 1900, the blockchain includes a permissioned blockchain network; in which the one or more participating nodes have permissioned access to restricted functions and restricted data of the permissioned blockchain network; and in which one ore more additional nodes of the permissioned blockchain network lack access to the restricted functions of the permissioned blockchain network.

According to another embodiment of methods 1800 and 1900, receiving the historical data from each of the participating nodes on the blockchain includes: receiving, from each of the participating nodes, anonymized historical data representing historical smart contract transactions for customers of each respective tenant's corresponding participating node on the blockchain; in which the anonymized historical data removes all identifiable information associated with the customers; and in which the anonymized historical data forms training data for the new machine learning model via a list of historical smart contract transactions identified as fraudulent and a list of historical smart contract transactions identified as non-fraudulent or valid.

According to another embodiment, methods 1800 and 1900 further include: presenting the new machine learning model to the plurality of participating nodes for consensus; responsively receiving the consensus agreement from the participating nodes of the blockchain having access to restricted functions of the blockchain including access to a consensus voting function of the blockchain; and associating the new machine learning model for smart contract transactions to be executed against the blockchain based on receiving the consensus agreement.

According to another embodiment, methods 1800 and 1900 further include: associating the new machine learning model for smart contract transactions to be executed against the blockchain based on receiving the consensus agreement; in which the new machine learning model is associated with a specified transaction type for blockchain transactions as defined by transaction header for each transaction on the blockchain; and in which the new machine learning model is selected and executed for transactions on the blockchain having a matching transaction type.

According to another embodiment of methods 1800 and 1900, receiving the consensus agreement from the plurality of participating nodes on the blockchain to apply the new machine learning model to smart contract transactions executed via the blockchain, includes one or more of: mapping the new machine learning model be executed to smart contract transactions by default for any smart contract transaction lacking a defined transaction type via a transaction header of the smart contract transaction; mapping the new machine learning model be executed to smart contract transactions by default for all smart contract transactions regardless of any defined transaction type defined via the transaction header of the smart contract transaction; mapping the new machine learning model be executed to smart contract transactions of a first transaction type as defined by the transaction header of the smart contract transaction; mapping the new machine learning model be executed to smart contract transactions of a second transaction type as defined by the transaction header of the smart contract transaction; and mapping the new machine learning model be executed to smart contract transactions of both the first and the second transaction types as defined by the transaction headers of the smart contract transactions.

According to another embodiment of methods 1800 and 1900, receiving the consensus agreement from the plurality of participating nodes on the blockchain to apply the new machine learning model to smart contract transactions executed via the blockchain, includes one or more of: mapping the new machine learning model be executed to smart contract transactions of a specified transaction type as one of a plurality of machine learning models applied to the smart contract transaction, in which each of the plurality of machine learning models are executed in serial; mapping the new machine learning model be executed to smart contract transactions of a specified transaction type as one of a plurality of machine learning models applied to the smart contract transaction, in which each of the plurality of machine learning models are executed in parallel; and mapping the new machine learning model be executed to smart contract transactions of a specified transaction type as one of a plurality of machine learning models applied to the smart contract transaction, in which each of the plurality of machine learning models are executed in an order or sequence defined by smart contract logic for the smart contract transaction.

According to another embodiment of methods 1800 and 1900, each of the plurality of machine learning models executed for the specified transaction type generate as an output a prediction of transaction validity or transaction invalidity; and in which the method further includes allowing the smart contract transaction to be transacted onto the blockchain or rejecting the smart contract transaction and prohibiting the smart contract transaction from being transacted onto the blockchain based on the prediction of transaction validity or the prediction of transaction invalidity generated as output from each of the plurality of machine learning models executed for the specified transaction.

According to another embodiment of methods 1800 and 1900, generating the new machine learning model at the host organization by inputting the historical data received from the participating nodes into the neural network of a machine learning platform operating at the host organization includes: training the new machine learning model at the host organization via the neural network of the machine learning platform using the historical data received from each of the plurality of participating nodes of the blockchain, in which the historical data received defines historical transactions identified as valid and historical transactions identified as invalid, with each historical transaction further defining a plurality of hyperparameters to be consumed by the machine learning platform in training the new machine learning model.

According to another embodiment, methods 1800 and 1900 further include: distributing the new machine learning model to the plurality of participating nodes on the blockchain.

According to another embodiment of methods 1800 and 1900, the new machine learning model is stored in an encrypted and immutable form; and in which executing the new machine learning model to determine whether the new smart contract transaction will be allowed to be transacted onto the blockchain as valid smart contract transaction includes de-serializing and decrypting the new machine learning model and executing the new machine learning model concurrent with processing the new smart contract transaction at the blockchain.

According to another embodiment of methods 1800 and 1900, the new machine learning model to the plurality of participating nodes on the blockchain includes one of: distributing a copy of the new machine learning model to each of the participating nodes, in which each of the participating nodes store the copy of the new machine learning model; or distributing a reference to the new machine learning model to each of the participating nodes, in which the new machine learning model is stored separately from the blockchain and accessible to each of the participating nodes via the reference.

According to another embodiment, methods 1800 and 1900 further include: transacting the new smart contract transaction onto the blockchain based on the new machine learning model indicating the new smart contract transaction is valid; in which transacting the new smart contract transaction onto the blockchain includes: writing a smart contract corresponding to the new smart contract transaction into the blockchain as metadata via a blockchain services interface of the host organization; and executing the smart contract via the blockchain for the new smart contract transaction occurring on the blockchain According to another embodiment, methods 1800 and 1900 further include: extracting an event listener from a smart contract corresponding to the new smart contract transaction, in which the event listener monitors all transactions on the blockchain for defined events having a corresponding smart contract condition or a smart contract trigger within the smart contract corresponding to the new smart contract transaction being transacted onto the blockchain; and executing the event listener responsive to the new smart contract transaction being transacted to the blockchain, in which the event listener executes the new machine learning model to determine whether the new smart contract transaction will be allowed to be transacted onto the blockchain as valid smart contract transaction or prohibited from being transacted onto the blockchain as an invalid smart contract transaction.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each one of the plurality of tenants operate as a participating node with access to the blockchain; receiving historical data from each of the participating nodes on the blockchain, in which the historical data represents historical smart contract transactions on the blockchain for customers of the plurality of tenants and further in which each of the participating nodes provides different historical data; generating a new machine learning model at the host organization by inputting the historical data received from the participating nodes into a neural network of a machine learning platform operating at the host organization; receiving a consensus agreement from the plurality of participating nodes on the blockchain to apply the new machine learning model to smart contract transactions executed via the blockchain; deploying the new machine learning model to the participating nodes as a component of a smart contract to be executed in fulfillment of the smart contract transactions; receiving a transaction at the blockchain and responsively triggering the smart contract to process the transaction onto the blockchain as a new smart contract transaction; and executing the smart contract and executing the new machine learning model as part of the smart contract to determine whether the transaction is valid in fulfillment of processing the transaction onto the blockchain.

Figure 20:
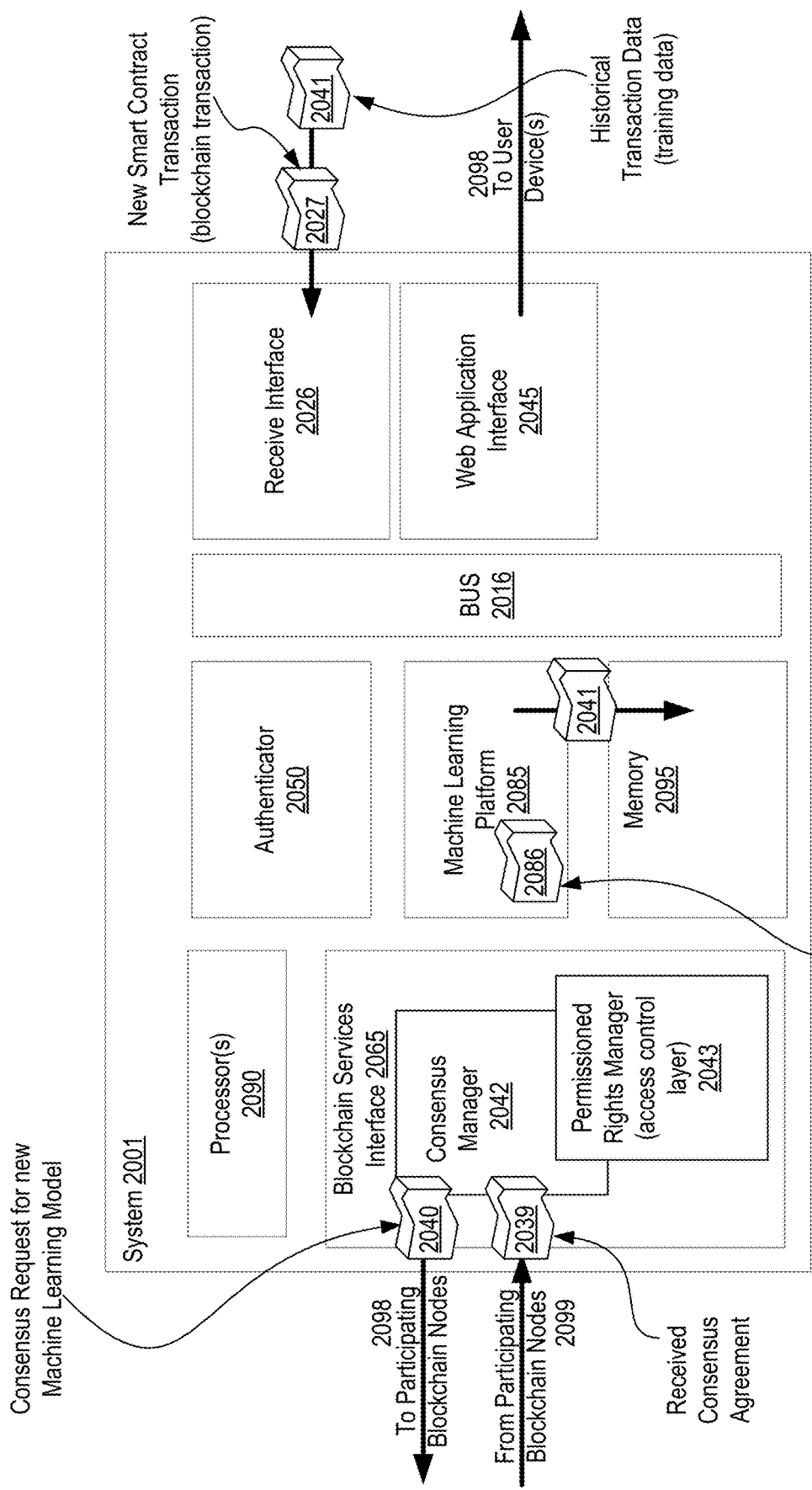
FIG. 20 shows a diagrammatic representation of a system within which embodiments may operate, be installed, integrated, or configured. In accordance with one embodiment.

FIG. 20 shows a diagrammatic representation of a system 2001 within which embodiments may operate, be installed, integrated, or configured. In accordance with one embodiment, there is a system 2001 having at least a processor 2090 and a memory 2095 therein to execute implementing application code for the methodologies as described herein. Such a system 2001 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 2001, which may operate within a host organization, includes the processor 2090 and the memory 2095 to execute instructions at the system 2001. According to such an embodiment, the processor 2090 is to execute a blockchain services interface 2065 to a blockchain on behalf of a plurality of tenants of the host organization, in which each one of the plurality of tenants operate as a participating node 2098 with access to the blockchain. Such a blockchain may be a permissioned blockchain in which the permissioned rights manager 2043 implements an access control layer to manage which participating nodes of the permissioned blockchain have access to the various restricted functions and restricted data as managed by the permissioned rights manager 2043. Those participating nodes 2098 having such rights to the restricted functions and data may form part of a permissioned ledger for the permissioned blockchain.

According to such an embodiment, the system 2001 further includes a receive interface 2026 via which to receive historical transaction data 2041 (e.g., training data) from each of the participating nodes 2098 on the blockchain. According to such an embodiment, the historical transaction data 2041 represents historical smart contract transactions on the blockchain for customers of the plurality of tenants and further in which each of the participating nodes 2098 provides different historical transaction data 2041. The system 2001 further includes a machine learning platform 2085 according to certain embodiments, in which the machine learning platform 2085 is to generate a new machine learning model 2086 at the host organization by inputting the historical transaction data 2041 into a neural network of a machine learning platform 2085 operating at the host organization. According to certain embodiments, the historical transaction data 2041 is received from the participating nodes 2099 via the blockchain services interface 2065, whereas in other embodiments, the historical transaction data 2041 may be received via the receive interface 2041.

According to another embodiment of the system 2001, the receive interface 2026 or the blockchain services interface 2065 is to further receive a consensus agreement 2039 from the plurality of participating nodes 2098 on the blockchain, in which the consensus agreement confirms an agreement or a consensus amongst the participating nodes 2098 to apply the new machine learning model to smart contract transactions executed via the blockchain.

According to another embodiment of the system 2001, the receive interface 2026 or the blockchain services interface 2065 is to further receive a new smart contract transaction 2027 to be executed against the blockchain; which the blockchain services interface 2065 to is to execute the new machine learning model 2086 to determine whether the new smart contract transaction 2027 will be allowed to be transacted onto the blockchain as a valid smart contract transaction.

According to another embodiment of system 2001, the blockchain services interface 2065 includes an interface to a permissioned blockchain network as managed via the permissioned rights manager 2043, in which the permissioned blockchain network defines one or more of restricted functions and restricted data; and in which each of the tenants operating as participating nodes on the permissioned blockchain collectively form a permissioned ledger of the permissioned blockchain granting access rights for the participating nodes to the restricted functions and the restricted data defined by the permissioned blockchain network.

According to another embodiment, the receive interface or the blockchain services interface 2065 is to receive, from each of the participating nodes, anonymized historical data representing historical smart contract transactions for customers of each respective tenant's corresponding participating node on the blockchain; in which the anonymized historical data removes all identifiable information associated with the customers; and in which the anonymized historical data forms training data for the new machine learning model via a list of historical smart contract transactions identified as fraudulent and a list of historical smart contract transactions identified as non-fraudulent or valid.

According to another embodiment of the system 2001, the receive interface 2026 communicates with a user client device 2098 remote from the system and communicatively links the user device with the system via a public Internet. According to such an embodiment, the system operates at a host organization as a cloud based service provider to the user device 2099; in which the cloud based service provider hosts a receive interface 2026 exposed to the user client device via the public Internet, and further in which the receive interface receives inputs from the user device as a request for services from the cloud based service provider.

Bus 2016 interfaces the various components of the system 2001 amongst each other, with any other peripheral(s) of the system 2001, and with external components such as external network elements, other machines, client devices, cloud computing services, etc. Communications may further include communicating with external devices via a network interface over a LAN, WAN, or the public Internet.

Figure 21A:
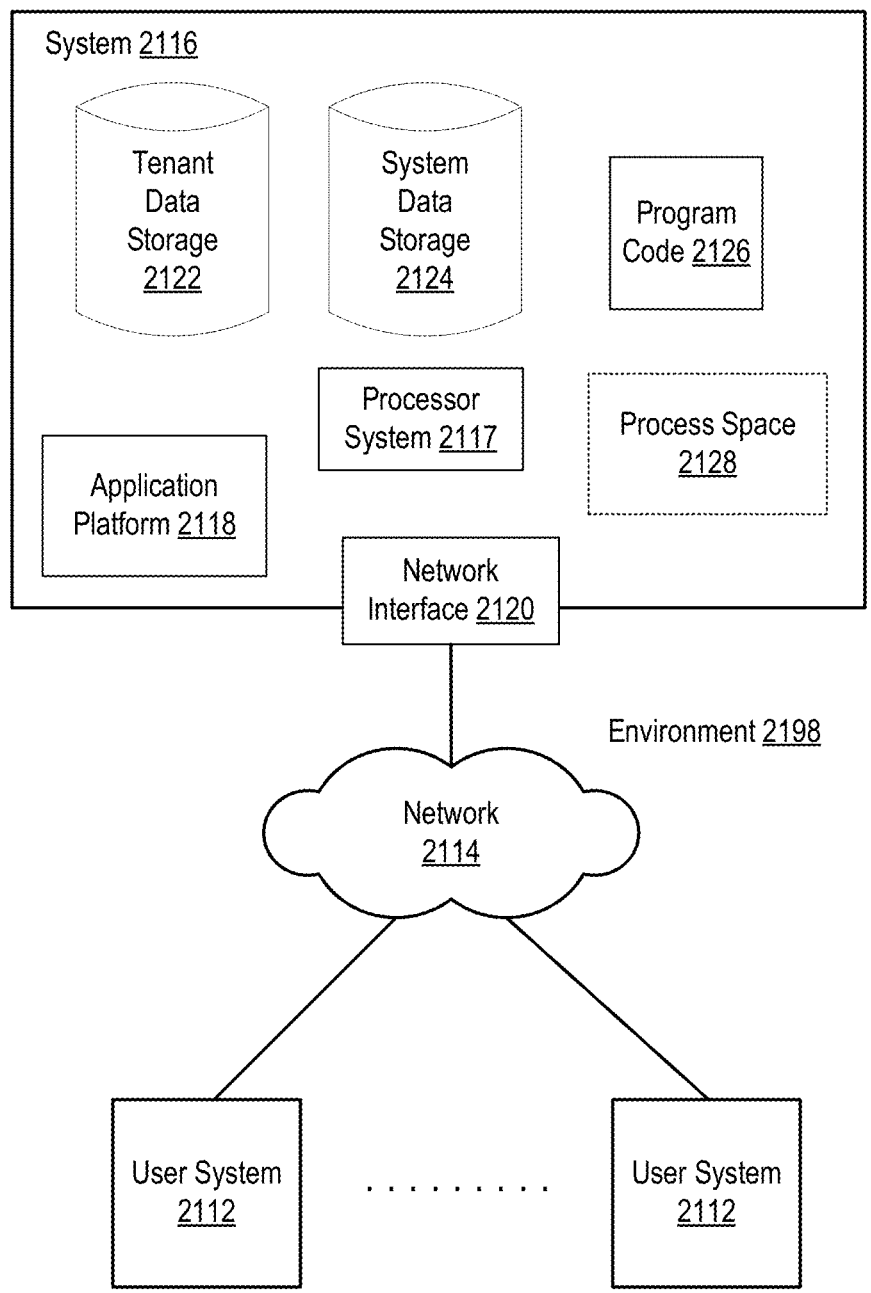
FIG. 21A illustrates a block diagram of an environment in which an on-demand database service may operate in accordance with the described embodiments.

FIG. 21A illustrates a block diagram of an environment 2198 in which an on-demand database service may operate in accordance with the described embodiments. Environment 2198 may include user systems 2112, network 2114, system 2116, processor system 2117, application platform 2118, network interface 2120, tenant data storage 2122, system data storage 2124, program code 2126, and process space 2128. In other embodiments, environment 2198 may not have all of the components listed and/or may have other elements instead of, or in addition to, those listed above.

Environment 2198 is an environment in which an on-demand database service exists. User system 2112 may be any machine or system that is used by a user to access a database user system. For example, any of user systems 2112 can be a handheld computing device, a mobile phone, a laptop computer, a work station, and/or a network of computing devices. As illustrated in FIG. 21A (and in more detail in FIG. 21B) user systems 2112 might interact via a network 2114 with an on-demand database service, which is system 2116.

An on-demand database service, such as system 2116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2116" and "system 2116" is used interchangeably herein. A database image may include one or more database objects. A relational database management system (RDMS) or the equivalent may execute storage and retrieval of information against the database object(s). Application platform 2118 may be a framework that allows the applications of system 2116 to run, such as the hardware and/or software, e.g., the operating system. In an embodiment, on-demand database service 2116 may include an application platform 2118 that enables creation, managing and executing one or more applications developed by the provider of the on-demand database service, users accessing the on-demand database service via user systems 2112, or third party application developers accessing the on-demand database service via user systems 2112.

The users of user systems 2112 may differ in their respective capacities, and the capacity of a particular user system 2112 might be entirely determined by permissions (permission levels) for the current user. For example, where a salesperson is using a particular user system 2112 to interact with system 2116, that user system has the capacities allotted to that salesperson. However, while an administrator is using that user system to interact with system 2116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2114 is any network or combination of networks of devices that communicate with one another. For example, network 2114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 2112 might communicate with system 2116 using TCP/IP and, at a higher network level, use other common Internet protocols to communicate, such as HTTP, FTP, AFS, WAP, etc. In an example where HTTP is used, user system 2112 might include an HTTP client commonly referred to as a "browser" for sending and receiving HTTP messages to and from an HTTP server at system 2116. Such an HTTP server might be implemented as the sole network interface between system 2116 and network 2114, but other techniques might be used as well or instead. In some implementations, the interface between system 2116 and network 2114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2116, shown in FIG. 21A, implements a web-based customer relationship management (CRM) system. For example, in one embodiment, system 2116 includes application servers configured to implement and execute CRM software applications as well as provide related data, code, forms, webpages and other information to and from user systems 2112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2116 implements applications other than, or in addition to, a CRM application. For example, system 2116 may provide tenant access to multiple hosted (standard and custom) applications, including a CRM application. User (or third party developer) applications, which may or may not include CRM, may be supported by the application platform 2118, which manages creation, storage of the applications into one or more database objects and executing of the applications in a virtual machine in the process space of the system 2116.

One arrangement for elements of system 2116 is shown in FIG. 21A, including a network interface 2120, application platform 2118, tenant data storage 2122 for tenant data 2123, system data storage 2124 for system data 2125 accessible to system 2116 and possibly multiple tenants, program code 2126 for implementing various functions of system 2116, and a process space 2128 for executing MTS system processes and tenant-specific processes, such as running applications as part of an application hosting service. Additional processes that may execute on system 2116 include database indexing processes.

Several elements in the system shown in FIG. 21A include conventional, well-known elements that are explained only briefly here. For example, each user system 2112 may include a desktop personal computer, workstation, laptop, PDA, cell phone, or any wireless access protocol (WAP) enabled device or any other computing device capable of interfacing directly or indirectly to the Internet or other network connection. User system 2112 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 2112 to access, process and view information, pages and applications available to it from system 2116 over network 2114. Each user system 2112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2116 or other systems or servers. For example, the user interface device can be used to access data and applications hosted by system 2116, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 2112 and all of its components are operator configurable using applications, such as a browser, including computer code run using a central processing unit such as an Intel Pentium® processor or the like. Similarly, system 2116 (and additional instances of an MTS, where more than one is present) and all of their components might be operator configurable using application(s) including computer code to run using a central processing unit such as processor system 2117, which may include an Intel Pentium® processor or the like, and/or multiple processor units.

According to one embodiment, each system 2116 is configured to provide webpages, forms, applications, data and media content to user (client) systems 2112 to support the access by user systems 2112 as tenants of system 2116. As such, system 2116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 21B:
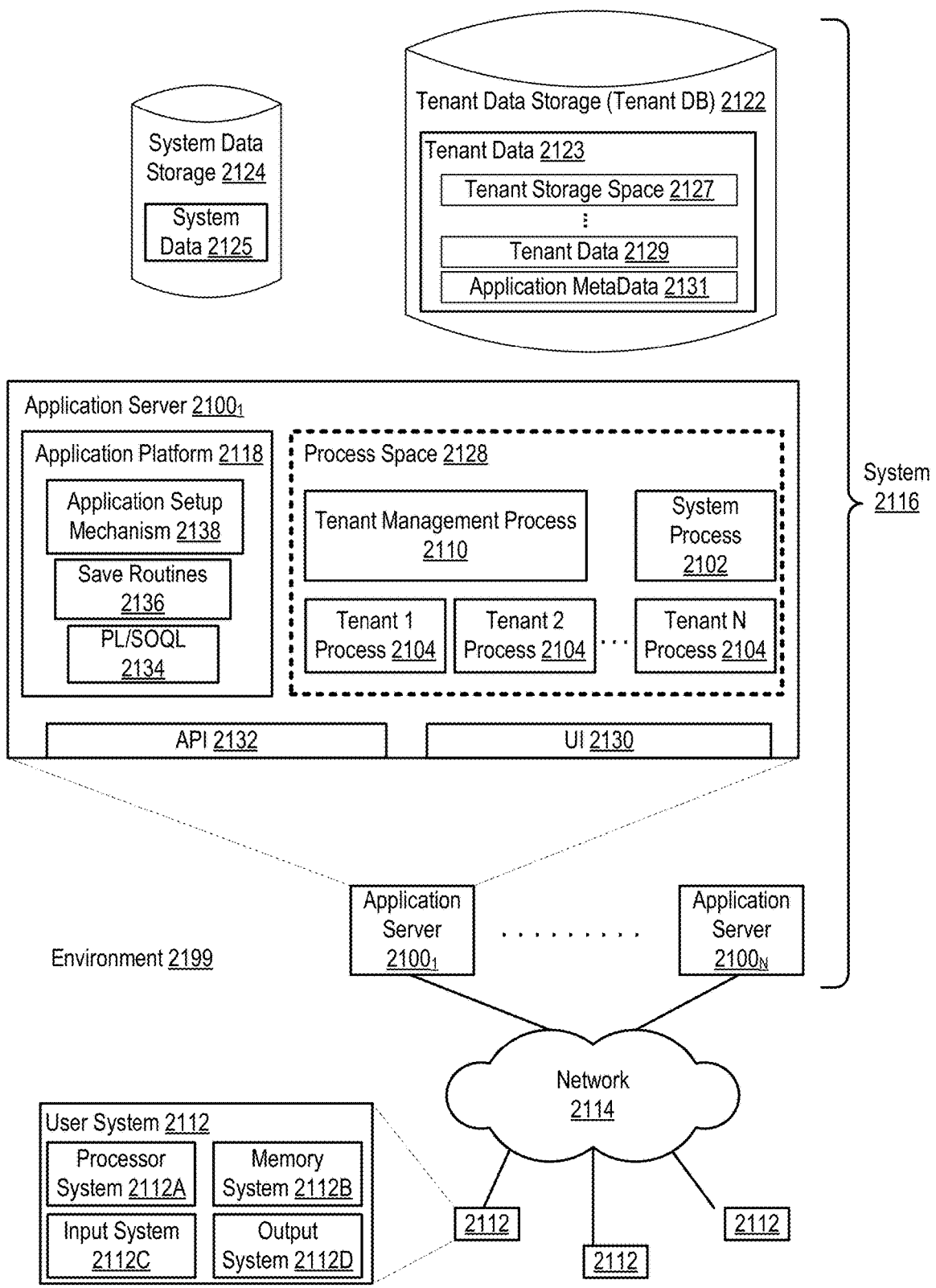
FIG. 21B illustrates another block diagram of an embodiment of elements of FIG. 21A and various possible interconnections between such elements in accordance with the described embodiments.

FIG. 21B illustrates another block diagram of an embodiment of elements of FIG. 21A and various possible interconnections between such elements in accordance with the described embodiments. FIG. 21B also illustrates environment 2199. However, in FIG. 21B, the elements of system 2116 and various interconnections in an embodiment are illustrated in further detail. More particularly, FIG. 21B shows that user system 2112 may include a processor system 2112A, memory system 2112B, input system 2112C, and output system 2112D. FIG. 21B shows network 2114 and system 2116. FIG. 21B also shows that system 2116 may include tenant data storage 2122, having therein tenant data 2123, which includes, for example, tenant storage space 2127, tenant data 2129, and application metadata 2131. System data storage 2124 is depicted as having therein system data 2125. Further depicted within the expanded detail of application servers $2100_{1-N}$ are User Interface (UI) 2130, Application Program Interface (API) 2132, application platform 2118 includes PL/SOQL 2134, save routines 2136, application setup mechanism 2138, process space 2128 includes system process space 2102, tenant 1-N process spaces 2104, and tenant management process space 2110. In other embodiments, environment 2199 may not have the same elements as those listed above and/or may have other elements instead of, or in addition to, those listed above.

User system 2112, network 2114, system 2116, tenant data storage 2122, and system data storage 2124 were discussed above in FIG. 21A. As shown by FIG. 21B, system 2116 may include a network interface 2120 (of FIG. 21A) implemented as a set of HTTP application servers 2100, an application platform 2118, tenant data storage 2122, and system data storage 2124. Also shown is system process space 2102, including individual tenant process spaces 2104 and a tenant management process space 2110. Each application server 2100 may be configured to tenant data storage 2122 and the tenant data 2123 therein, and system data storage 2124 and the system data 2125 therein to serve requests of user systems 2112. The tenant data 2123 might be divided into individual tenant storage areas (e.g., tenant storage space 2127), which can be either a physical arrangement and/or a logical arrangement of data. Within each tenant storage space 2127, tenant data 2129, and application metadata 2131 might be similarly allocated for each user. For example, a copy of a user's most recently used (MRU) items might be stored to tenant data 2129. Similarly, a copy of MRU items for an entire organization that is a tenant might be stored to tenant storage space 2127. A UI 730 provides a user interface and an API 2132 provides an application programmer interface into system 2116 resident processes to users and/or developers at user systems 2112.

The tenant data and the system data may be stored in various databases, such as one or more Oracle™ databases.

Application platform 2118 includes an application setup mechanism 2138 that supports application developers' creation and management of applications, which may be saved as metadata into tenant data storage 2122 by save routines 2136 for execution by subscribers as one or more tenant process spaces 2104 managed by tenant management process space 2110 for example. Invocations to such applications may be coded using PL/SOQL 2134 that provides a programming language style interface extension to API 2132. Invocations to applications may be detected by one or more system processes, which manages retrieving application metadata 2131 for the subscriber making the invocation and executing the metadata as an application in a virtual machine.

Each application server 2100 may be communicably coupled to database systems, e.g., having access to system data 2125 and tenant data 2123, via a different network connection. For example, one application server $2100_1$ might be coupled via the network 2114 (e.g., the Internet), another application server $2100_{N-1}$ might be coupled via a direct network link, and another application server $2100_N$ might be coupled by yet a different network connection. Transfer Control Protocol and Internet Protocol (TCP/IP) are typical protocols for communicating between application servers 2100 and the database system. However, it will be apparent to one skilled in the art that other transport protocols may be used to optimize the system depending on the network interconnect used.

In certain embodiments, each application server 2100 is configured to handle requests for any user associated with any organization that is a tenant. Because it is desirable to be able to add and remove application servers from the server pool at any time for any reason, there is preferably no server affinity for a user and/or organization to a specific application server 2100. In one embodiment, therefore, an interface system implementing a load balancing function (e.g., an F5 Big-IP load balancer) is communicably coupled between the application servers 2100 and the user systems 2112 to distribute requests to the application servers 2100. In one embodiment, the load balancer uses a least connections algorithm to route user requests to the application servers 2100. Other examples of load balancing algorithms, such as round robin and observed response time, also can be used. For example, in certain embodiments, three consecutive requests from the same user may hit three different application servers 2100, and three requests from different users may hit the same application server 2100. In this manner, system 2116 is multi-tenant, in which system 2116 handles storage of, and access to, different objects, data and applications across disparate users and organizations.

As an example of storage, one tenant might be a company that employs a sales force where each salesperson uses system 2116 to manage their sales process. Thus, a user might maintain contact data, leads data, customer follow-up data, performance data, goals and progress data, etc., all applicable to that user's personal sales process (e.g., in tenant data storage 2122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2116 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2116 might also maintain system level data usable by multiple tenants or other data. Such system level data might include industry reports, news, postings, and the like that are sharable among tenants.

In certain embodiments, user systems 2112 (which may be client systems) communicate with application servers 2100 to request and update system-level and tenant-level data from system 2116 that may require sending one or more queries to tenant data storage 2122 and/or system data storage 2124. System 2116 (e.g., an application server 2100 in system 2116) automatically generates one or more SQL statements (e.g., one or more SQL queries) that are designed to access the desired information. System data storage 2124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 22:
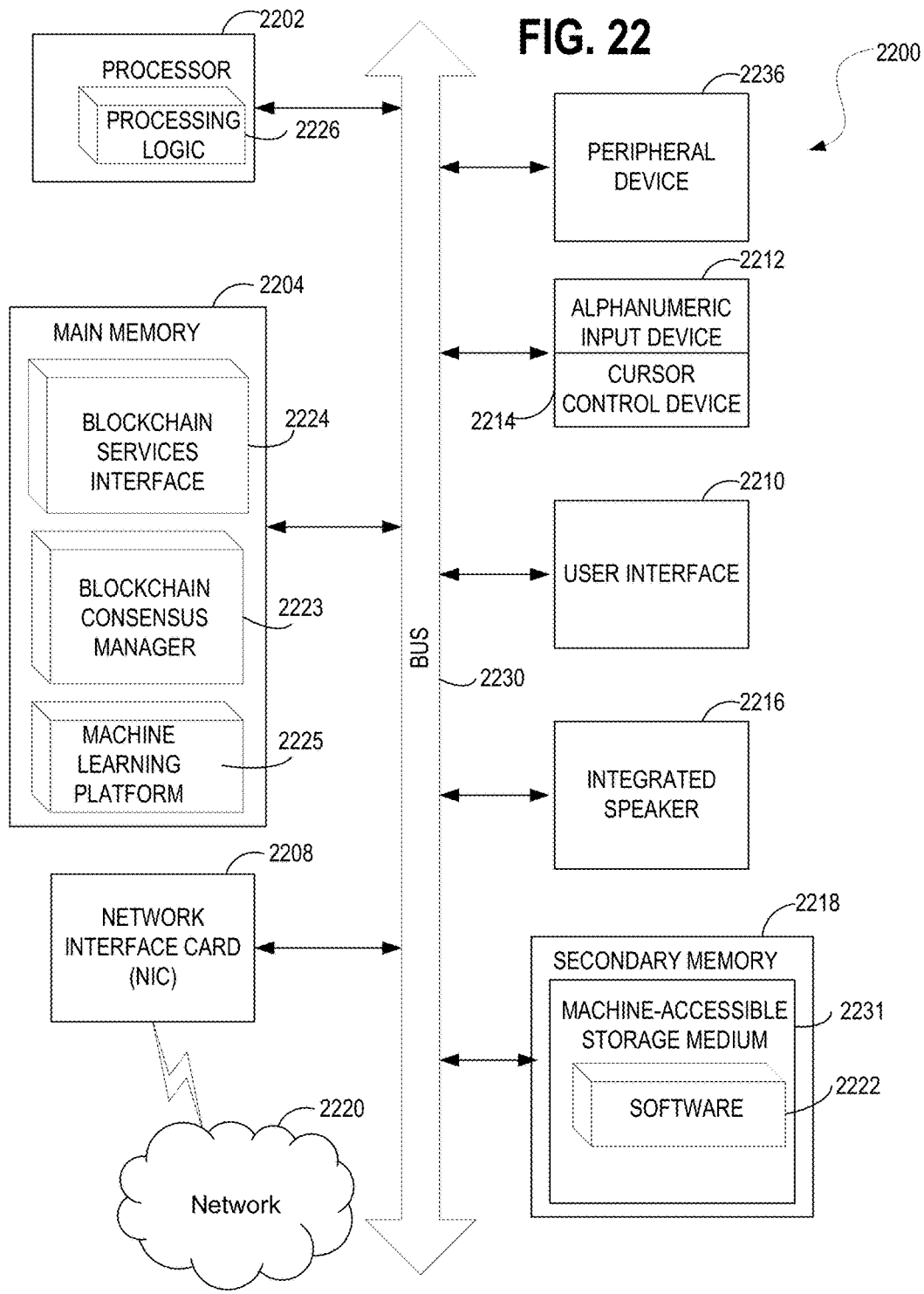
FIG. 22 illustrates a diagrammatic representation of a machine in the exemplary form of a computer system, in accordance with one embodiment.

FIG. 22 illustrates a diagrammatic representation of a machine 2200 in the exemplary form of a computer system, in accordance with one embodiment, within which a set of instructions, for causing the machine/computer system 2200 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 2200 includes a processor 2202, a main memory 2204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 2218 (e.g., a persistent storage device including hard disk drives and a persistent database and/or a multi-tenant database implementation), which communicate with each other via a bus 2230. Main memory 2204 includes a blockchain services interface 2224 by which to interface tenants and users of the host organization with available supported blockchains, public or private. Main memory 2204 also includes a blockchain consensus manager 2223 and a machine learning platform 2225. Main memory 2204 and its sub-elements are operable in conjunction with processing logic 2226 and processor 2202 to perform the methodologies discussed herein.

Processor 2202 represents one or more general-purpose processing devices such as a microprocessor, central processing unit, or the like. More particularly, the processor 2202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 2202 may also be one or more special-purpose processing devices such as an application specific integrated circuit (ASIC), a field programmable gate array (FPGA), a digital signal processor (DSP), network processor, or the like. Processor 2202 is configured to execute the processing logic 2226 for performing the operations and functionality which is discussed herein.

The computer system 2200 may further include a network interface card 2208. The computer system 2200 also may include a user interface 2210 (such as a video display unit, a liquid crystal display, etc.), an alphanumeric input device 2212 (e.g., a keyboard), a cursor control device 2214 (e.g., a mouse), and a signal generation device 2216 (e.g., an integrated speaker). The computer system 2200 may further include peripheral device 2236 (e.g., wireless or wired communication devices, memory devices, storage devices, audio processing devices, video processing devices, etc.).

The secondary memory 2218 may include a non-transitory machine-readable storage medium or a non-transitory computer readable storage medium or a non-transitory machine-accessible storage medium 2231 on which is stored one or more sets of instructions (e.g., software 2222) embodying any one or more of the methodologies or functions described herein. The software 2222 may also reside, completely or at least partially, within the main memory 2204 and/or within the processor 2202 during execution thereof by the computer system 2200, the main memory 2204 and the processor 2202 also constituting machine-readable storage media. The software 2222 may further be transmitted or received over a network 2220 via the network interface card 2208.

None of the claims in the are intended to invoke paragraph six of 35 U.S.C. § 115 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method, performed by a system of a host organization, the system having at least a processor and a memory therein, wherein the method comprises:
   operating a blockchain interface to a blockchain on behalf of a plurality of tenants of the host organization, wherein each one of the plurality of tenants operate as a participating node with access to the blockchain;
   receiving historical data from each of the participating nodes on the blockchain, wherein the historical data represents historical smart contract transactions on the blockchain for customers of the plurality of tenants and further wherein each of the participating nodes provides different historical data;
   generating a new machine learning model at the host organization by inputting the historical data received from the participating nodes into a neural network of a machine learning platform operating at the host organization;
   storing the new machine learning model as an encrypted JavaScript Object Notation (JSON) compatible object;
   receiving a consensus agreement from the plurality of participating nodes on the blockchain to apply the new machine learning model to smart contract transactions executed via the blockchain;
   deploying the new machine learning model to the participating nodes as a component of a smart contract to be executed in fulfillment of the smart contract transactions, wherein deploying the new machine learning model to the participating nodes as a component of a smart contract comprises linking the new machine learning model via a smart flow for the smart contract to the encrypted JSON compatible object;

receiving a transaction at the blockchain and responsively triggering the smart contract to process the transaction onto the blockchain as a new smart contract transaction; and executing the smart contract and executing the new machine learning model as part of the smart contract to determine whether the transaction is valid in fulfillment of processing the transaction onto the blockchain, wherein executing the smart contract comprises resolving the linking to the encrypted JSON compatible object and deserializing the encrypted JSON compatible object for execution as part of executing the smart contract.

2. The method of claim 1:
wherein the smart contract to be executed in fulfillment of the smart contract transactions is generated from smart flow for the smart contract; and
wherein deploying the new machine learning model to the participating nodes as a component of a smart contract comprises linking the new machine learning model via the smart flow for the smart contract;
wherein linking the new machine learning model causes the smart contract to execute the new machine learning model as part of the smart contract's smart flow for any smart contract transaction on the blockchain processed utilizing the smart contract having the new machine learning model linked therein; and
wherein output of the new machine learning model execution specifies whether the smart contract transaction is to be accepted or rejected.

3. The method of claim 1, wherein executing the smart contract and executing the new machine learning model as part of the smart contract to determine whether the transaction is valid comprises one of:
determining the transaction is valid pursuant to executing the new machine learning model as part of the smart contract and transacting the valid transaction onto the blockchain; and
determining the transaction is not valid pursuant to executing the new machine learning model as part of the smart contract and rejecting the transaction.

4. The method of claim 3, further comprising:
wherein the machine learning model indicates the new smart contract transaction is valid or invalid via one of:
returning an "invalid" output for the new smart contract transaction;
returning a "fraudulent" output for the new smart contract transaction;
returning a predictive result and a corresponding confidence score that the new smart contract transaction is "invalid" or "fraudulent"; and
returning the predictive result and the corresponding confidence score that the new smart contract transaction is "valid," "allowable" or "non-fraudulent".

5. The method of claim 1, wherein operating the blockchain interface to the blockchain on behalf of a plurality of tenants of the host organization, comprises:
executing the blockchain interface to a permissioned blockchain network which defines one or more of restricted functions and restricted data; and
wherein each of the tenants operating as participating nodes on the permissioned blockchain collectively form a permissioned ledger of the permissioned blockchain granting access rights for the participating nodes to the restricted functions and the restricted data defined by the permissioned blockchain network.

6. The method of claim 1:
wherein the blockchain comprises a permissioned blockchain network;
wherein the one or more participating nodes have permissioned access to restricted functions and restricted data of the permissioned blockchain network; and
wherein one or more additional nodes of the permissioned blockchain network lack access to the restricted functions of the permissioned blockchain network.

7. The method of claim 1, wherein receiving the historical data from each of the participating nodes on the blockchain comprises:
receiving, from each of the participating nodes, anonymized historical data representing historical smart contract transactions for customers of each respective tenant's corresponding participating node on the blockchain;
wherein the anonymized historical data removes all identifiable information associated with the customers; and
wherein the anonymized historical data forms training data for the new machine learning model via a list of historical smart contract transactions identified as fraudulent and a list of historical smart contract transactions identified as non-fraudulent or valid.

8. The method of claim 1, further comprising:
presenting the new machine learning model to the plurality of participating nodes for consensus;
responsively receiving the consensus agreement from the participating nodes of the blockchain having access to restricted functions of the blockchain including access to a consensus voting function of the blockchain; and
associating the new machine learning model with the smart contract for matching smart contract transactions to be executed against the blockchain based on receiving the consensus agreement.

9. The method of claim 1, further comprising:
associating the new machine learning model for smart contract transactions to be executed against the blockchain based on receiving the consensus agreement;
wherein the new machine learning model is associated with a specified transaction type for blockchain transactions as defined by a transaction header for each transaction on the blockchain; and
wherein the new machine learning model is selected and executed for transactions on the blockchain having a matching transaction type.

10. The method of claim 1, wherein receiving the consensus agreement from the plurality of participating nodes on the blockchain to apply the new machine learning model to smart contract transactions executed via the blockchain, comprises one or more of:
mapping the new machine learning model be executed to smart contract transactions by default for any smart contract transaction lacking a defined transaction type via a transaction header of the smart contract transaction;
mapping the new machine learning model be executed to smart contract transactions by default for all smart contract transactions regardless of any defined transaction type defined via the transaction header of the smart contract transaction;
mapping the new machine learning model be executed to smart contract transactions of a first transaction type as defined by the transaction header of the smart contract transaction;

mapping the new machine learning model be executed to smart contract transactions of a second transaction type as defined by the transaction header of the smart contract transaction; and mapping the new machine learning model be executed to smart contract transactions of both the first and the second transaction types as defined by the transaction headers of the smart contract transactions.

11. The method of claim 1, wherein receiving the consensus agreement from the plurality of participating nodes on the blockchain to apply the new machine learning model to smart contract transactions executed via the blockchain, comprises one or more of:

mapping the new machine learning model be executed to smart contract transactions of a specified transaction type as one of a plurality of machine learning models applied to the smart contract transaction, wherein each of the plurality of machine learning models are executed in serial;

mapping the new machine learning model be executed to smart contract transactions of a specified transaction type as one of a plurality of machine learning models applied to the smart contract transaction, wherein each of the plurality of machine learning models are executed in parallel; and mapping the new machine learning model be executed to smart contract transactions of a specified transaction type as one of a plurality of machine learning models applied to the smart contract transaction, wherein each of the plurality of machine learning models are executed in an order or sequence defined by smart contract logic for the smart contract transaction.

12. The method of claim 11:

wherein each of the plurality of machine learning models executed for the specified transaction type generate as an output a prediction of transaction validity or transaction invalidity; and wherein the method further comprises allowing the smart contract transaction to be transacted onto the blockchain or rejecting the smart contract transaction and prohibiting the smart contract transaction from being transacted onto the blockchain based on the prediction of transaction validity or the prediction of transaction invalidity generated as output from each of the plurality of machine learning models executed for the specified transaction.

13. The method of claim 1, wherein generating the new machine learning model at the host organization by inputting the historical data received from the participating nodes into the neural network of a machine learning platform operating at the host organization comprises:

training the new machine learning model at the host organization via the neural network of the machine learning platform using the historical data received from each of the plurality of participating nodes of the blockchain, wherein the historical data received defines historical transactions identified as valid and historical transactions identified as invalid, with each historical transaction further defining a plurality of hyperparameters to be consumed by the machine learning platform in training the new machine learning model.

14. The method of claim 1:

wherein the new machine learning model is stored in an encrypted and immutable form; and wherein executing the new machine learning model to determine whether the new smart contract transaction will be allowed to be transacted onto the blockchain as a valid smart contract transaction comprises de-serializing and decrypting the new machine learning model and executing the new machine learning model concurrent with processing the new smart contract transaction at the blockchain.

15. The method of claim 1:

wherein distributing the new machine learning model to the plurality of participating nodes on the blockchain comprises one of:

distributing a copy of the new machine learning model to each of the participating nodes, wherein each of the participating nodes store the copy of the new machine learning model; or distributing a link referencing the new machine learning model to each of the participating nodes, wherein the new machine learning model is stored separately from the blockchain and accessible to each of the participating nodes via the reference.

16. The method of claim 1, further comprising:

transacting the transaction onto the blockchain as a new smart contract transaction based on the new machine learning model indicating the new smart contract transaction is valid;

wherein transacting the new smart contract transaction onto the blockchain comprises:

writing the smart contract corresponding to the new smart contract transaction into the blockchain as metadata via a blockchain services interface of the host organization, wherein the smart contract includes the new machine learning model; and executing the smart contract and the new machine learning model via the blockchain for the new smart contract transaction occurring on the blockchain.

17. The method of claim 1, further comprising:

extracting an event listener from a smart contract corresponding to the new smart contract transaction, wherein the event listener monitors all transactions on the blockchain for defined events having a corresponding smart contract condition or a smart contract trigger within the smart contract corresponding to the new smart contract transaction being transacted onto the blockchain;

executing the event listener responsive to the transaction being received at the blockchain, wherein the event listener executes the smart contract which references the new machine learning model; and wherein the new machine learning model is executed as part of the executed smart contract to determine whether the new smart contract transaction will be allowed to be transacted onto the blockchain as a valid smart contract transaction or prohibited from being transacted onto the blockchain as an invalid smart contract transaction.

18. Non-transitory computer readable storage media having instructions stored thereon that, when executed by a system of a host organization having at least a processor and a memory therein, the instructions cause the system to perform the following operations:

operating a blockchain interface to a blockchain on behalf of a plurality of tenants of the host organization, wherein each one of the plurality of tenants operate as a participating node with access to the blockchain;

receiving historical data from each of the participating nodes on the blockchain, wherein the historical data represents historical smart contract transactions on the blockchain for customers of the plurality of tenants and further wherein each of the participating nodes provides different historical data;
generating a new machine learning model at the host organization by inputting the historical data received from the participating nodes into a neural network of a machine learning platform operating at the host organization;
storing the new machine learning model as an encrypted JavaScript Object Notation (JSON) compatible object;
receiving a consensus agreement from the plurality of participating nodes on the blockchain to apply the new machine learning model to smart contract transactions executed via the blockchain;
deploying the new machine learning model to the participating nodes as a component of a smart contract to be executed in fulfillment of the smart contract transactions, wherein deploying the new machine learning model to the participating nodes as a component of a smart contract comprises linking the new machine learning model via a smart flow for the smart contract to the encrypted JSON compatible object;
receiving a transaction at the blockchain and responsively triggering the smart contract to process the transaction onto the blockchain as a new smart contract transaction; and
executing the smart contract and executing the new machine learning model as part of the smart contract to determine whether the transaction is valid in fulfillment of processing the transaction onto the blockchain, wherein executing the smart contract comprises resolving the linking to the encrypted JSON compatible object and deserializing the encrypted JSON compatible object for execution as part of executing the smart contract.

19. The non-transitory computer readable storage media of claim 18:
wherein the smart contract to be executed in fulfillment of the smart contract transactions is generated from smart flow for the smart contract; and
wherein deploying the new machine learning model to the participating nodes as a component of a smart contract comprises linking the new machine learning model via the smart flow for the smart contract;
wherein linking the new machine learning model causes the smart contract to execute the new machine learning model as part of the smart contract's smart flow for any smart contract transaction on the blockchain processed utilizing the smart contract having the new machine learning model linked therein; and
wherein output of the new machine learning model execution specifies whether the smart contract transaction is to be accepted or rejected.

20. The non-transitory computer readable storage media of claim 18, wherein the instructions cause the system to perform operations further comprising:
transacting the new smart contract transaction onto the blockchain when the machine learning model indicates the new smart contract transaction is valid and prohibiting the new smart contract transaction from being transacted onto the blockchain when the machine learning model indicates the new smart contract transaction is fraudulent; and
wherein the machine learning model indicates the new smart contract transaction is valid or fraudulent via one of:
returning an "invalid" output for the new smart contract transaction;
returning a "fraudulent" output for the new smart contract transaction;
returning a predictive result and a corresponding confidence score that the new smart contract transaction is "invalid" or "fraudulent"; and
returning the predictive result and the corresponding confidence score that the new smart contract transaction is "valid," "allowable" or "non-fraudulent".

21. The non-transitory computer readable storage media of claim 18, wherein receiving the historical data from each of the participating nodes on the blockchain comprises:
receiving, from each of the participating nodes, anonymized historical data representing historical smart contract transactions for customers of each respective tenant's corresponding participating node on the blockchain;
wherein the anonymized historical data removes all identifiable information associated with the customers; and
wherein the anonymized historical data forms training data for the new machine learning model via a list of historical smart contract transactions identified as fraudulent and a list of historical smart contract transactions identified as non-fraudulent or valid.

22. The non-transitory computer readable storage media of claim 18, wherein the instructions cause the system to perform operations further comprising:
presenting the new machine learning model to the plurality of participating nodes for consensus;
responsively receiving the consensus agreement from the participating nodes of the blockchain having access to restricted functions of the blockchain including access to a consensus voting function of the blockchain; and
associating the new machine learning model for smart contract transactions to be executed against the blockchain based on receiving the consensus agreement.

23. The non-transitory computer readable storage media of claim 18, wherein the instructions cause the system to perform operations further comprising:
associating the new machine learning model for smart contract transactions to be executed against the blockchain based on receiving the consensus agreement;
wherein the new machine learning model is associated with a specified transaction type for blockchain transactions as defined by a transaction header for each transaction on the blockchain; and
wherein the new machine learning model is selected and executed for transactions on the blockchain having a matching transaction type.

24. A system to execute at a host organization, wherein the system comprises:
a memory to store instructions;
a processor to execute instructions; and
system logic to cause the system to perform various operations including:
executing, via the processor, a blockchain services interface to a blockchain on behalf of a plurality of tenants of the host organization, wherein each one of the plurality of tenants operate as a participating node with access to the blockchain;
receiving, via a receive interface, historical data from each of the participating nodes on the blockchain, wherein the historical data represents historical smart contract transactions on the blockchain for customers of the plurality of tenants and further wherein each of the participating nodes provides different historical data;

generating, via a machine learning platform, a new machine learning model at the host organization by inputting the historical data received from the participating nodes into a neural network of a machine learning platform operating at the host organization, wherein the new machine learning model is stored as an encrypted JavaScript Object Notation (JSON) compatible object;

further receiving, via the receive interface, a consensus agreement from the plurality of participating nodes on the blockchain to apply the new machine learning model to smart contract transactions executed via the blockchain;

deploying, via the blockchain services interface, the new machine learning model to the participating nodes as a component of a smart contract to be executed in fulfillment of the smart contract transactions, wherein deploying the new machine learning model to the participating nodes as a component of a smart contract comprises linking the new machine learning model via a smart flow for the smart contract to the encrypted JSON compatible object;

further receiving, via the receive interface, a transaction at the blockchain and responsively triggering the smart contract to process the transaction onto the blockchain as a new smart contract transaction; and further executing, via the blockchain services interface, the smart contract, wherein executing the smart contract comprises resolving the linking to the encrypted JSON compatible object and deserializing the encrypted JSON compatible object for execution as part of executing the smart contract; and further executing, via the blockchain services interface, the new machine learning model as part of the smart contract to determine whether the transaction is valid in fulfillment of processing the transaction onto the blockchain.

25. The system of claim 24, wherein executing, via the processor, the blockchain services interface comprises the processor executing the blockchain interface to a permissioned blockchain network which defines one or more of restricted functions and restricted data; and wherein each of the tenants operating as participating nodes on the permissioned blockchain collectively form a permissioned ledger of the permissioned blockchain granting access rights for the participating nodes to the restricted functions and the restricted data defined by the permissioned blockchain network.

26. The system of claim 24, wherein receiving, via the receive interface the historical data from each of the participating nodes on the blockchain comprises:

receiving, via the receive interface, from each of the participating nodes, anonymized historical data representing historical smart contract transactions for customers of each respective tenant's corresponding participating node on the blockchain;

wherein the anonymized historical data removes all identifiable information associated with the customers; and wherein the anonymized historical data forms training data for the new machine learning model via a list of historical smart contract transactions identified as fraudulent and a list of historical smart contract transactions identified as non-fraudulent or valid.

* * * * *